United States Patent
Swayn et al.

(10) Patent No.: US 9,355,293 B2
(45) Date of Patent: May 31, 2016

(54) CODE DETECTION AND DECODING SYSTEM

(75) Inventors: James Swayn, Rhodes (AU); Alvin Wai Leong Yeap, Marsfield (AU); Stephen Edward Ecob, Chatswood West (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 1036 days.

(21) Appl. No.: 12/628,425

(22) Filed: Dec. 1, 2009

(65) Prior Publication Data

US 2010/0155464 A1 Jun. 24, 2010

(30) Foreign Application Priority Data

Dec. 22, 2008 (AU) ................................ 2008261177
Dec. 22, 2008 (AU) ................................ 2008261179

(51) Int. Cl.
*G06F 17/00* (2006.01)
*G06K 7/14* (2006.01)

(52) U.S. Cl.
CPC ................ *G06K 7/14* (2013.01); *G06K 7/1417* (2013.01); *G06K 7/1452* (2013.01); *G06K 7/1456* (2013.01)

(58) Field of Classification Search
CPC .. G06K 7/14; G06K 7/1417; G06K 19/06037
USPC .......................... 235/462.1, 375; 3/462.1, 375
See application file for complete search history.

(56) References Cited

U.S. PATENT DOCUMENTS 5,726,435 A 3/1998 Hara et al.
6,267,296 B1 7/2001 Ooshima et al.

(Continued)

FOREIGN PATENT DOCUMENTS

EP 0672994 A1 9/1995
EP 0766449 A2 4/1997
EP 0672994 B1 7/2000

OTHER PUBLICATIONS

Examination Report dated Nov. 1, 2010 issued in corresponding Australian Patent Application No. 2008261179.

(Continued)

*Primary Examiner* — Rafferty Kelly
(74) *Attorney, Agent, or Firm* — Fitzpatrick, Cella, Harper & Scinto

(57) ABSTRACT

A method (2304) of decoding a QR code having two initially detected finder patterns (2901, 2902; 2911, 2912) is provided. The method forms (2402) a pattern matching template (2700, 2800) based on characteristics of the detected finder patterns and determines (2403) at least one candidate region (2904, 2905; 2913, 2914) about the detected finder patterns. The candidate region is typically based at least on the relative positions of the detected finder patterns. The method detects (2404) a previously undetected third finder pattern of the QR code in the at least one candidate region by correlating content of the candidate region with the pattern matching template. With the identified third finder pattern and each of the two initially detected finder patterns, decoding (2305) the QR code can then be performed. Also disclosed is a method of detecting a two-dimensional code comprising known target features and coded data in an image. The target features comprise a continuous black region, enclosed entirely by a continuous white region, enclosed entirely by a continuous black region. The method performs line-by-line connected component analysis (403) of the image to determine candidate features of interest. The line-by-line connected component analysis aggregates metrics corresponding to candidate features of interest. The method evaluates (404) the aggregated metrics to determine how similar each candidate feature of interest is to the target feature and forms (405) a candidate region of interest from multiple candidate features of interest. Typically the target features include the copyright symbol © and the registered trade mark symbol ®.

13 Claims, 49 Drawing Sheets

(56) References Cited

U.S. PATENT DOCUMENTS

| | | |
|---|---|---|
| 6,279,830 B1 | 8/2001 | Ishibashi |
| 2006/0050961 A1 | 3/2006 | Thiyagarajah |
| 2006/0269136 A1* | 11/2006 | Squires et al. ............... 382/181 |
| 2007/0071320 A1 | 3/2007 | Yada |
| 2007/0172123 A1 | 7/2007 | Komatsubara et al. |
| 2007/0187512 A1 | 8/2007 | Yada |
| 2007/0228171 A1* | 10/2007 | Thiyagarajah ........... 235/462.09 |

OTHER PUBLICATIONS

Examination Report dated Dec. 24, 2010 in Australian Patent Application No. 2008261177.

* cited by examiner

CODE DETECTION AND DECODING SYSTEM

CROSS-REFERENCE TO RELATED PATENT APPLICATIONS

This application claims the right of priority under 35 U.S.C. §119 based on Australian Patent Application No. 2008261179, filed 22 Dec. 2008, and Australian Patent Application No. 2008261177 filed 22 Dec. 2008, both of which are incorporated by reference herein in its entirety as if fully set forth herein.

TECHNICAL FIELD

The present disclosure relates generally to identification marker or target feature detection and consequential code decoding. The disclosure also relates to searching for, and grouping of multiple identification markers to form a QR code region. Once identified, these QR code regions may be used to decode the data encoded by the QR code symbology.

BACKGROUND

Since the advent of digital images, it has been a goal of digital image processing to identify and locate features in an image. Many algorithms and methods have been developed to accomplish this goal.

A simple method of detecting target features in a scanned image is known as template correlation. Here, a representative image of the sought after target feature is formed and stored in memory. Subsequently, the representative image (or template) is stepped over the scanned image and a correlation score is calculated for each step position. A sharp peak in correlation scores indicates the presence and location of the target feature in the scanned image. This method, however, has several limitations. A chief limitation of template correlation is that it is highly sensitive to differences in size and rotation of the digital image relative to the template. So, for a robust scale and rotationally invariant detection system, multiple templates need to be formed, requiring a prohibitive level of system complexity.

Another method of detecting target features in a scanned image is performed by statistical means. Here, a machine is trained to identify target features by various machine learning algorithms. Generally, the training process involves inputting large test sets of images with and without target features. At the conclusion of the training process, a classification vector is generated by which new 'unseen' target features in images may be detected. However, this method is highly dependent on the test sets input during the training process. The resulting classification vector may be unpredictable, and may be unrelated to the salient features of the target feature.

Another method of detecting target features in a scanned image is simple and efficient. Here, a target feature that has a known arrangement of black and white regions may be detected by inspecting the ratios between those black and white regions. As an example, a target feature such as the feature 100 of FIG. 1 will be detected if ratios of 1 part black, followed by 1 part white, followed by 3 parts black, followed by 1 part white and finally followed by 1 part black are sought. Although this method is extremely easy and efficient to implement, it suffers when the image of the target feature is affected by a distortion effect known as dot gain. Dot gain is a printer distortion that shrinks or grows the thickness of black printed regions. This directly affects the ratios of black and white regions. Thus, this method is not suitable in the presence of dot gain.

A QR code, such as the code 300 of FIG. 3, is a two-dimensional barcode that encodes information with black and white square blocks, referred to as 'modules'. In the QR code 300, labelled are a black module 302 and a white module 301. QR codes have a range of data capacities. A 'Version 1' QR code encodes the least number of data bits, and a 'Version 40' QR code encodes the maximum number of data bits. QR codes encoding more data bits have a greater number of modules. Irrespective of its data capacity, a QR code will always be the same number of modules in width as it is in height—that is, QR codes are always square.

A QR code comprises three location and identification symbols. These three location symbols are known as 'finder patterns' (FPs) and are located in the top-left, top-right, and bottom-left corners of a QR code. Therefore, the two-dimensional area of an image occupied by a QR code, also known as a 'QR code region', is demarcated by the locations of the three FPs. FIG. 2B shows these three FPs 201, 202, 203 as may be located at three corners of a QR code 200. FIG. 2A provides an enlarged representation of the FP 202. FIG. 1 is a detailed view of a QR code finder pattern 100. Finder patterns are composed of a 3-by-3 square of black modules 103 superimposed on a 5-by-5 square of white modules 102, which is in turn superimposed on a 7-by-7 square of black modules 101.

The process of extracting the data encoded in a QR code begins with the acquisition of an image containing the code. Subsequently, all three finder patterns are detected and their locations are determined. Using the location information of the detected FPs, data modules of the QR code are then sampled to obtain a binary data stream. Finally, the binary data stream is translated to meaningful text or numerical information.

QR codes are frequently included on a broad range of media, such as product labels, billboards and business cards. In general, these media have only included a single QR code of high quality (that is, the digital image of the original QR code has been accurately re-produced on the media). Therefore, when a QR code is being decoded, there is only a single QR code in the acquired image and the quality of the code is high, facilitating the use of relatively simple decoding processing. Furthermore, conventional QR code capturing devices (such as camera phones) can be user-adjusted such that an image of the QR code may be acquired with very little rotational misalignment. These user-adjusted capturing devices can also frame the QR code such that the size of modules in the QR code (with respect to the capturing device) is within a confined known range.

Recently, there has been increased interest in the application of QR codes in aiding document security and workflow management. For these applications, there may be multiple QR codes in an acquired image. Furthermore, there will often be a broad variation in module sizes and orientations amongst the QR codes in the image. The QR codes may also have been printed, scanned and re-printed many times, each time introducing deterioration of the QR code image quality. Specifically, QR codes may suffer from 'dot gain' in which the ratio of black module size and white module size in the QR code differs significantly from the ideal 1:1 ratio. Multiple cycles of printing and scanning also introduces noise and other distortions that further alter the appearance of QR code finder patterns compared to the ideal FP 100. The effect of dot gain and other print and/or scan introduced distortions on decoding reliability using traditional techniques can be considerable. This is because traditional decoding systems typically rely heavily on the expected appearance of QR code finder patterns 100, especially the 1:1 ratio between white and black module sizes, to detect the QR code finder patterns and thereby decode the QR code.

SUMMARY

Some arrangements to be described provide a method of detecting and decoding QR codes that is highly robust to dot gain, noise and other types of damage. Furthermore, the arrangements are able to group QR finder patterns to form valid QR code regions even when there are multiple QR codes in the acquired image.

Briefly, the QR detecting arrangements disclosed herein comprise four basic stages—Binarization, CCA, Resolving and Decoding. These stages are described in more detail later.

The arrangements employ a method of detecting and locating QR FPs that use Connected Components Analysis (CCA) which provides more useful information to the Resolving and Decoding stages than conventional FP detection approaches.

One aspect of the present disclosure employs a novel approach to grouping QR FPs into QR code regions. The process of grouping multiple QR FPs to form QR codes is referred to herein as 'resolving'. The method of resolving disclosed herein, applied in conjunction with a missing finder pattern recovery process, that is another aspect, is capable of resolving QR code regions from only two initially detected QR FPs. This feat has not been achieved with methods in the prior art to the best knowledge of the present inventors and allows QR codes to be decoded when one of the three FPs is damaged.

Overall, the disclosed decoding method incorporating the above-mentioned aspects enables a highly robust QR code decoding system capable of decoding QR codes even when one of three FPs is damaged. This damage may be caused by accidental staining or pen strokes, or by severe noise induced by multiple cycles of printing and scanning.

In accordance with one aspect of the present disclosure, there is provided a method of decoding a QR code having two initially detected finder patterns, the method comprising the steps of:

(a) forming a pattern matching template based on characteristics of the detected finder patterns;

(b) determining at least one candidate region about the detected finder patterns, the candidate region being based at least on the relative positions of the detected finder patterns; and (c) locating a previously undetected third finder pattern of the QR code in the at least one candidate region by correlating content of the candidate region with the pattern matching template; and (d) decoding the QR code with each of the two initially detected finder patterns and the third finder pattern.

Another aspect of the present disclosure is a novel method of performing connected components analysis that simultaneously aggregates low-level metrics of each connected component. Subsequently, low-level metrics are transformed to shape metrics that are directly related to the geometric properties of the connected components. The shape metrics are then used to calculate a similarity score that is substantially size and rotationally invariant.

The described arrangements are memory efficient and amenable to implementation as customized hardware logic in FPGAs, ASICs or the like. Furthermore, the arrangements are highly robust to printer and scanner noise and distortions such as dot gain.

In accordance with another aspect of the present disclosure, there is provided a method of detecting a two-dimensional code comprising known target features and coded data in an image is disclosed. The target features comprise a continuous black region, enclosed entirely by a continuous white region, enclosed entirely by a continuous black region. The method performs line-by-line connected component analysis of the image to determine candidate features of interest. The line-by-line connected component analysis aggregates metrics corresponding to candidate features of interest. The method evaluates the aggregated metrics to determine how similar each candidate feature of interest is to the target feature and forms a candidate region of interest from multiple candidate features of interest. Typically the target features include the copyright symbol © and the registered trade mark symbol ®.

Other aspects are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Operating Environment

Figure 33A:
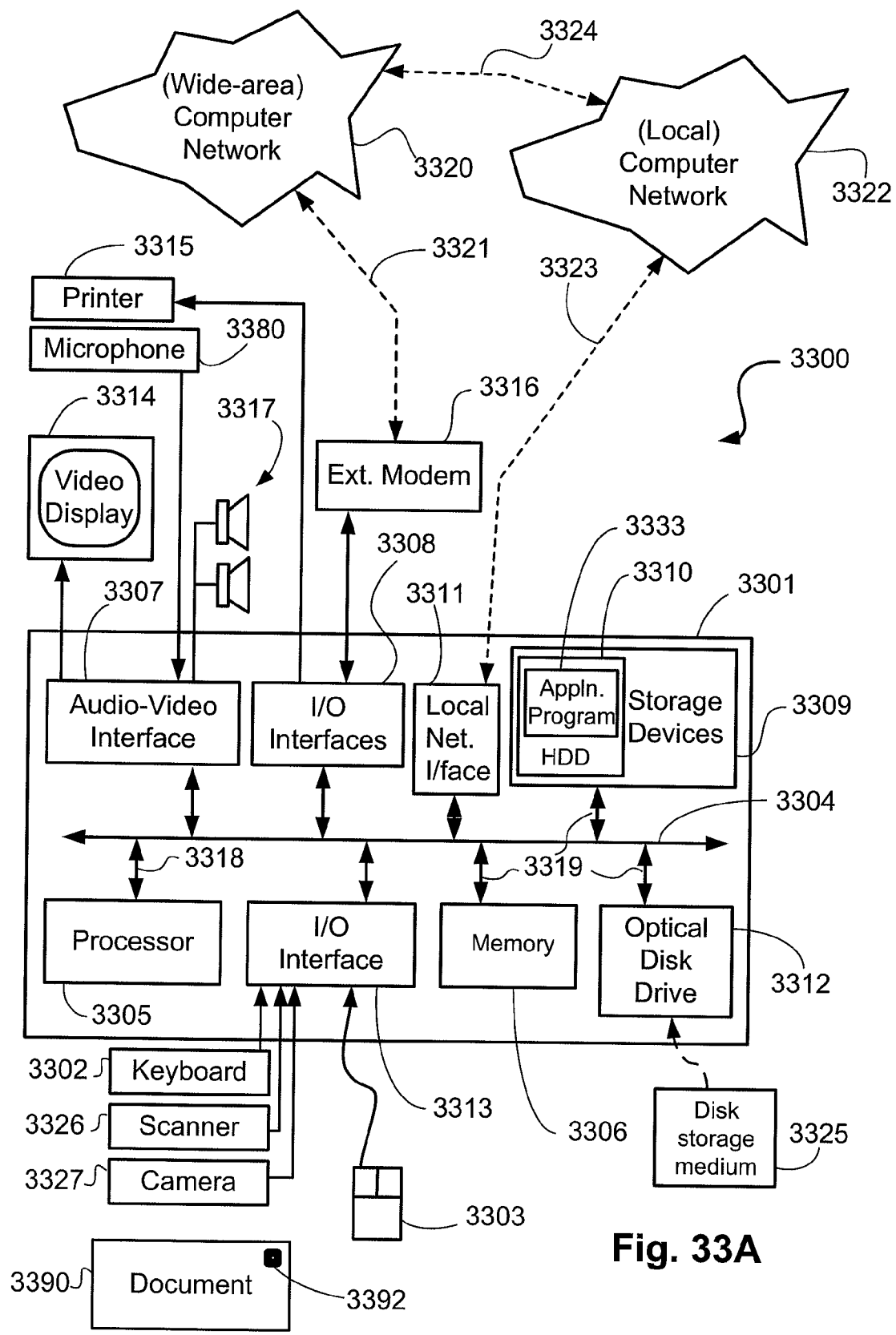
FIGS. 33A and 33B form a schematic block diagram of a general purpose computer system upon which the arrangements described can be practiced.
Figure 33B:
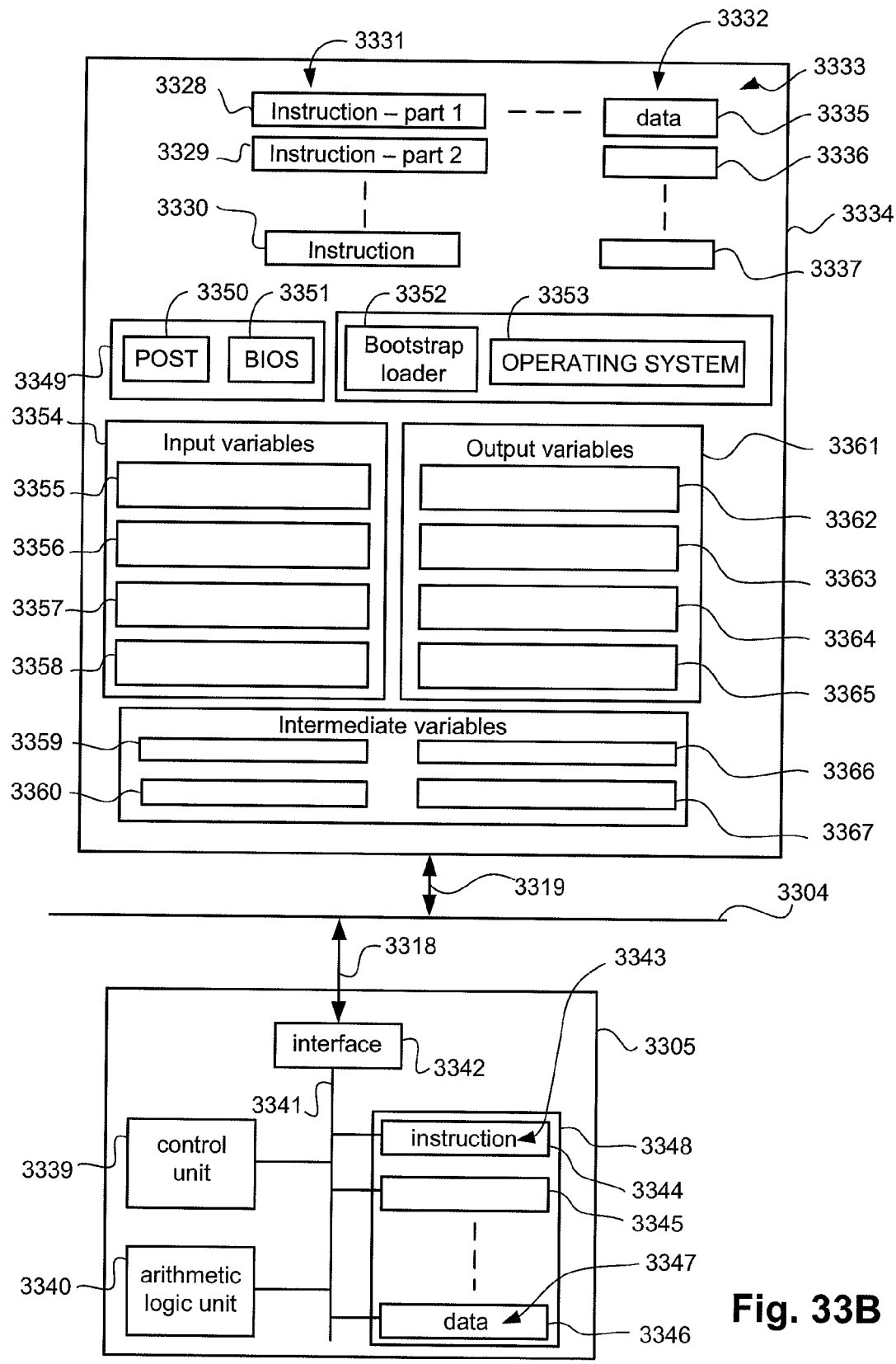

FIGS. 33A and 33B collectively form a schematic block diagram of a general purpose computer system 3300, upon which the various arrangements described can be practiced.

As seen in FIG. 33A, the computer system 3300 is formed by a computer apparatus module 3301, input devices such as a keyboard 3302, a mouse pointer device 3303, a scanner 3326, a camera 3327, and a microphone 3380, and output devices including a printer 3315, a display device 3314 and loudspeakers 3317. An external Modulator-Demodulator (Modem) transceiver device 3316 may be used by the computer module 3301 for communicating to and from a communications network 3320 via a connection 3321. The network 3320 may be a wide-area network (WAN), such as the Internet or a private WAN. Where the connection 3321 is a telephone line, the modem 3316 may be a traditional "dial-up" modem. Alternatively, where the connection 3321 is a high capacity (eg: cable) connection, the modem 3316 may be a broadband modem. A wireless modem may also be used for wireless connection to the network 3320.

The computer appratus 3301 typically includes at least one processor unit 3305, and a memory unit 3306 for example formed from semiconductor random access memory (RAM) and semiconductor read only memory (ROM). The module 3301 also includes an number of input/output (I/O) interfaces including an audio-video interface 3307 that couples to the video display 3314, loudspeakers 3317 and microphone 3380, an I/O interface 3313 for the keyboard 3302, mouse 3303, scanner 3326, camera 3327 and optionally a joystick (not illustrated), and an interface 3308 for the external modem 3316 and printer 3315. In some implementations, the modem 3316 may be incorporated within the computer module 3301, for example within the interface 3308. The computer module 3301 also has a local network interface 3311 which, via a connection 3323, permits coupling of the computer system 3300 to a local computer network 3322, known as a Local Area Network (LAN). As also illustrated, the local network 3322 may also couple to the wide network 3320 via a connection 3324, which would typically include a so-called "firewall" device or device of similar functionality. The interface 3311 may be formed by an Ethernet™ circuit card, a Bluetooth™ wireless arrangement or an IEEE 802.11 wireless arrangement.

The interfaces 3308 and 3313 may afford either or both of serial and parallel connectivity, the former typically being implemented according to the Universal Serial Bus (USB) standards and having corresponding USB connectors (not illustrated). Storage devices 3309 are provided and typically include a hard disk drive (HDD) 3310. Other storage devices such as a floppy disk drive and a magnetic tape drive (not illustrated) may also be used. An optical disk drive 3312 is typically provided to act as a non-volatile source of data. Portable memory devices, such optical disks (eg: CD-ROM, DVD), USB-RAM, and floppy disks for example may then be used as appropriate sources of data to the system 3300.

The components 3305 to 3313 of the computer module 3301 typically communicate via an interconnected bus 3304 and in a manner which results in a conventional mode of operation of the computer system 3300 known to those in the relevant art. Examples of computers on which the described arrangements can be practised include IBM-PC's and compatibles, Sun Sparcstations, Apple Mac™ or alike computer systems evolved therefrom.

Figure 4:
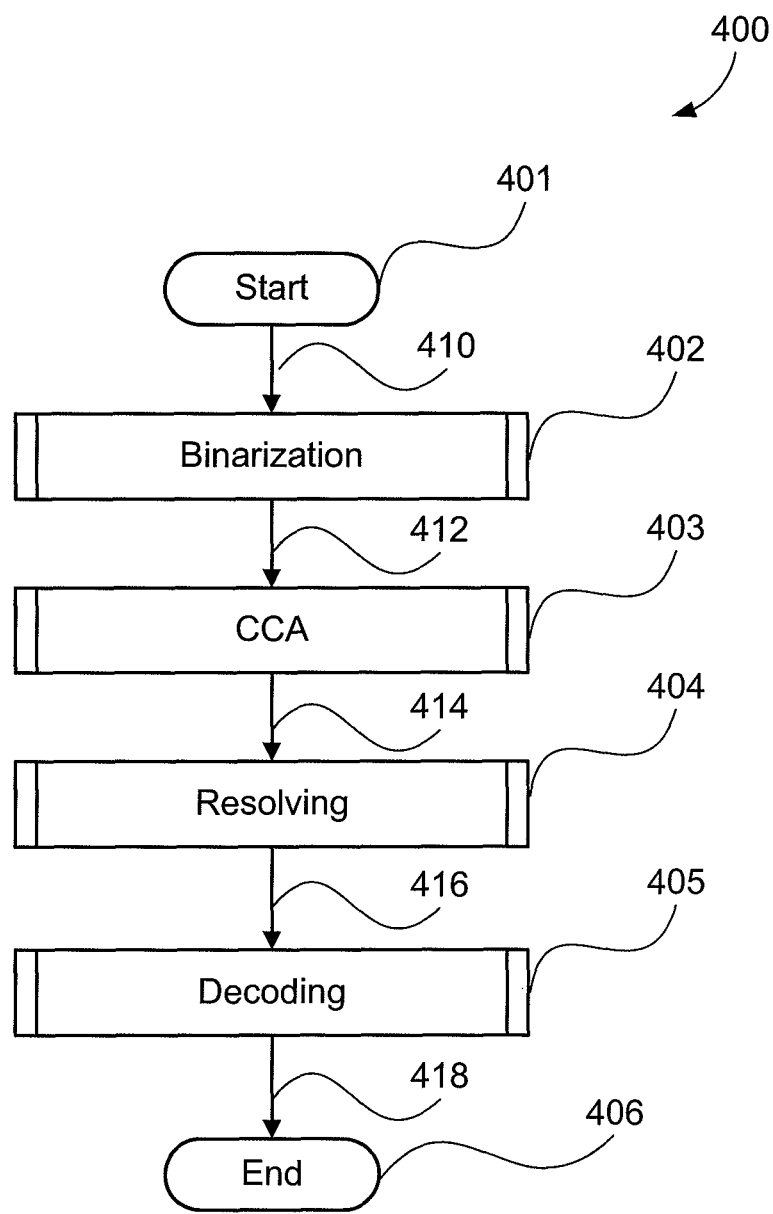
FIG. 4 is a flowchart of a QR code decoding process.
Figure 55:
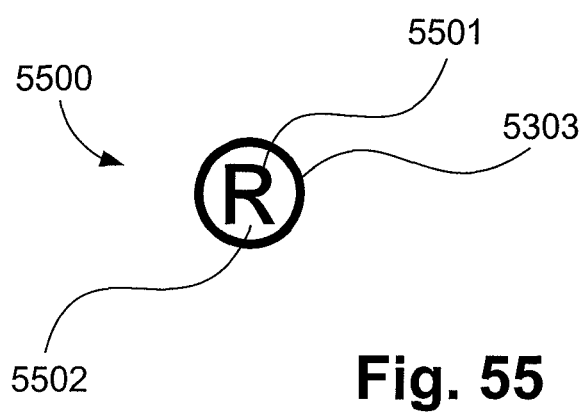
FIG. 55 shows a registered trademark symbol.

The methods of QR code decoding may be implemented using the computer system 3300 wherein the processes of FIGS. 4 to 55, to be described, may be implemented as one or more software application programs 3333 executable within the computer system 3300. In particular, the steps of the methods of QR code decoding are effected by instructions 3331 in the software 3333 that are carried out within the computer system 3300. The software instructions 3331 may be formed as one or more code modules, each for performing one or more particular tasks. The software may also be divided into two separate parts, in which a first part and the corresponding code modules performs the QR code decoding methods and a second part and the corresponding code modules manage a user interface between the first part and the user.

The software 3333 is generally loaded into the computer system 3300 from a computer readable medium, and is then typically stored in the HDD 3310, as illustrated in FIG. 33A, or the memory 3306, after which the software 3333 can be executed by the computer system 3300. In some instances, the application programs 3333 may be supplied to the user encoded on one or more CD-ROM 3325 and read via the corresponding drive 3312 prior to storage in the memory 3310 or 3306. Alternatively the software 3333 may be read by the computer system 3300 from the networks 3320 or 3322 or loaded into the computer system 3300 from other computer readable media. Computer readable storage media refers to any storage medium that participates in providing instructions and/or data to the computer system 3300 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 3301. Examples of computer readable transmission media that may also participate in the provision of software, application programs, instructions and/or data to the computer module 3301 include radio or infra-red transmission channels as well as a network connection to another computer or networked device, and the Internet or Intranets including e-mail transmissions and information recorded on Websites and the like.

The second part of the application programs 3333 and the corresponding code modules mentioned above may be executed to implement one or more graphical user interfaces (GUIs) to be rendered or otherwise represented upon the display 3314. Through manipulation of typically the keyboard 3302 and the mouse 3303, a user of the computer system 3300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 3317 and user voice commands input via the microphone 3380.

FIG. 33B is a detailed schematic block diagram of the processor 3305 and a "memory" 3334. The memory 3334 represents a logical aggregation of all the memory devices (including the HDD 3310 and semiconductor memory 3306) that can be accessed by the computer module 3301 in FIG. 33A.

When the computer module 3301 is initially powered up, a power-on self-test (POST) program 3350 executes. The POST program 3350 is typically stored in a ROM 3349 of the semiconductor memory 3306. A program permanently stored in a hardware device such as the ROM 3349 is sometimes referred to as firmware. The POST program 3350 examines hardware within the computer module 3301 to ensure proper functioning, and typically checks the processor 3305, the memory (3309, 3306), and a basic input-output systems software (BIOS) module 3351, also typically stored in the ROM 3349, for correct operation. Once the POST program 3350 has run successfully, the BIOS 3351 activates the hard disk drive 3310. Activation of the hard disk drive 3310 causes a bootstrap loader program 3352 that is resident on the hard disk drive 3310 to execute via the processor 3305. This loads an operating system 3353 into the RAM memory 3306 upon which the operating system 3353 commences operation. The operating system 3353 is a system level application, executable by the processor 3305, to fulfil various high level functions, including processor management, memory management, device management, storage management, software application interface, and generic user interface.

The operating system 3353 manages the memory (3309, 3306) in order to ensure that each process or application running on the computer module 3301 has sufficient memory in which to execute without colliding with memory allocated to another process. Furthermore, the different types of memory available in the system 3300 must be used properly so that each process can run effectively. Accordingly, the aggregated memory 3334 is not intended to illustrate how particular segments of memory are allocated (unless otherwise stated), but rather to provide a general view of the memory accessible by the computer system 3300 and how such is used.

The processor 3305 includes a number of functional modules including a control unit 3339, an arithmetic logic unit (ALU) 3340, and a local or internal memory 3348, sometimes called a cache memory. The cache memory 3348 typically includes a number of storage registers 3344-3346 in a register section. One or more internal buses 3341 functionally interconnect these functional modules. The processor 3305 typically also has one or more interfaces 3342 for communicating with external devices via the system bus 3304, using a connection 3318.

The application program 3333 includes a sequence of instructions 3331 that may include conditional branch and loop instructions. The program 3333 may also include data 3332 which is used in execution of the program 3333. The instructions 3331 and the data 3332 are stored in memory locations 3328-3330 and 3335-3337 respectively. Depending upon the relative size of the instructions 3331 and the memory locations 3328-3330, a particular instruction may be stored in a single memory location as depicted by the instruction shown in the memory location 3330. Alternately, an instruction may be segmented into a number of parts each of which is stored in a separate memory location, as depicted by the instruction segments shown in the memory locations 3328-3329.

In general, the processor 3305 is given a set of instructions which are executed therein. The processor 3305 then waits for a subsequent input, to which it reacts to by executing another set of instructions. Each input may be provided from one or more of a number of sources, including data generated by one or more of the input devices 3302, 3303, data received from an external source across one of the networks 3320, 3322, data retrieved from one of the storage devices 3306, 3309 or data retrieved from a storage medium 3325 inserted into the corresponding reader 3312. The execution of a set of the instructions may in some cases result in output of data. Execution may also involve storing data or variables to the memory 3334.

The disclosed QR code decoding arrangements use input variables 3354, that are stored in the memory 3334 in corresponding memory locations 3355-3358. The QR code decoding arrangements produce output variables 3361, that are stored in the memory 3334 in corresponding memory locations 3362-3365. Intermediate variables may be stored in memory locations 3359, 3360, 3366 and 3367.

The register section 3344-3346, the arithmetic logic unit (ALU) 3340, and the control unit 3339 of the processor 3305 work together to perform sequences of micro-operations needed to perform "fetch, decode, and execute" cycles for every instruction in the instruction set making up the program 3333. Each fetch, decode, and execute cycle comprises:

(a) a fetch operation, which fetches or reads an instruction 3331 from a memory location 3328;

(b) a decode operation in which the control unit 3339 determines which instruction has been fetched; and (c) an execute operation in which the control unit 3339 and/or the ALU 3340 execute the instruction.

Thereafter, a further fetch, decode, and execute cycle for the next instruction may be executed. Similarly, a store cycle may be performed by which the control unit 3339 stores or writes a value to a memory location 3332.

Each step or sub-process in the processes of FIGS. 4 to 55 is associated with one or more segments of the program 3333, and is performed by the register section 3344-3347, the ALU 3340, and the control unit 3339 in the processor 3305 working together to perform the fetch, decode, and execute cycles for every instruction in the instruction set for the noted segments of the program 3333.

The methods of code detection and decoding and QR code decoding may alternatively be implemented in dedicated hardware such as one or more integrated circuits performing the functions or sub functions of QR code decoding. Such dedicated hardware may include graphic processors, digital signal processors, or one or more microprocessors and associated memories.

QR Code Decoding System

Typically for QR code decoding, as seen in FIG. 33A, a document 3390 having at least one QR code formed thereon is scanned by the scanner 3326 or captured by the camera 3327 to deliver to the computer 3301 via the interface 3313 an acquired image of the document 3390, the image being stored in the memory 3334 as the input variable 3355. Using the image stored in that storage location, and also in other storage locations including those mentioned above, QR code decoding proceeds under control of the application program and the processing performed by the processor 3305, as will now be described.

Decoding Flow & Binarization

A method 400 of decoding one or more QR codes in an acquired image is described with reference to FIG. 4. The method 400 forms the basis of the application program as executed by the processor 3305.

The process 400 of decoding one or more QR codes in the acquired image begins at an initial step 401 in which an image 410 with QR codes is input as discussed above. The image may be acquired from a flatbed scanner, or a digital camera, or by any other means of obtaining a digital representation of an image, such as downloading an image via the networks 3320, 3322. The image may be stored in the HDD 3310 by operation of the processor 3305.

Step 401 is followed by a binarization step 402, during which a binarized image 412 is generated by the processor 3305 from the acquired image 410. The binarized image may be stored as the intermediate variable 3359. The binarization step 402 employs a binarization algorithm that labels each pixel in the acquired image as either 'black' or 'white' by examining the intensity of the pixel in relation to other pixels in the acquired image. There are many well-known binarization algorithms available in the art, and any algorithm that labels pixels as either 'black' or 'white' based on the pixel intensity may be employed at the step 402.

At a following step 403, FPs in the binarized image 412 are located by employing a method of Connected Component Analysis (CCA). The CCA stage 403 outputs a list 414 of detected FPs. The method of performing CCA to detect FPs disclosed herein provides much higher robustness to typical print-scan distortions such as dot-gain in comparison to prior FP detection methods. The CCA FP detection algorithm is described in detail later.

At a following step 404, the list 414 of detected FPs output from the previous stage 403 is processed using the processor 3305 to resolve the FPs into QR code regions 416. This process of grouping FPs into QR code regions is referred to as 'resolving'.

In the arrangements presently disclosed, two resolving algorithms are employed. The first, referred to as '3/3 resolving', forms QR code regions from groups of three detected finder patterns. The second resolving algorithm, referred to as '2/3 resolving', determines the possible QR code regions that could exist if it is assumed that one FP of QR codes is not detected. By generating the possible QR code regions arising from this assumption, QR code regions can be resolved when only two of three finder patterns are initially detected by applying a later missing FP recovery step. This allows the realisation of a QR code decoding system that is overall far more robust than those of the prior art. Both 3/3 and 2/3 resolving algorithms will be explained in detail later.

At a following step 405, an attempt is made to extract encoded information 418 in each candidate QR code region. If the candidate QR code region comprises three detected FPs (the output of the 3/3 resolving algorithm), then the modules of the QR code region are sampled and information extracted using conventional, well-known methods. Otherwise, if the candidate QR code region comprises only two FPs (the output of 2/3 resolving), then an attempt is made to acquire the third 'missing' FP. This process leverages additional information about detected finder patterns that is made available from the CCA FP detection method employed at step 403 and will be described in detail later. If a third finder pattern is acquired successfully, the QR code is sampled and information extracted through conventional, well-known methods. The process of extracting encoded information from a QR code region is known as 'decoding'.

The process for decoding one or more QR codes in an acquired image is terminated at a final step 406.

Connected Components Analysis (CCA)

The process of connected components analysis (CCA) employed at step 403 of the decoding process 400 is now described in detail.

Connected Components Analysis (CCA) is a generic name for processes that identify continuous coloured or like-coloured regions in an image, such as black and/or white regions. The arrangements presently disclosed employ a specific CCA that provides a much more robust FP detection method than that of the prior art, especially in the case where QR codes have been repeatedly printed and scanned. The CCA FP detection method 403 also facilitates the application of a resolving algorithm (employed at step 404) that is more efficient and precise than that of the prior art. The damaged FP recovery algorithm employed at step 405 is also facilitated by the use of the CCA FP detector 403.

The CCA algorithm employed at step 403 and implemented using the processor 3305 groups pixels with the same intensity in the binarized image 412 generated at step 402 so that continuous 'black' or 'white' regions are identified. Specifically, the CCA algorithm inspects each scanline of the binarized image 412 sequentially from the topmost scanline to the bottommost scanline. Consecutive black pixels are referred to as a single 'run'. For a given scanline, each run is inspected to determine if it is connected to a run on a previous scanline. This is achieved by checking the left-most and right-most extents of the run, and determining if these extents overlap left-most and right-most extents of any run on the previous scanline. If the run is not connected to a previous run, then the run is established as the beginning of a new connected component (CC). Otherwise, if the run is connected to a previous run, then the previous run is a member of a previously established CC, and the run on the current subject scanline is appended to the previously established CC.

In the case where a run on current subject scanline connects two or more runs on the previous scanline, then all the CCs with runs connected to the run on the current subject scanline are merged to form a single CC. Thus, objects that begin with several disjoint components that come together at a lower point in the image may still be identified as being a single CC.

When a CC no longer has connected runs on a subject scanline, then the CC will be 'terminated'. That is, the CC is considered complete, as all of the pixels that belong to that CC have been identified.

The CCA algorithm employed at step 403 detects QR finder patterns by searching for CC configurations where one continuous black CC is completely enclosed by a continuous white CC that is in turn completely surrounded by a further black CC. This enclosure relationship is detected by a simple check performed when a CC is terminated. When terminated, a subject CC is checked to determine if there is another CC with left-, right-, top- and bottom-most extents that places it within the extents of the subject CC. If a CC exists within the bounds of the subject CC, then both CCs are appended to the output list as a candidate FP. Otherwise, the CCs are discarded.

Detecting QR finder patterns by searching for their topological relationship, i.e. the fact that they are composed of one black CC enclosed entirely within another, allows the above-described CCA method to provide far more robustness to print-scan introduced distortions than the methods of the prior art which rely heavily on the ideal expected appearance 100 of FPs. Another feature of the above-described CCA method is that several useful FP metrics may be efficiently computed, and these can be applied to great advantage in the later resolving 404 and decoding 405 steps of the process 400. Specifically, at least the following information, referred to as 'metadata', about detected FPs is determined:

(i) Coordinates of the FP centre (average centre coordinates of the black connected components 101 and 103 of the FP 100);

(ii) Size of black modules in the FP 100 (the stroke width of the black connected component 101);

(iii) Size of white modules in the FP 100 (the stroke width of the white connected component 102);

(iv) Rotation of the FP 100 (this angle is modulo-90° and essentially corresponds to the angle of the sides of the CCs 101 and 102 that is between zero and 90° with respect to the coordinate system in use);

(v) Confidence of the FP 100 (this is calculated by comparing the appearance of the FP with the ideally expected appearance 100. FPs closely resembling the expected appearance will have confidences toward 100%); and (vi) Bounding box of the FP 100 (the left-, right-, top- and bottom-most extents of the outer black CC 101).

The FPs identified by the CCA method 403 are formed into the list 414 in which each list entry may be supplemented by some or all of the metadata associated therewith.

General Resolving

Figure 5:
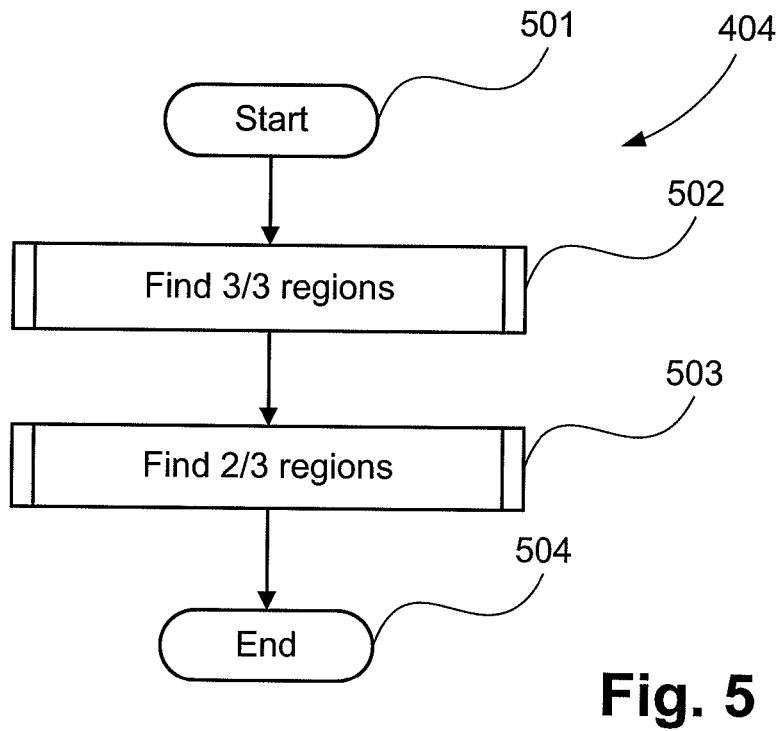
FIG. 5 is a flowchart giving a general overview on a resolving process employed at step 404 of FIG. 4.

A detailed description of the resolving process 404, is now described with reference to FIG. 5. The resolving process 404 begins at an initial step 501 in which the list 414 of detected FPs are input.

At a following step 502, FPs are grouped into triplets, and checks are performed to determine if the triplet forms a valid candidate 3/3 QR code region.

At a following step 503, FPs are grouped into pairs, and checks are performed to determine if the pairs form a valid candidate 2/3 QR code region.

The processes employed at steps 502 and 503 are described in detail later.

The process 404 of resolving terminates at a final step 504.

3/3 Resolving

Figure 9:
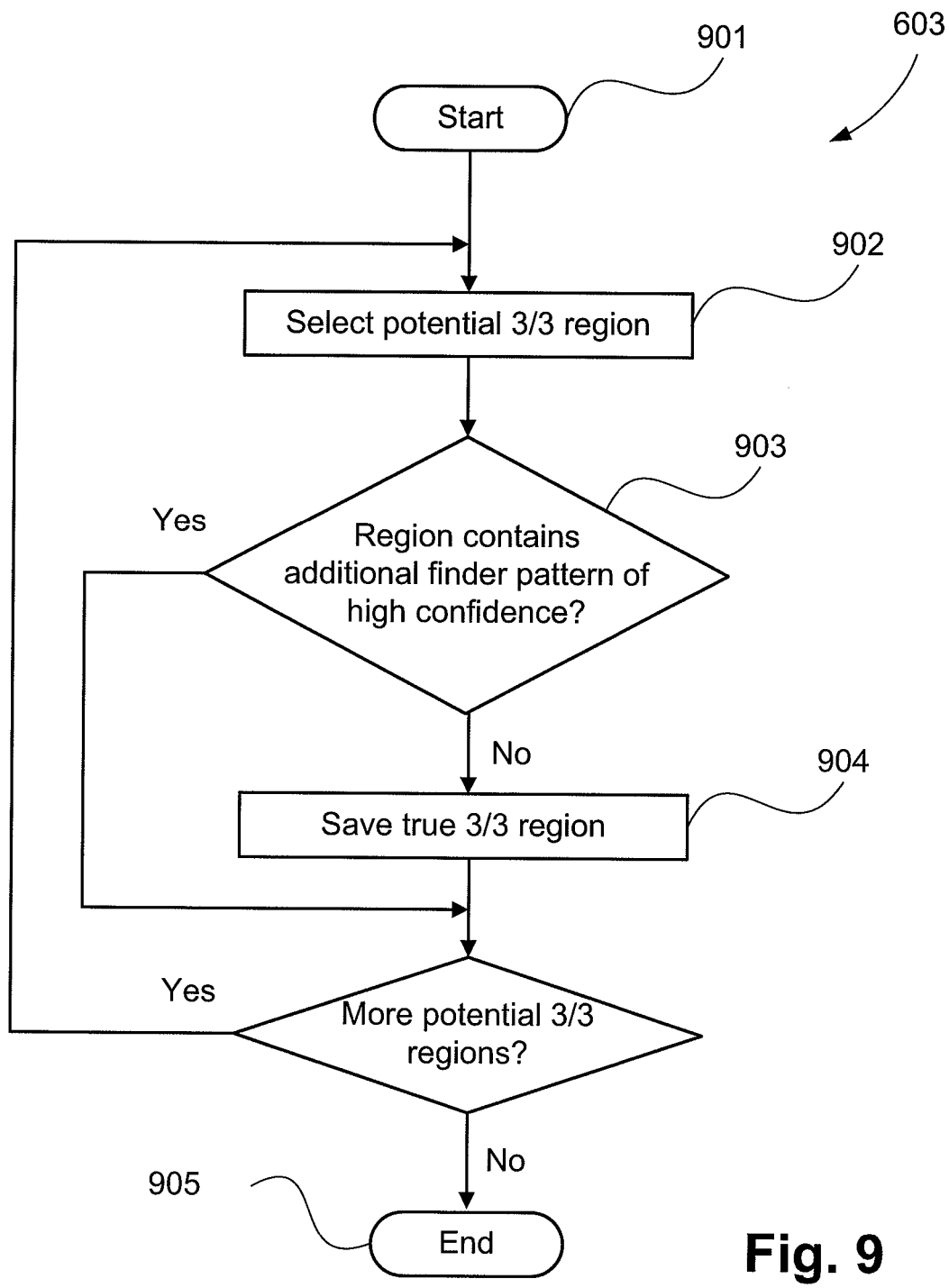
FIG. 9 is a flowchart showing a process employed at 603 for finding 'true' 3/3 regions.

The process for forming candidate 3/3 code regions, as employed at step 502, is described with reference to FIGS. 6, 7 and 9. At this point, two pre-determined parameters are introduced that allow some tolerance to warping and misalignment in the resolving method. These parameters are denoted as $tolerance_{angle}$ and $tolerance_{magnitude}$, and both may be set to 0.2. These tolerances provide for the angles and distances to vary by 20% and yet still permit the QR region to be resolved and thus the QR code to be detected. This permits detection in the presence of warping whilst limiting false positive detection. The tolerance may be varied as required based on a desired accuracy of the system.

Figure 6:
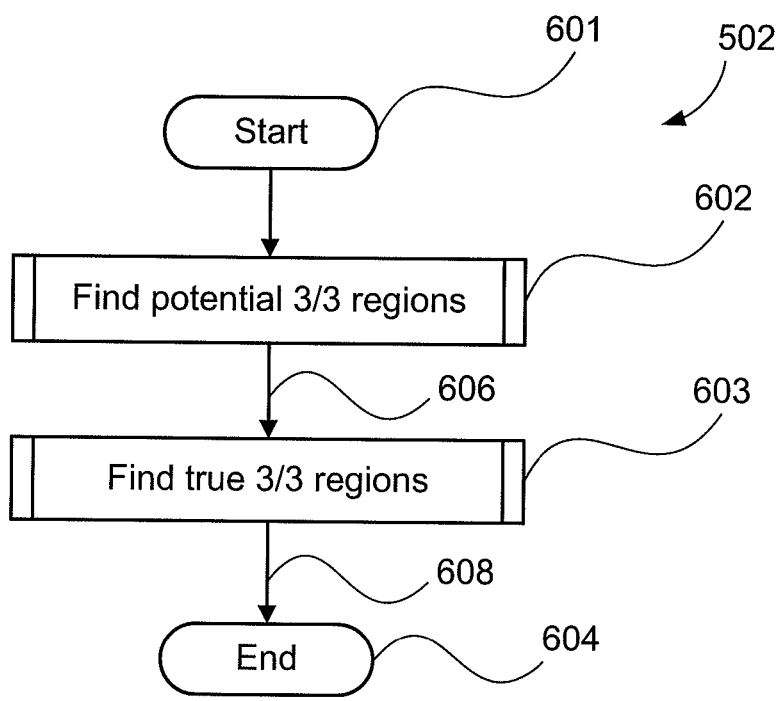
FIG. 6 is a flowchart giving a general overview of a process employed at step 502 of FIG. 5 to resolve groups of three finder patterns into a QR code regions.
Figure 7:
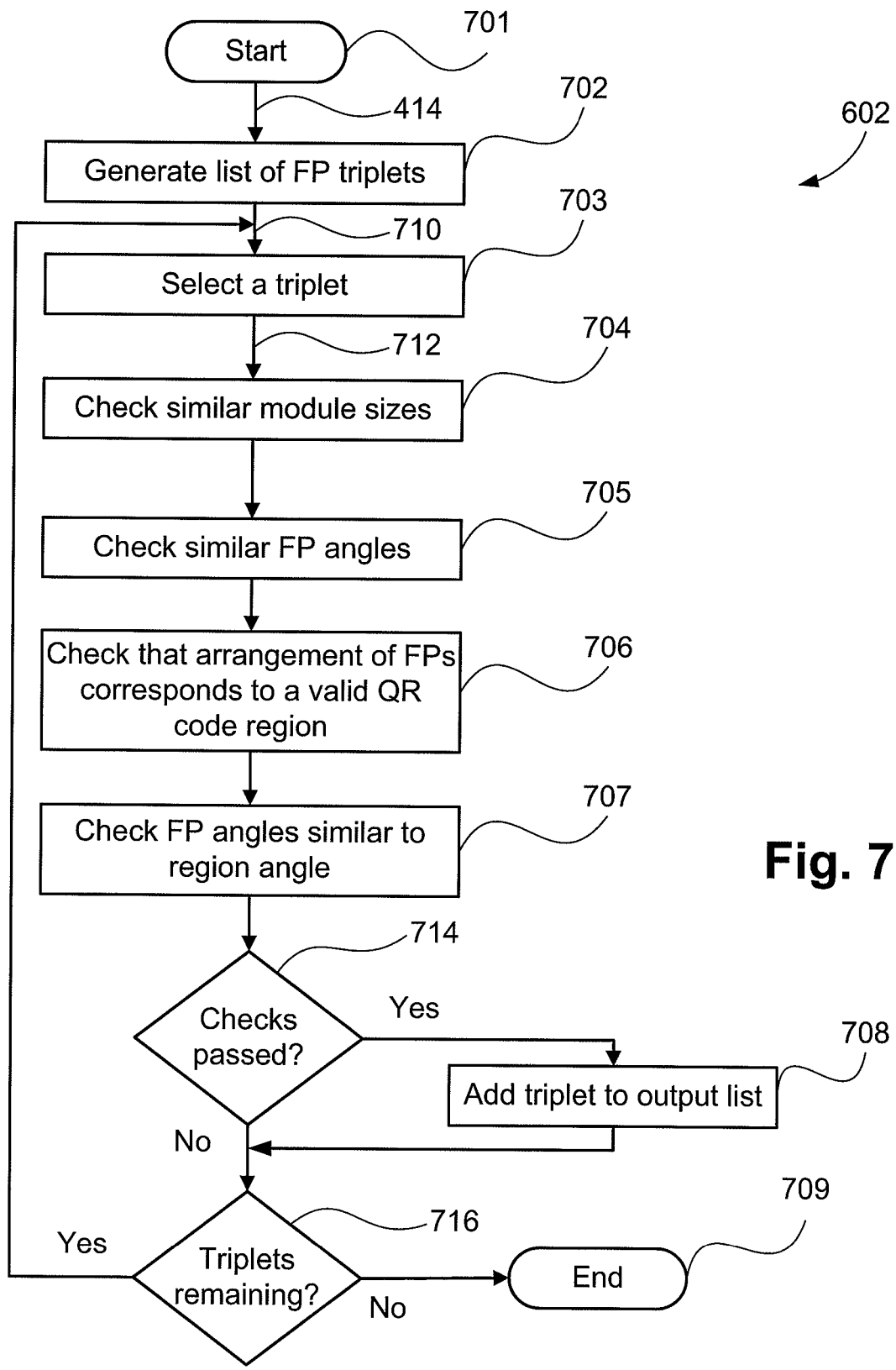
FIG. 7 is a flowchart detailing a process for checking that groups of three finder patterns may potentially form a QR code region.

Turning to FIG. 6, there is shown the general process of resolving 3/3 regions. At an initial step 601, the list 414 of detected FPs is input.

At a following step 602, triplets of detected FPs undergo a series of checks to form a list 606 of 'potential' 3/3 regions. The process for carrying out these checks is described in detail later.

At a following step 603, each potential QR code region in the list 606 of 'potential' 3/3 regions are inspected to determine if they contain an 'internal' FP. The result of step 603 is a final list 608 of candidate 3/3 QR code regions. Again, the process for carrying out step 603 is described in detail later.

The process 502 of forming candidate 3/3 code regions is terminated at a final step 604.

Find Potential 3/3 Regions

The process 602 for forming the list 606 of potential 3/3 regions, is described with reference to FIG. 7.

The process 602 begins at an initial step 701 in which the list 414 of detected FPs is input.

At a following step 702, a list 710 of triplets is generated by first finding every combination of three FPs possible from the input list 414. From each of these combinations, six triplets are formed by assigning each FP to each of the possible nominal FP positions of a QR code. That is, each FP is designated as being in the 'top-left' corner, 'top-right' corner, or 'bottom-right' of the QR code in one of the six triplets. In the following description, attributes (such as module size)

relating to the FP assigned to the top-left will be subscripted with 'tl', and similarly 'tr' and 'bl' for the top-right and bottom-left FPs respectively.

At a following step 703, a triplet 712 from the list 710 of triplets generated at step 702 is selected.

Figure 8A:
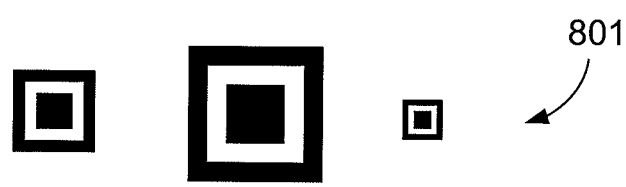
FIGS. 8A, 8B and 8C show some examples whereby the checks performed in step 602 of FIG. 6 fail.

At a following step 704, the triplet 712 is checked to determine if the three finder patterns are reasonably similar in module size. The module size is the average of the black and white module sizes made available from the CCA FP detection method employed at step 403. In FIG. 8A, an example 801 of three FPs on which this check will fail because the FP module sizes are not substantially equal. The check for similar module sizes may be represented by Pseudocode 1 below:

```
**** Pseudocode 1 **** Step 704 ****
if
(
    (
        abs(module_size_tl − module_size_tr)
        /
        min(module_size_tl, module_size_tr)
    ) <= tolerance_magnitude
    and
    (
        abs(module_size_tl − module_size_bl)
        /
        min(module_size_tl, module_size_bl)
    ) <= tolerance_magnitude
    and
    (
        abs(module_size_bl − module_size_tr)
        /
        min(module_size_bl, module_size_tr)
    ) <= tolerance_magnitude
):
    check passed
else:
    check failed
```

Figure 8B:
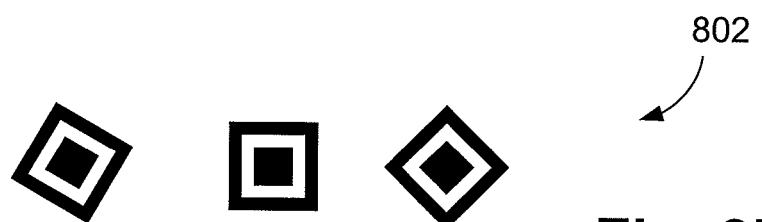

At a following step 705, the relative angles of the FPs are checked to determine if the angular orientations of the three FPs are substantially equal. As previously explained, the angle of rotation calculated for each FP is modulo $\pi/2$ radians (90°). Therefore, an adjustment is necessary to determine the smallest deviation between angles of rotation of FPs. In FIG. 8B, an example 802 of three FPs on which this check will fail because the angular orientations of the FPs are not substantially equal. This check may be performed by implementing Pseudocode 2:

```
**** Pseudocode 2 **** Step 705 ****
if
(
    (
        abs(angle_tl − angle_tr) <= tolerance_angle × pi / 2
        or
        (
            pi / 2 − max(angle_tl, angle_tr) + min(angle_tl, angle_tr)
        ) <= tolerance_angle × pi / 2
    )
    and
    (
        abs(angle_tl − angle_bl) <= tolerance_angle × pi / 2
        or
        (
            pi / 2 − max(angle_tl, angle_bl) + min(angle_tl, angle_bl)
        ) <= tolerance_angle × pi / 2
    )
    and
    (
        abs(angle_bl − angle_tr) <= tolerance_angle × pi / 2
        or
        (
            pi / 2 − max(angle_bl, angle_tr) + min(angle_bl, angle_tr)
        ) <= tolerance_angle × pi / 2
    )
):
    check passed
else:
    check failed
```

Note that 'pi' refers to the mathematical constant $\pi$.

At a following step 706, a check is performed to determine if the arrangement of three detected FPs corresponds to a valid QR code region. This is achieved by first checking that the distances between the top-left and top-right FPs, and the top-left and bottom-left FPs are substantially equal. This check may be performed by implementing Pseudocode 3:

```
**** Pseudocode 3 **** Step 706 − Part 1 ****
vector_x_tl−tr = x_tl − x_tr
vector_y_tl−tr = y_tl − y_tr
vector_mag_tl−tr = sqrt(vector_x_tl−tr² + vector_y_tl−tr²)
vector_x_tl−bl = x_tl − x_bl
vector_y_tl−bl = y_tl − y_bl
vector_mag_tl−bl = sqrt(vector_x_tl−bl² + vector_y_tl−bl²)
min_vector_mag = min(vector_mag_tl−bl, vector_x_tl−bl)
max_vector_mag = max(vector_mag_tl−bl, vector_x_tl−bl)
if max_vector_mag <= (min_vector_mag × (1 + tolerance_magnitude)):
    check passed
else:
    check failed
```

Once it has been confirmed that the lengths of the vectors between the top-left and top-right FPs, and the top-left and bottom-left FPs are substantially equal, the next step is to check that the lengths of these vectors are reasonable given the modules sizes of the FPs. Essentially, this checks that the lengths of the vectors are within those expected for QR codes of versions 1 (smallest) to 40 (largest). This check can be implemented with Pseudocode 4:

```
**** Pseudocode 4 **** Step 706 − Part 2****
module_size_average =
    (module_size_tl + module_size_tr + module_size_bl)
    /
    3
if
(
    (
        vector_mag_tl−tr × (1 + tolerance_magnitude)
        <
        14 × module_size_average
    )
    or
    (
        vector_mag_tl−tr × (1 − tolerance_magnitude)
        >
        170 × module_size_average
    )
    or
    (
        vector_mag_tl−bl × (1 + tolerance_magnitude)
        <
        14 × module_size_average
    )
    or
    (
```

```
** Pseudocode 4  Step 706 – Part 2** vector_mag_{tl-bl} × (1 − tolerance_{magnitude})
            >
            170 × module_size_average
        )
    ):
        check failed
    else:
        check passed
```

The check for a correct arrangement of detected FPs involves a check for a substantially orthogonal arrangement of FPs as well as a check that the assumed assignments of detected FPs to the top-right and bottom-left positions in the QR code region are correct. These checks may be performed by implementing Pseudocode 5:

```
** Pseudocode 5  Step 706 – Part 3 ** dot_product =
        (vector_x_{tl-tr} × vector_x_{tl-bl})
        +
        (vector_y_{tl-tr} × vector_y_{tl-bl})
cross_product_k =
        (vector_x_{tl-tr} × vector_y_{tl-bl})
        +
        (vector_y_{tl-tr} × vector_x_{tl-bl})
cos_theta = dot_product / (vector_mag_{tl-tr} × vector_mag_{tl-bl})
if cos_theta <= tolerance_{angle} and cross_product_k > 0:
    check passed
else:
    check failed
```

Figure 8C:
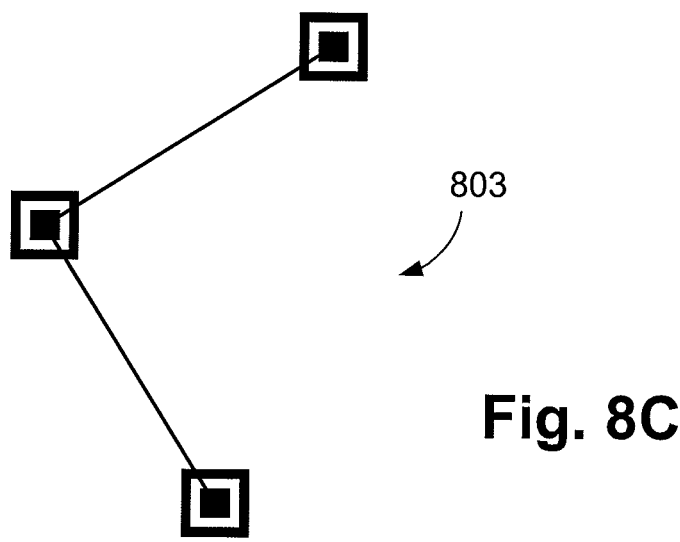

At a following step 707, a check is performed to determine if the region rotation matches the FP angles. The angle of rotation of the candidate region is defined as the vector angle between the top-left and top-right FPs. In FIG. 8C, an example 803 is shown of three FPs on which this check will fail because the angular orientations of the FPs does not match the orientation of the region. This check may be performed by implementing Pseudocode 6:

```
** Pseudocode 6 * Step 707 ** vector_angle_{tl-tr} = arctan2(vector_y_{tl-tr}, vector_x_{tl-tr})
if vector_angle_{tl-tr} < 0:
    vector_angle_{tl-tr} = vector_angle_{tl-tr} + (2 × pi)
vector_angle_{tl-tr} = ((4 × vector_angle_{tl-tr})mod(2 × pi) / 4)
if
(
    (
        abs(angle_{tl} − vector_angle_{tl-tr}) <= tolerance_{angle} × pi / 2
        or
        (
            pi / 2
            − max(angle_{tl}, vector_angle_{tl-tr})
            + min(angle_{tl}, vector_angle_{tl-tr})
        ) <= tolerance_{angle} × pi / 2
    )
    and
    (
        abs(angle_{tr} − vector_angle_{tl-tr}) <= tolerance_{angle} × pi / 2
        or
        (
            pi / 2
            − max(angle_{tr}, vector_angle_{tl-tr})
            + min(angle_{tr}, vector_angle_{tl-tr})
        ) <= tolerance_{angle} × pi / 2
    )
    and
```

```
** Pseudocode 6 * Step 707 **

(
        abs(angle_{bl} − vector_angle_{tl-tr}) <= tolerance_{angle} × pi / 2
        or
        (
            pi / 2
            − max(angle_{bl}, vector_angle_{tl-tr})
            + min(angle_{bl}, vector_angle_{tl-tr})
        ) <= tolerance_{angle} × pi / 2
    )
):
    check passed
else:
    check failed
```

If all the above checks 704-707 are successful, as tested at step 714, the triplet 712 of FPs is appended to an output list 606 of potential 3/3 regions at step 708. Note that each output potential region has associated with it a confidence value based on the confidences of the region's three FPs. This confidence can be calculated by implementing Pseudocode 7:

```
** Pseudocode 7 ** confidence_{region} = (confidence_{tl} + confidence_{tr} + confidence_{bl}) / 3
```

The confidence value can be appended to the metadata for each FP in the list potential FPs.

If there are remaining triplets in the list of triplets generated at step 702, tested at step 716, processing returns to step 703. Otherwise, if all triplets have been processed, then the process 602 of forming the list 606 of potential 3/3 regions, is terminated at a final step 709.

Find True Regions

Figure 10A:
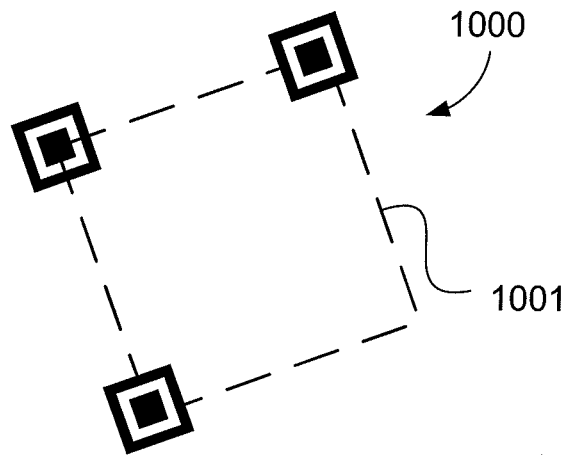
FIGS. 10A, 10B and 10C show examples of QR code regions with and without internal finder patterns.
Figure 10B:
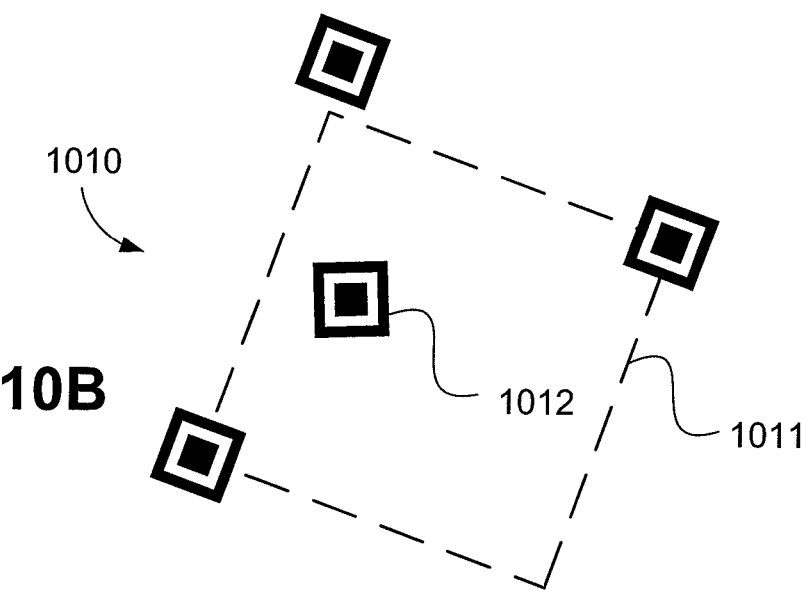
Figure 10C:
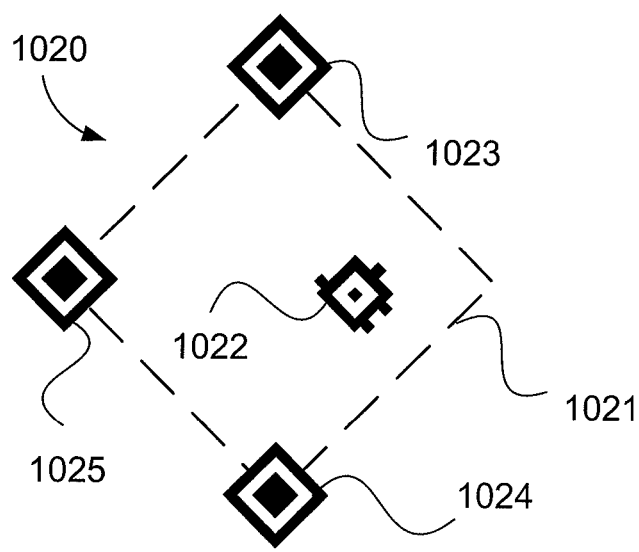

The process 603 for forming a list of true 3/3 regions, is described with reference to FIG. 9. Valid QR code regions cannot contain additional detected finder patterns. Based on this requirement, the QR code region 1000 of FIG. 10A is a valid region, as there are no additional detected finder patterns within the bounds 1001 of the region 1000. The QR code region 1010 seen in FIG. 10B is not a valid QR code region as the region contains an additional detected FP 1012 with the region bounds 1011. An exception is made when the confidence of an 'internal' FP is considerably less than that of the three FPs of the region. This is because, in some rare cases, alignment patterns 1022 can be detected as finder patterns as shown in 1020 of FIG. 10C. In this situation the confidence of the alignment pattern 1022 will be considerably lower than those of the detected finder patterns 1023, 1024 and 1025.

Turning back to FIG. 9, the process 603 of finding true 3/3 regions begins at an initial step 901 in which lists 606 of potential 3/3 regions and detected FPs are input.

At a following step 902, a potential 3/3 region 910 is selected from the list 606 input in step 901.

At a following step 903, it is determined whether the potential 3/3 region contains an additional finder pattern of high confidence. Essentially, all of the detected finder patterns except for the finder patterns forming the potential code region are checked to determine if they are inside the extents of the potential 3/3 region.

Figure 11:
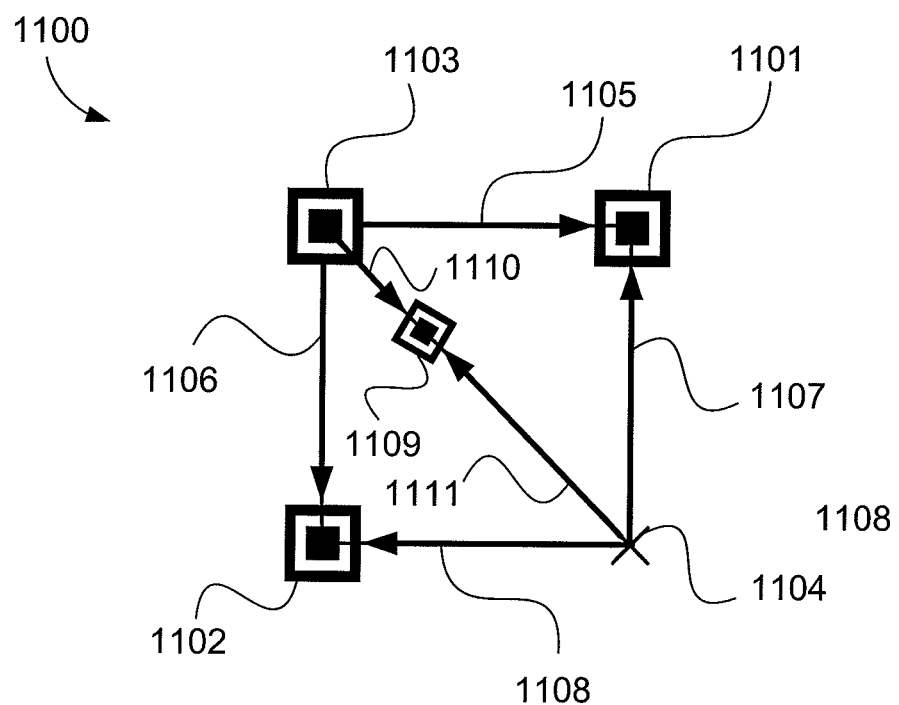
FIG. 11 shows vectors used to determine if a 3/3 QR code region contains an internal finder pattern.

The processes for determining if a particular finder pattern is within a potential code region will now be described. FIG. 11 shows a QR code region 1100 comprised of top-left 1103, top-right 1101 and bottom-left 1102 FPs. A finder pattern 1109 is to be checked to determine if it is within the region

1100. First, vectors 1105 and 1106 between the top-left FP 1103 and the top-right 1101 and bottom-left 1102 FPs respectively are calculated. This can be achieved by implementing Pseudocode 8:

---
**\*\*\*\* Pseudocode 8 \*\*\*\***

$$\text{vector\_x}_{tl-tr} = x_{tl} - x_{tr}$$
$$\text{vector\_y}_{tl-tr} = y_{tl} - y_{tr}$$
$$\text{vector\_x}_{tl-bl} = x_{tl} - x_{bl}$$
$$\text{vector\_y}_{tl-bl} = y_{tl} - y_{bl}$$

---

The position of the unknown corner of the region 1104 is then calculated, as shown in Pseudocode 9:

---
**\*\*\*\* Pseudocode 9 \*\*\*\***

$$x_{br} = x_{tl} + \text{vector\_x}_{tl-bl} + \text{vector\_x}_{tl-tr}$$
$$y_{br} = y_{tl} + \text{vector\_y}_{tl-bl} + \text{vector\_y}_{tl-tr}$$

---

Next, vectors 1107 and 1108 between the bottom-right corner of the region 1104 and the top-right 1101 and bottom-left 1102 FPs respectively are calculated. This can be achieved by implementing Pseudocode 10:

---
**\*\*\*\* Pseudocode 10 \*\*\*\***

$$\text{vector\_x}_{br-tr} = -\text{vector\_x}_{tl-bl}$$
$$\text{vector\_y}_{br-tr} = -\text{vector\_y}_{tl-bl}$$
$$\text{vector\_x}_{br-bl} = -\text{vector\_x}_{tl-tr}$$
$$\text{vector\_y}_{br-bl} = -\text{vector\_y}_{tl-tr}$$

---

Vectors 1110 and 1111 from the top-left 1103 and bottom-right 1104 corners of the region to the additional finder pattern to be checked 1109 are then constructed. This can be achieved with Pseudocode 11:

---
**\*\*\*\* Pseudocode 11 \*\*\*\***

$$\text{vector\_x}_{tl-fp} = x_{fp} - x_{tl}$$
$$\text{vector\_y}_{tl-fp} = y_{fp} - y_{tl}$$
$$\text{vector\_x}_{br-fp} = x_{fp} - x_{br}$$
$$\text{vector\_y}_{br-fp} = y_{fp} - y_{br}$$

---

Finally, it is determined whether the additional FP 1109 lies within the region 1100 by determining the following conditions:

1. if the angle of the vector 1110 between the top-left FP 1103 and the additional finder pattern 1109 is between the angles of the vectors 1105 and 1106 between the top-left FP 1103 and the top-right 1101 and bottom left 1102 FPs respectively; and
2. if the angle of the vector 1111 between the bottom right corner 1104 and the additional finder pattern 1109 is between the angles of the vectors 1107 and 1108 between the bottom right corner 1104 and the top-right 1101 and bottom left 1102 FPs respectively.

If both conditions (1) and (2) are found to be true, then it is determined that the FP 1109 does lie within the region 1100. This check can be accomplished by implementing Pseudocode 12:

---
**\*\*\*\* Pseudocode 12 \*\*\*\***

```
vector_angle_{tl-tr} = arctan2(vector_y_{tl-tr}, vector_x_{tl-tr})
if vector_angle_{tl-tr} < 0:
    vector_angle_{tl-tr} = vector_angle_{tl-tr} + (2 x pi)
vector_angle_{tl-bl} = arctan2(vector_y_{tl-bl}, vector_x_{tl-bl})
if vector_angle_{tl-bl} < 0:
    vector_angle_{tl-bl} = vector_angle_{tl-bl} + (2 x pi)
vector_angle_{br-tr} = arctan2(vector_y_{br-tr}, vector_x_{br-tr})
if vector_angle_{br-tr} < 0:
    vector_angle_{br-tr} = vector_angle_{br-tr} + (2 x pi)
vector_angle_{br-bl} = arctan2(vector_y_{br-bl}, vector_x_{br-bl})
if vector_angle_{br-bl} < 0:
    vector_angle_{br-bl} = vector_angle_{br-bl} + (2 x pi)
vector_angle_{br-fp} = arctan2(vector_y_{br-fp}, vector_x_{br-fp})
if vector_angle_{br-fp} < 0:
    vector_angle_{br-fp} = vector_angle_{br-fp} + (2 x pi)
vector_angle_{tl-fp} = arctan2(vector_y_{tl-fp}, vector_x_{tl-fp})
if vector_angle_{tl-fp} < 0:
    vector_angle_{tl-fp} = vector_angle_{tl-fp} + (2 x pi)
min_vector_angle_{tl} = min(vector_angle_{tl-tr}, vector_angle_{tl-bl})
max_vector_angle_{tl} = max(vector_angle_{tl-tr}, vector_angle_{tl-bl})
min_vector_angle_{br} = min(vector_angle_{br-tr}, vector_angle_{br-bl})
max_vector_angle_{br} = max(vector_angle_{br-tr}, vector_angle_{br-bl})
if
(
    max_vector_angle_{tl} - min_vector_angle_{tl}
    <
    (
        2 x pi
        -
        max_vector_angle_{tl}
        +
        min_vector_angle_{tl}
    )
):
    if
    (
        vector_angle_{tl-fp} >= min_vector_angle_{tl}
        and
        vector_angle_{tl-fp} <= max_vector_angle_{tl}
    ):
        top left check passed
    else:
        top left check failed
else:
    if
    (
        vector_angle_{tl-fp} >= max_vector_angle_{tl}
        or
        vector_angle_{tl-fp} <= min_vector_angle_{tl}
    ):
        top left check passed
    else:
        top left check failed
if
(
    max_vector_angle_{br} - min_vector_angle_{br}
    <
    (
        2 x pi
        -
        max_vector_angle_{br}
        +
        min_vector_angle_{br}
    )
):
    if
    (
        vector_angle_{br-fp} >= min_vector_angle_{br}
        and
        vector_angle_{br-fp} <= max_vector_angle_{br}
    ):
        bottom right check passed
    else:
        bottom right check failed
else:
    if
    (
        vector_angle_{br-fp} >= max_vector_angle_{br}
        or
```

```
                ** Pseudocode 12 ** vector_angle_{br-fp} <= min_vector_angle_{br}
    ):
        bottom right check passed
    else:
        bottom right check failed
if
(
    top left check passed
    and
    bottom right check passed
):
    check passed
else:
    check failed
```

The fact that QR codes must contain a 4 module size quiet region surrounding them can be exploited to enlarge potential 3/3 code regions for the purposes of the internal FP check of step 903. This will reduce the number of false positive 3/3 regions that are identified as true 3/3 regions. Typically, an additional finder pattern cannot occur within approximately 11 module sizes of the centres of detected finder patterns of a code region. This takes into account both the 4 module quiet zone and the width of two half finder patterns (7 modules). The size of the potential 3/3 region used for the internal FP check could thus be enlarged by moving the four corners of the region outward by approximately 11 module sizes.

If it is determined that a potential 3/3 region contains an additional detected finder pattern, it is then determined whether the confidence of the additional detected finder pattern is considerably less than that of the detected finder patterns of the region. This check can be accomplished by implementing Pseudocode 13:

```
                ** Pseudocode 13 ** if
(
    confidence_{fp}
    <
    (
        0.75
        x
        min(confidence_{tl}, confidence_{tr}, confidence_{bl})
    )
):
    check passed
else:
    check failed
```

Turning back to FIG. 9, if it is determined in step 903 that a potential 3/3 region does not contain an additional detected finder pattern of confidence similar to the detected finder patterns of the potential region, the potential 3/3 region is saved as a true 3/3 region in a following step 904. The saving may be performed to one of the intermediate variables, such as the variable register 3360 in FIG. 33B. An accumulation of these savings commences formation of the list 608.

If there are further unprocessed potential 3/3 regions, as tested at step 906, processing returns to step 902. Otherwise, if all potential 3/3 regions have been processed, then the process of forming the list 608 of true 3/3 regions, employed at step 603, is terminated at a final step 905.

2/3 Resolving

A detailed description of the process 503 for forming candidate 2/3 regions, is described with reference to FIGS. 12, 13, 16 and 19. The same two pre-determined tolerance parameters that were used in the previous description of 3/3 resolving, tolerance$_{angle}$ and tolerance$_{magnitude}$, will also be used in resolving 2/3 regions. The same value of 0.2 will be used for both parameters.

Figure 12:
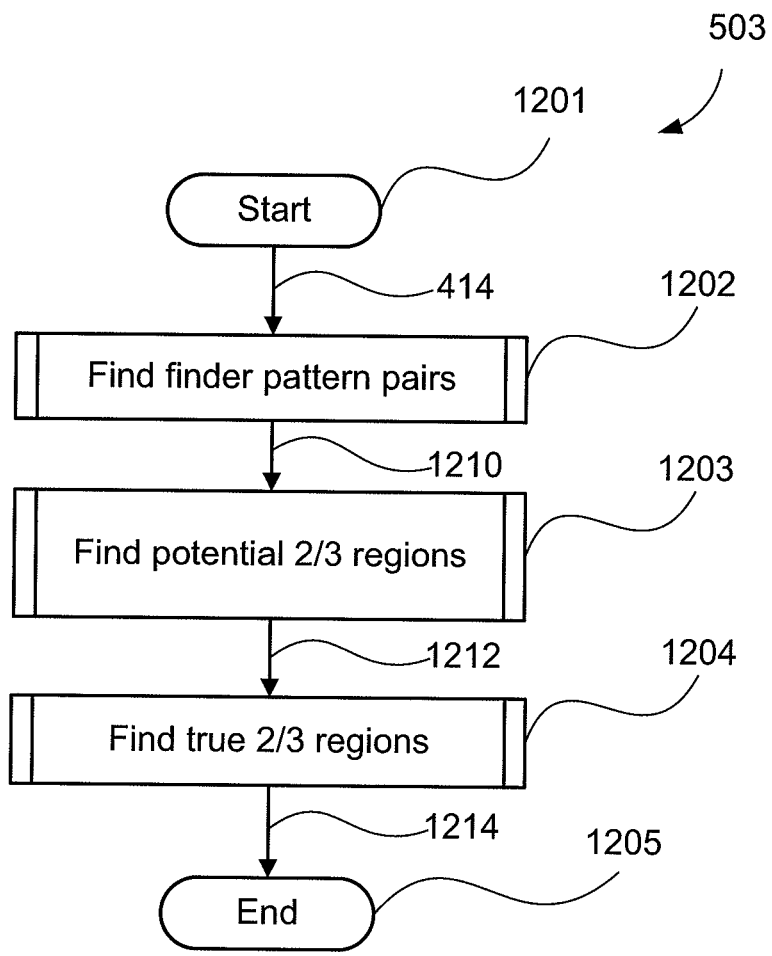
FIG. 12 is a flowchart giving a general overview of a process employed at step 503 to resolve groups of two finder patterns into QR code regions.

Turning to FIG. 12, there is shown the general process 503 of resolving 2/3 regions. At an initial step 1201, the list 414 of detected FPs is input.

At a following step 1202, finder pattern pairs 1210 are found. These are pairs of finder patterns matching a number of criteria indicating that they potentially form part of a QR code.

At a following step 1203, potential 2/3 regions 1212 are found. Potential 2/3 regions 1212 are regions of the image 410/412 in which a QR code with an undetected finder pattern could potentially exist.

At a following step 1204, the potential 2/3 regions 1212 found in step 1203 are checked to determine if they contain 'internal' FPs in the same way that potential 3/3 regions are checked in step 603. Potential 2/3 regions that do not contain such 'internal' FPs are determined to be true 2/3 regions 1214.

The process 503 of forming candidate 2/3 regions is terminated at a final step 1205.

Find Finder Pattern Pairs

Figure 13:
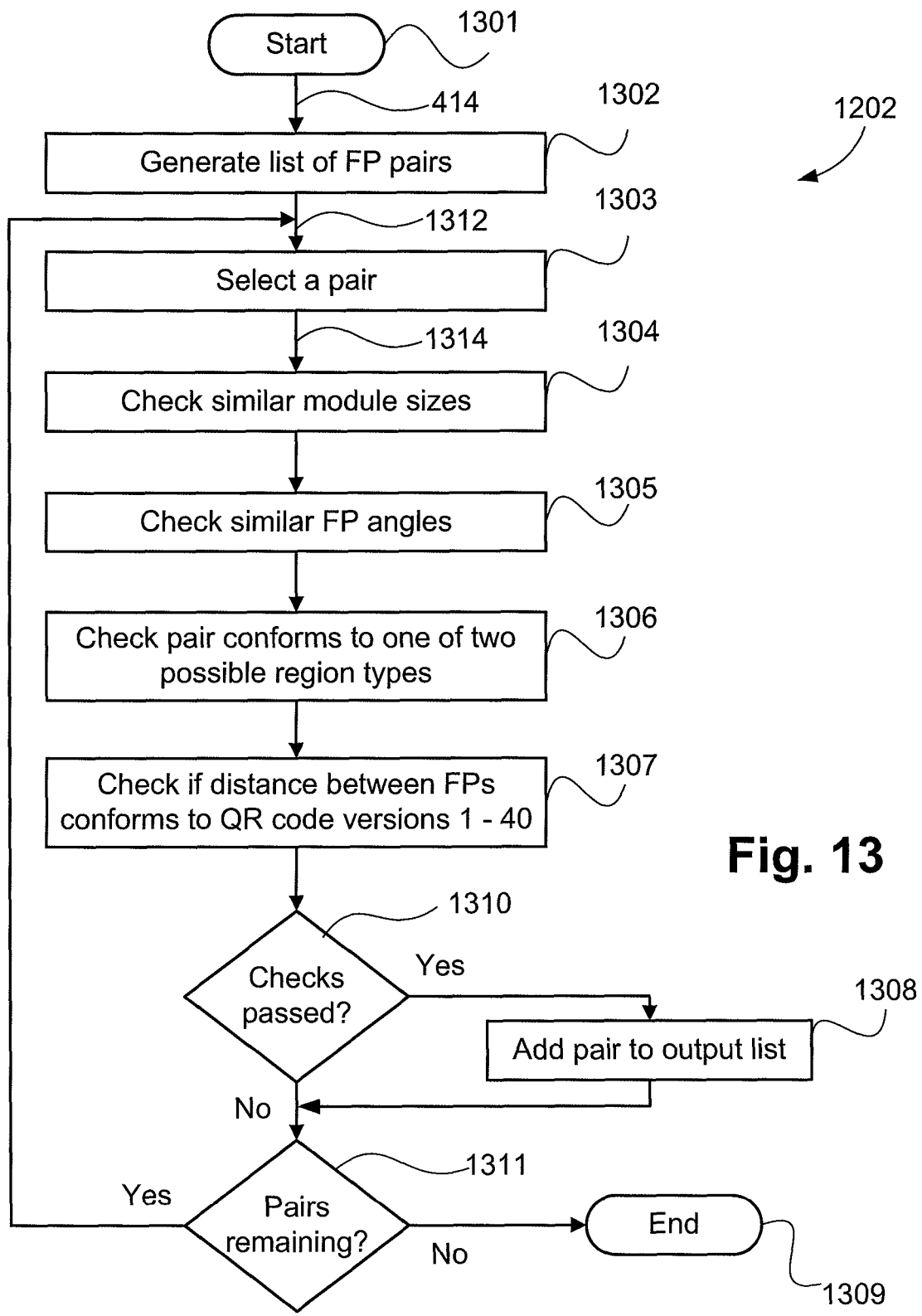
FIG. 13 is a flowchart detailing a process for checking that a pair of finder patterns may potentially form a QR code region.

The process 1202 of finding finder pattern pairs is now described in more detail with reference to FIG. 13. At an initial step 1301, the list 414 of detected finder patterns is input.

At a following step 1302, a list 1312 of finder pattern pairs is generated by finding every combination of two FPs possible from the input list. For the purposes of this description, the two finder patterns in each finder pattern pair will be arbitrarily assigned the labels A and B. In the following description, attributes (such as module_size) will be subscripted with 'A' and 'B' to indicate which FP they refer to.

At a following step 1303, a pair 1314 of finder patterns is selected from the list 1312 generated in step 1302.

Figure 14A:
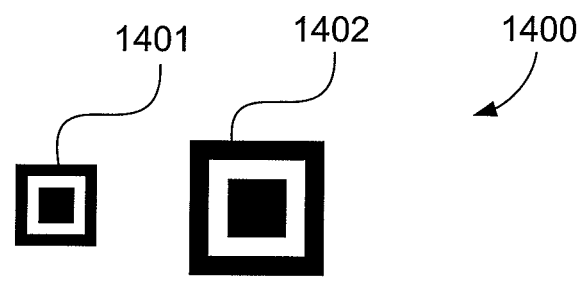
FIG. 14 shows examples whereby the checks performed in 1203 fail.

At a following step 1304, the finder pattern pair 1314 is checked to determine if the two finder patterns are reasonably similar in module size. FIG. 14A shows an example 1400 of where this check will not succeed. It can be seen that the module sizes of finder patterns 1401 and 1402 are considerably different. The check for similar module sizes may be represented by Pseudocode 14:

```
            ** Pseudocode 14  Step 1304 ** if
(
    (
        abs(module_size_A - module_size_B)
        /
        min(module_size_A, module_size_B)
    ) <= tolerance_{magnitude}
):
    check passed
else:
    check failed
```

Figure 14B:
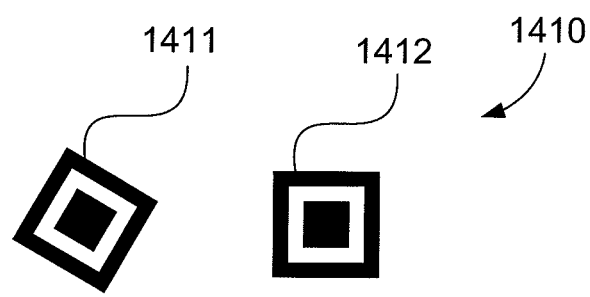

At a following step 1305, the angles of the FPs are checked to determine if the angular orientations of the two FPs are substantially equal. It must be noted that the angle of rotation for each finder pattern is modulo $\pi/2$ radians. Therefore, an adjustment is necessary to determine the smallest deviation between the angles of rotation of the two finder patterns. FIG. 14B shows an example 1410 of where this check will not pass. It can be seen that the angles of finder patterns 1411 and 1412 are considerably different. This check may be performed by implementing Pseudocode 15:

```
**** Pseudocode 15 **** Step 1305 ****
    if
    (
        (
            abs(angle_A − angle_B) <= tolerance_angle x pi / 2
        or
        (
            (pi / 2) − max(angle_A, angle_B) + min(angle_A, angle_B)
            <=
            tolerance_angle x pi / 2
        )
    )
    ):
        check passed
    else:
        check failed
```

Note that 'pi' refers to the mathematical constant $\pi$.

Figure 15A:
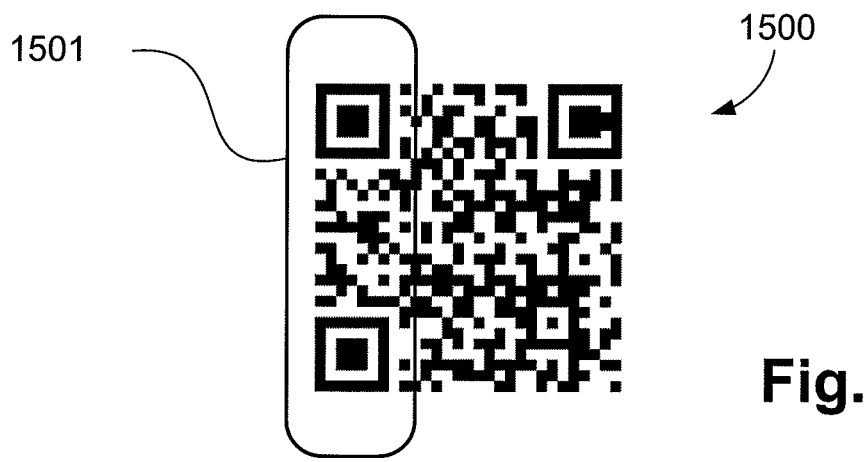
FIGS. 15A, 15B and 15C show normally and diagonally oriented 2/3 regions.
Figure 15B:
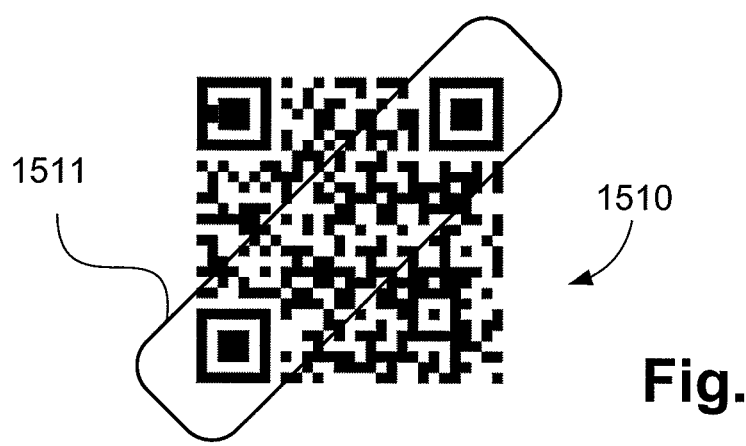
Figure 15C:
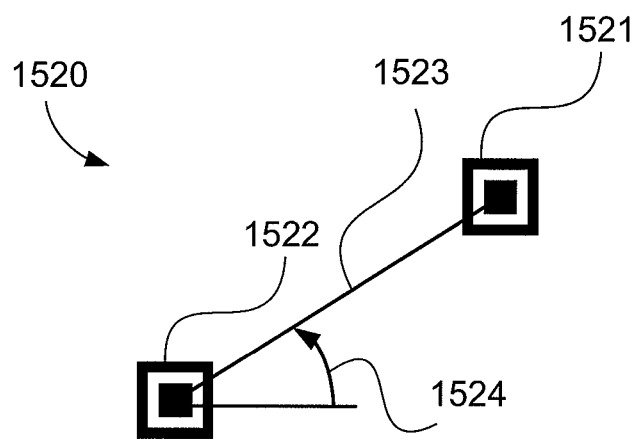

At a following step 1306 the angle of the vector between the FPs checked to determine if it corresponds to the angles of the finder patterns for one of two possible 2/3 code region configurations. The two possible configurations of 2/3 regions are shown in FIGS. 15A and 15B. The configuration 1500 of FIG. 15A, in which the two detected FPs correspond to FPs along the side of the QR code 1501, will be referred to as a 'normal' type 2/3 region. The configuration 1510, of FIG. 15B, in which the detected FPs are on the diagonal of the QR code 1511, will be referred to as a 'diagonal' type 2/3 region. FIG. 15C shows an example 1520 of a pair of finder patterns to be checked. The check determines if the angle 1524 of the vector 1523 between the finder patterns 1521, 1522 is consistent with either of the valid configurations 1500 and 1510 within the allowed angular tolerance tolerance_angle. A consequence of this check is that the type of the FP pair, being normal or diagonal, is established. This check can be implemented using Pseudocode 16:

```
**** Pseudocode 16 ****
    vector_x_{A−B} = x_B − x_A
    vector_y_{A−B} = y_B − y_A
    vector_mag_{A−B} = sqrt(vector_x_{A−B}^2 + vector_y_{A−B}^2)
    vector_angle_{A−B} = arctan2(vector_y_{A−B}, vector_x_{A−B})
    if vector_angle_{A−B} < 0:
        vector_angle_{A−B} = vector_angle_{A−B} + (2 x pi)
    vector_angle_{A−B}' = ((4 x vector_angle_{A−B}) mod (2 x pi) / 4)
    anglediff_A = abs(angle_A − vector_angle_{A−B}')
    anglediff_A =
        min
        (
            anglediff_A,
            (
                pi / 2
                −
                max(angle_A, vector_angle_{A−B}')
                +
                min(angle_A, vector_angle_{A−B}')
            )
        )
    anglediff_45_A = abs(anglediff_A − pi / 4)
    anglediff_B = abs(angle_B − vector_angle_{A−B}')
    anglediff_B =
        min
        (
            anglediff_B,
            (
                pi / 2
                −
                max(angle_B, vector_angle_{A−B}')
                +
                min(angle_B, vector_angle_{A−B}')
            )
        )
```

```
**** Pseudocode 16 ****
    anglediff_45_B = abs (anglediff_B − pi / 4)
    if
    (
        (
            anglediff_A < tolerance_angle x pi / 2
            and
            anglediff_B < tolerance_angle x pi / 2
        )
        or
        (
            anglediff_45_A < tolerance_angle x pi / 2
            and
            anglediff_45_B < tolerance_angle x pi / 2
        )
    ):
        if
        (
            anglediff_45_A < anglediff_A
            and
            anglediff_45_B < anglediff_B
        ):
            region_type = diagonal
        else:
            region_type = normal
        check passed
    else:
        check failed
```

At a following step 1307, a check is made to determine if the length of the vector between the two FPs is within the limits for QR code versions 1-40, allowing for the magnitude tolerance. This check can be performed by implementing Pseudocode 17:

```
**** Pseudocode 17 ****
    module_size_average = (module_size_A + module_size_B) / 2
    if (region_type == normal):
        if
        (
            (
                vector_mag_{A−B} x (1 + tolerance_magnitude)
                <
                14 x module_size_average
            )
            or
            (
                vector_mag_{A−B} x (1 − tolerance_magnitude)
                >
                170 x module_size_average
            )
        ):
            check failed
        else
            check passed
    else:
        if
        (
            (
                vector_mag_{A−B} x (1 + tolerance_magnitude)
                <
                1.41 x 14 x module_size_average
            )
            or
            (
                vector_mag_{A−B} x (1 − tolerance_magnitude)
                >
                1.41 x 170 x module_size_average
            )
        ):
            check failed
        else
            check passed
```

If all the above checks 1304-1307 are successful, as tested at step 1310, the pair 1314 of FPs is appended to an output list 1210 of FP pairs at step 1308. If there are remaining FP pairs in the list 1312 generated at step 1302, as tested at step 1311, processing returns to step 1303. Otherwise the process 1202 of finding FP pairs is terminated at a final step 1309.

Find Potential 2/3 Regions

Figure 16:
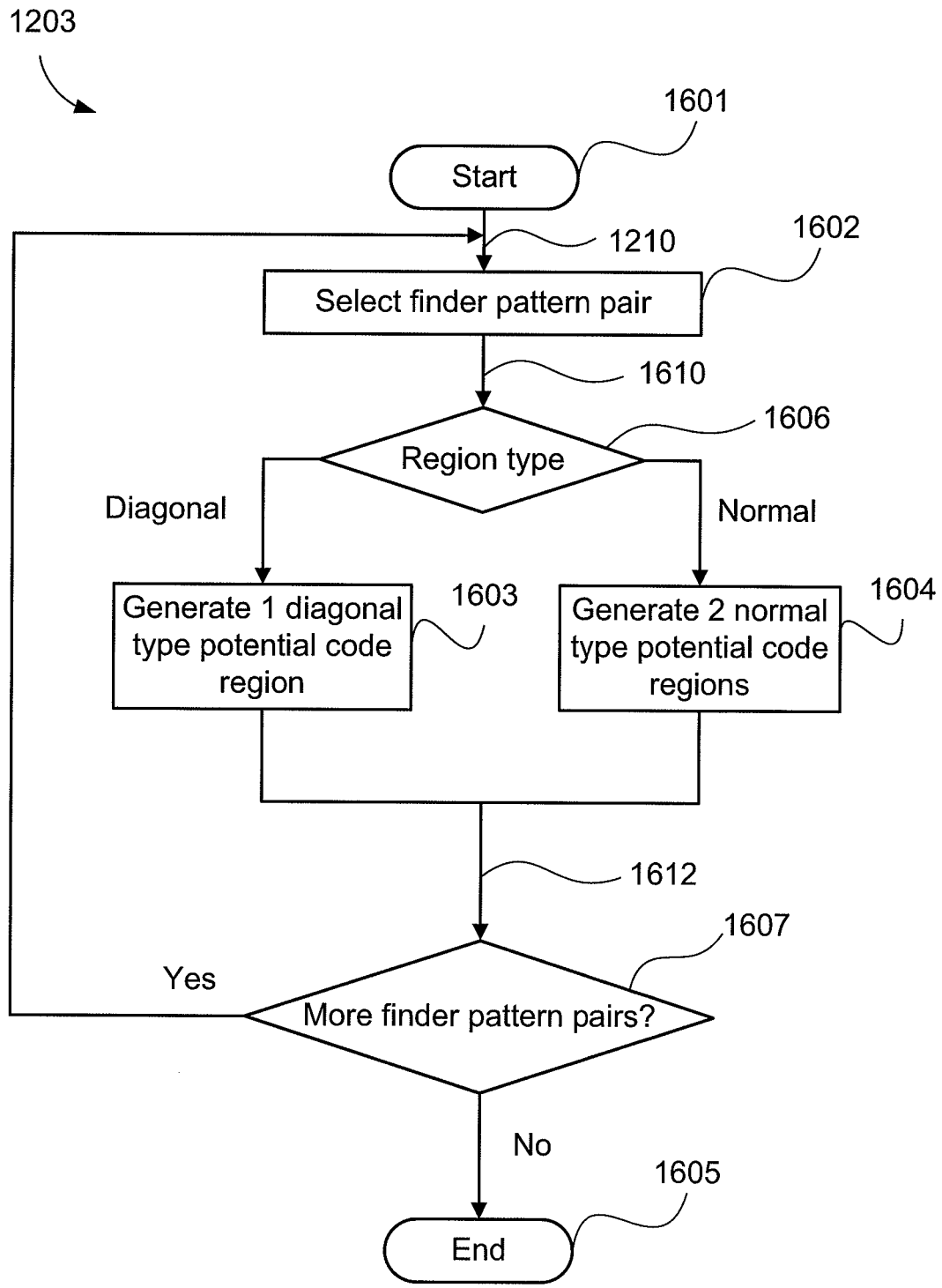
FIG. 16 is a flowchart describing a process employed at step 1203 for generating potential 2/3 regions.

The process 1203 of finding potential 2/3 regions is now described in more detail with reference to FIG. 16. At an initial step 1601, the list 1210 of previously found finder pattern pairs is input.

At a following step 1602, a finder pattern pair 1610 is selected from the list 1210 of finder pattern pairs input previously at step 1701.

If the selected finder pattern pair 1610 has a "type" that is "diagonal", as tested in step 1606, one diagonal type potential 2/3 region is generated in step 1603. If the selected finder pattern pair "type" is "normal", two normal type potential 2/3 regions are generated in step 1604. The implementations of steps 1603 and 1604 will be described subsequently. Note that for each potential 2/3 region 1612 output from steps 1603 and 1604, a confidence value based on the confidences of the region's two detected FPs is calculated. This confidence can be calculated by implementing Pseudocode 18:

---
** Pseudocode 18 **

$$\text{confidence}_{region} = (\text{confidence}_A + \text{confidence}_B) / 2$$

---

If there are further unprocessed finder pattern pairs, determined at step 1607, processing returns to step 1602. Otherwise, the process 1203 of finding potential 2/3 regions is terminated at a final step 1605. The processing of step 1203 establishes a list 1212 of determined potential 2/3 regions which may be stored in the memory 3334.

Figure 17A:
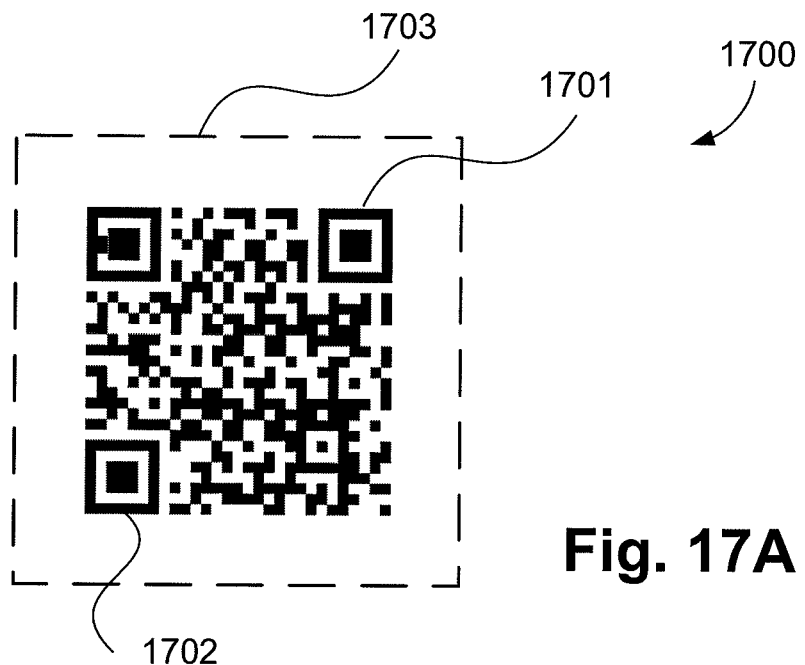
FIGS. 17A and 17B show potential QR code regions with respect to detected finder patterns.

The process 1603 of generating a diagonal type potential 2/3 region will now be described in detail. FIG. 17A shows an example 1700 of a diagonal type 2/3 region 1703 formed from a pair of detected finder patterns 1701 and 1702. As shown in the region of 1700, in the diagonal case the detected finder patterns correspond to the top-right and bottom-left FP positions in the QR code region.

Figure 18A:
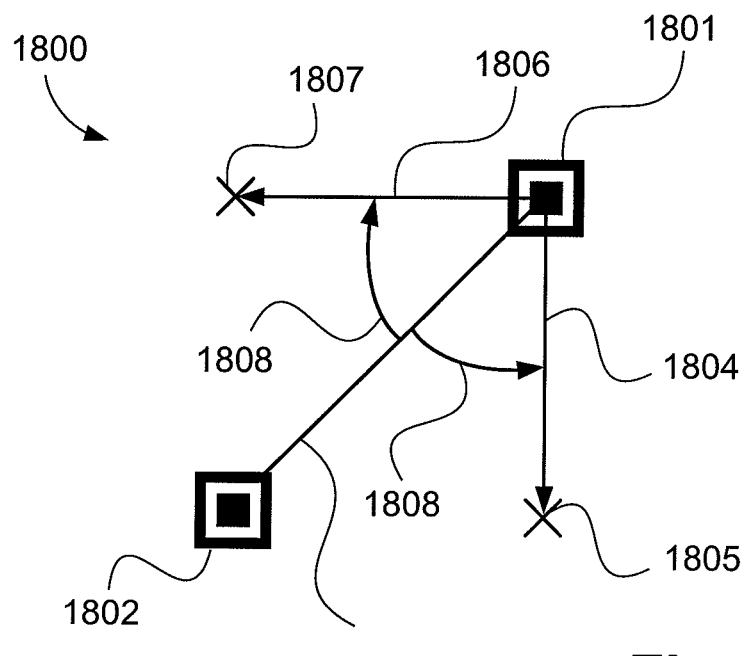
FIGS. 18A and 18B show vectors, with respect to detected finder patterns, used to determine the extents of potential QR code regions.

Generating a potential 2/3 region from a finder pattern pair essentially involves determining the two possible locations for missing finder patterns in the region. This determines the extents of the potential 2/3 region. FIG. 18A shows an example 1800 of how the two possible locations of missing finder patterns are determined for diagonal type potential 2/3 regions. First, one of the two detected finder patterns 1801, 1802 is selected as the reference finder pattern (finder pattern 1801 being selected in this example). Next, two vectors 1804 and 1806 are formed at angles offset by 45° 1808 from the vector 1803 from the selected reference finder pattern 1801 to the other detected finder pattern 1802. The lengths of the vectors 1804 and 1806 are calculated from the length of the vector 1803 as shown in Pseudocode 19:

---
** Pseudocode 19 **

$$\text{vector\_mag}_{4604} = \text{vector\_mag}_{4603} / 1.41$$
$$\text{vector\_mag}_{4606} = \text{vector\_mag}_{4603} / 1.41$$

---

Note that the constant 1.41 approximates the square root of 2 in the above pseudocode.

The endpoints of the vectors 1804 and 1806 determine the two possible locations of missing finder patterns 1805 and 1807. With the two possible locations of missing finder patterns determined, the potential 2/3 region is fully defined and step 1603 is complete.

Figure 17B:
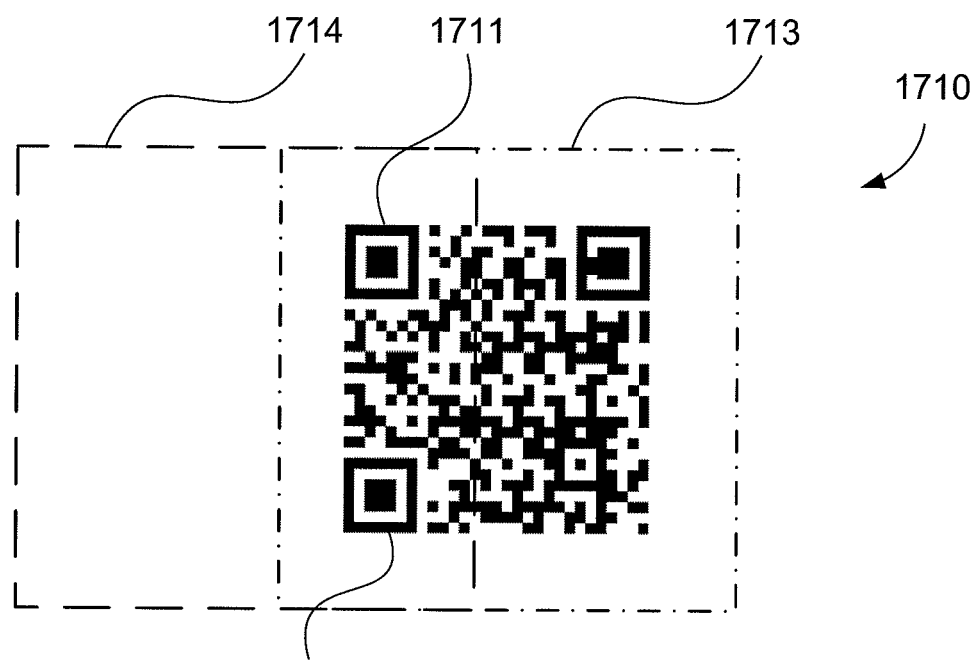

The process of generating two normal type potential 2/3 regions 1604 will now be described in detail. FIG. 17B shows an example of two normal type 2/3 regions 1713 and 1714 formed from a pair of detected finder patterns 1711 and 1712. As shown in 1710, in normal type 2/3 regions the detected finder patterns correspond to two adjacent finder pattern positions on one side of the code region. For this reason, there can be two potential 2/3 regions formed from a single normal type finder pattern pair, as shown in 1710. Essentially, based on the detected finder pattern pair 1711, 1712, there could be a QR code with a missing third finder pattern in either of the regions 1713 and 1714. For this reason, both potential 2/3 regions are generated in step 1604.

Generating the two potential 2/3 regions for the finder pattern pair essentially involves determining, for each potential 2/3 region 1713 and 1714, the two possible locations of missing finder patterns. This process is the same for all normal type potential 2/3 regions (i.e. it is the same for both 1713 and 1714), and is described subsequently. Once the process described below has been completed for both potential 2/3 regions (such as 1713, 1714) formed from a finder pattern pair, the step 1604 is complete.

Figure 18B:
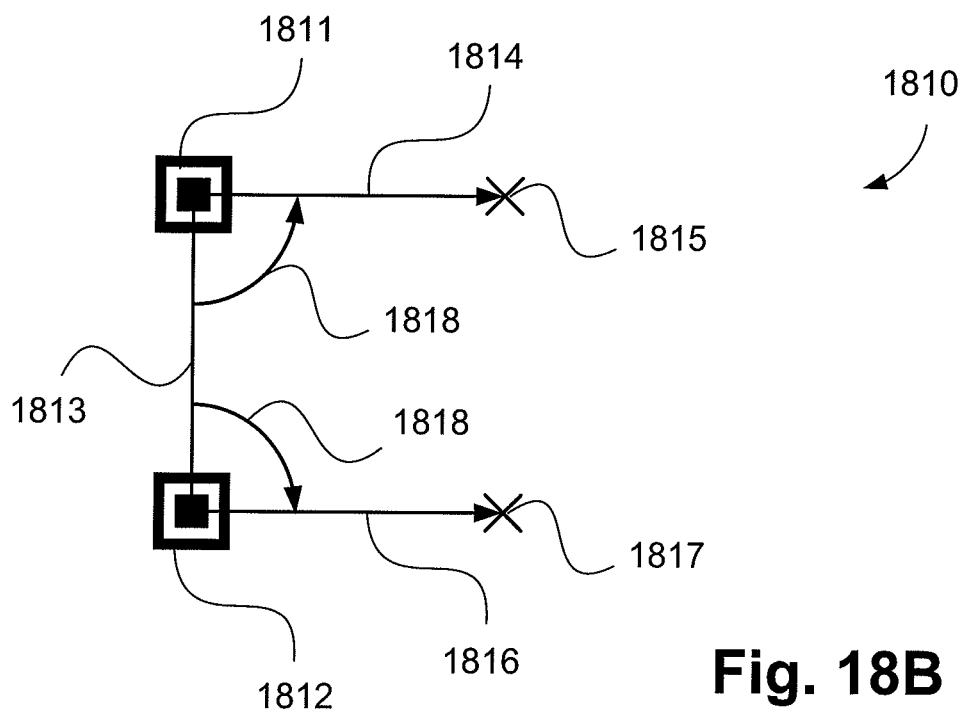

FIG. 18B shows an example 1810 of a normal type potential 2/3 region. For normal type finder pattern pairs such as 1811, 1812, one normal type potential 2/3 region is formed on each side of the vector 1813 between the two detected finder patterns. Just one of the two possible potential 2/3 regions formed from finder pattern pair 1811, 1812 is shown in 1810.

The process of determining the two possible locations of missing finder patterns for the potential 2/3 region 1810 begins with forming two vectors 1814 and 1816 offset at 90° from the vector 1813 between the detected finder patterns 1811, 1812. The lengths of the vectors 1814 and 1816 are the same as that of the vector 1813. The endpoints of the vectors 1814 and 1816 determine the two possible locations of missing finder patterns 1815 and 1817.

Find True 2/3 Regions

Figure 19:
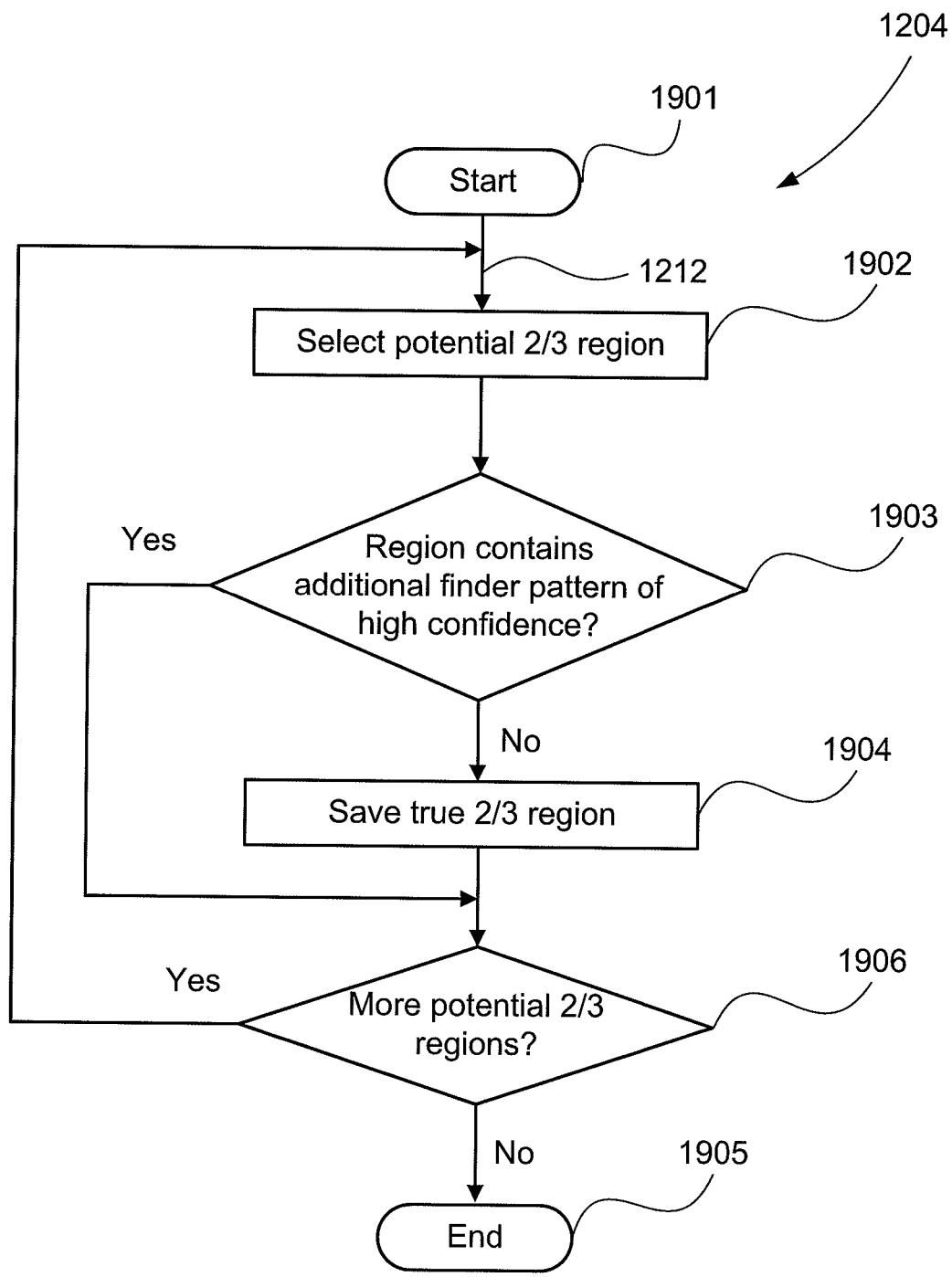
FIG. 19 is a flowchart showing a process employed at 1204 for finding 'true' 2/3 regions.

The process 1204 of finding true 2/3 regions is now described in more detail with reference to FIG. 19. As previously explained in the description of 3/3 resolving, valid QR code regions cannot contain additional detected finder patterns, however an exception is made for when the detection confidence of an 'internal' FP is much lower than the detected finder pattern pair of the code region.

At an initial step 1901, a list 1212 of previously determined potential 2/3 regions is input.

At a following step 1902, a potential 2/3 region 1910 is selected from the list 1212 input in step 1901.

At a following step 1903, it is determined whether the potential 2/3 region 1910 contains an additional finder pattern of high confidence. Essentially, all of the detected finder patterns except for the finder patterns forming the potential 2/3 region are checked to determine if they are inside the extents of the potential 2/3 region.

The process for determining if a particular FP is within a potential 2/3 region is essentially the same as that previously described for 3/3 resolving. To apply this process to potential 2/3 regions, the detected and missing FP locations must first be assigned to the standard FP position labels top-left, top-right, bottom-left and bottom-right. The process of assigning standard FP position labels to the detected and possible missing FP locations will now be described for both normal and diagonal type potential 2/3 regions with reference to FIGS. 20A and 20B.

Figure 20A:
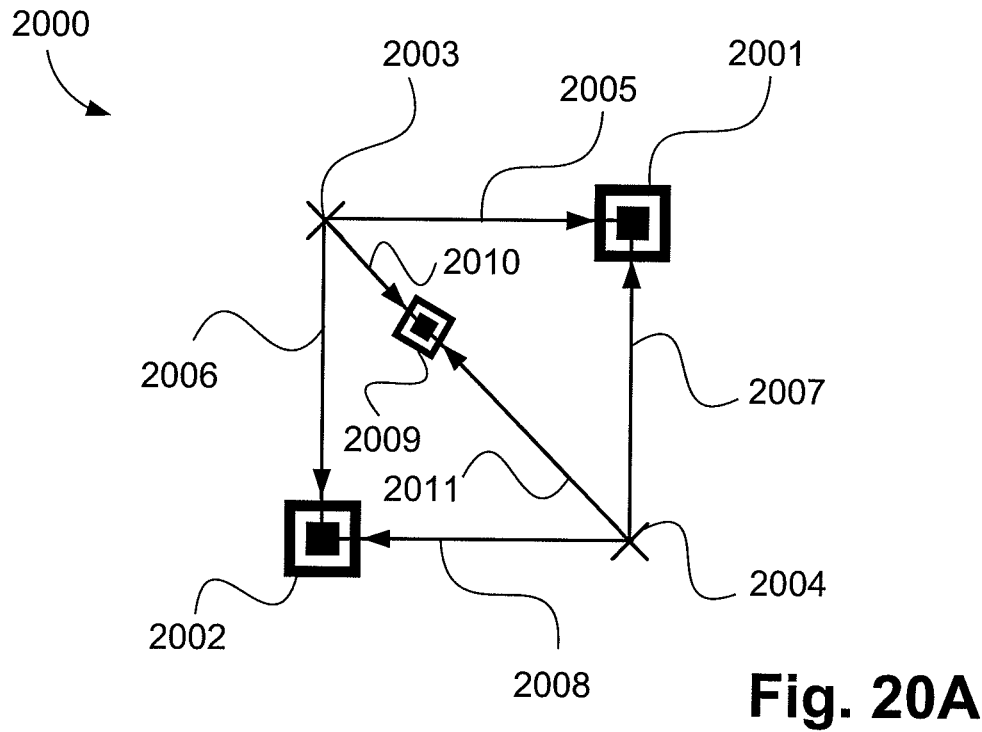
FIGS. 20A and 20B show vectors used to determine if a 2/3 QR code region contains an internal finder pattern.

A diagonal type potential 2/3 region 2000 is shown in FIG. 20A. An additional finder pattern 2009 is to be checked to determine if it is within the potential 2/3 region. First, one of the missing finder pattern locations 2003, 2004 is arbitrarily assigned the position of top-left FP. Subsequently, the other possible missing FP location is assigned the position of bottom-right FP. The two detected FPs 2001, 2002 are then assigned the positions of top-right and bottom-left FPs accordingly. The process of determining if the additional FP 2009 lies within the potential 2/3 region 2000 can now be carried out by the method previously described for 3/3 resolving, using the following information:
(i) Vectors 2005 and 2006 between the top-left FP 2003 and the top-right 2001 and bottom-left 2002 FPs;
(ii) Vectors 2007 and 2008 between the bottom-right FP 2004 and the top-right 2001 and bottom-left 2002 FPs; and
(iii) Vectors 2010 and 2011 from the top-left 2003 and bottom-right 2004 FPs to the additional finder pattern to be checked 2009.

Figure 20B:
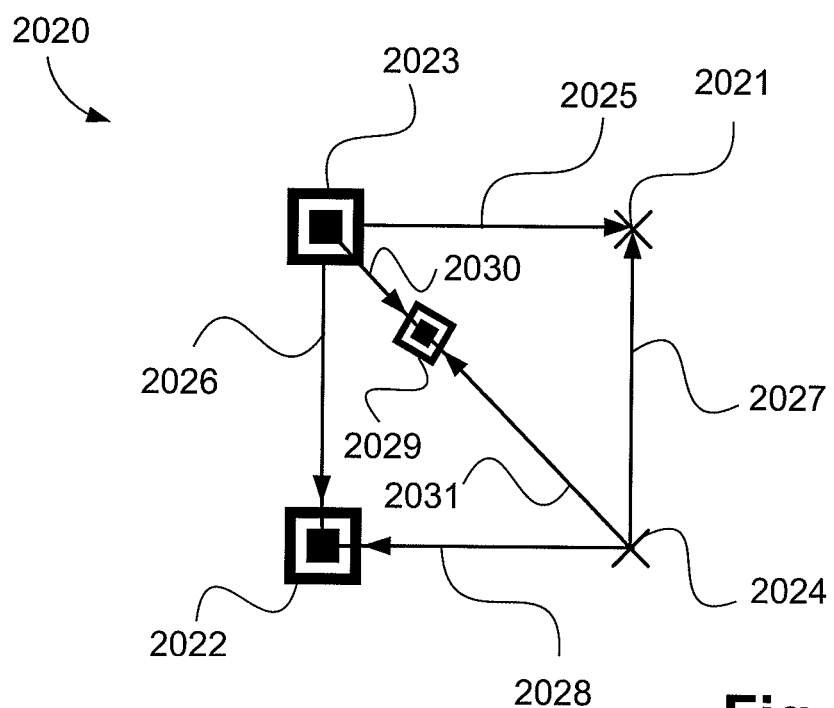

A normal type potential 2/3 region 2020 is shown in FIG. 20B. An additional finder pattern 2029 is to be checked to determine if it is within the potential 2/3 region. First, one of the detected finder pattern locations 2022, 2023 is arbitrarily assigned the position of top-left FP. Subsequently, the other detected FP location is assigned the position of bottom-left FP. The two possible missing FP locations 2021, 2024 are then assigned the positions of top-right and bottom-right FPs accordingly. The process of determining if the additional FP 2029 lies within the potential 2/3 region 2020 can now be carried out by the method previously described for 3/3 resolving, using the following information:
(i) Vectors 2025 and 2026 between the top-left FP 2023 and the top-right 2021 and bottom-left 2022 FPs;
(ii) Vectors 2027 and 2028 between the bottom-right FP 2024 and the top-right 2021 and bottom-left 2022 FPs; and
(iii) Vectors 2030 and 2031 from the top-left 2023 and bottom-right 2024 FPs to the additional finder pattern to be checked 2029.

In the methods described previously for determining whether an additional FP lies within a potential 2/3 region, the extents of the potential 2/3 region were based on the nominal predicted locations of the two possible missing finder patterns of the 2/3 region. Alternative methods may be used to define the extents of potential 2/3 regions for the internal FP check. One alternative is to apply the tolerances tolerance$_{magnitude}$ and tolerance$_{angle}$ in determining the possible locations of missing finder patterns such that the extents of potential 2/3 regions are as small as possible (within the allowed tolerances). This would be a more conservative approach than the approach detailed above, accounting for the possibility that warping has resulted in a smaller than expected QR code region. This would reduce false negatives, which are situations where a valid QR code region is erroneously eliminated by the internal FP check.

The fact that QR codes must contain a 4 module size quiet region surrounding them can be exploited to enlarge potential 2/3 code regions for the purposes of the internal FP check of step 1903. This will reduce the number of false positive 2/3 regions that are identified as true 2/3 regions. Typically, an additional finder pattern cannot occur within 11 module sizes of the centres of detected finder patterns of a code region. This takes into account both the 4 module quiet zone and the width of two half finder patterns (3.5 modules each). The size of the potential 2/3 region used for the internal FP check could thus be enlarged by moving the four corners of the region outward by 11 module sizes.

If it is determined that a potential 2/3 region contains an additional detected finder pattern, it is then determined whether the confidence of the additional detected finder pattern is considerably less than that of the detected finder patterns of the region. This check can be accomplished by implementing Pseudocode 20:

---
** Pseudocode 20 **
---
```
if
(
    confidence_fp
    <
    (
        0.75
        x
        min(confidence_A, confidence_B)
    )
):
    check passed
else:
    check failed
```

Turning back to FIG. 19, if it is determined in step 1903 that a potential 2/3 region does not contain an additional detected finder pattern of confidence similar to the detected finder patterns of the potential region, the potential 2/3 region is saved into memory 3334 as a true 2/3 region in a following step 1904.

If there are further unprocessed potential 2/3 regions, as tested at step 1906, processing returns to step 1902. Otherwise, if all potential 2/3 regions have been processed, then the process 1204 of forming the list 1214 of true 2/3 regions, is terminated at a final step 1905.

The list 608 of true 3/3 regions and the list 1214 of true 2/3 regions collectively form the (expected) QR code regions 416 described above as being output from the resolving process 404.

Decoding Process

Figure 21:
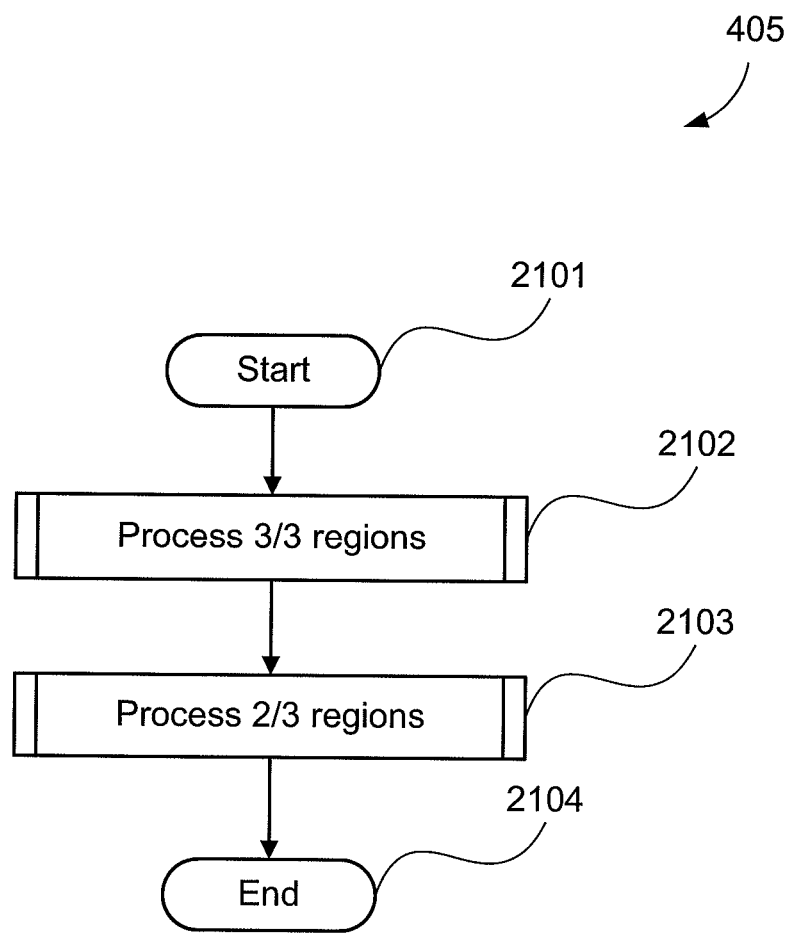
FIG. 21 is a flowchart giving a general overview of a process employed at step 405 for decoding QR code regions.

The decoding process 405 is described with reference to FIG. 21. The decoding process 405 attempts to extract information from each 3/3 region (608) and 2/3 region (1214) in turn. A detected finder pattern may be shared by a number of 3/3 regions and 2/3 regions. This is because, at the conclusion of step 404, the presence of encoded data in each of the 3/3 and 2/3 regions is as yet unknown. That is, the regions 416 generated at step 404 are not confirmed QR codes, but rather regions likely to contain QR codes.

At step 405, a region is confirmed as a QR code if data is successfully extracted from the region. Furthermore, QR codes may not share finder patterns with other QR codes. Therefore, once a QR code region is successfully decoded, any remaining regions that share finder patterns with the successfully decoded code region are not processed. Thus, processing time is not wasted in attempts to decode regions that cannot form a QR code.

The decoding process 405 begins at an initial step 2101 in which the list or lists of 3/3 regions and 2/3 regions are input.

At a following step 2102, all 3/3 regions are processed in turn. This processing step, which involves attempting to extract coded information from code regions, is described in detail later.

At a following step 2103, all 2/3 regions are similarly processed.

The decoding process 405 terminates at a final step 2104.

Figure 22:
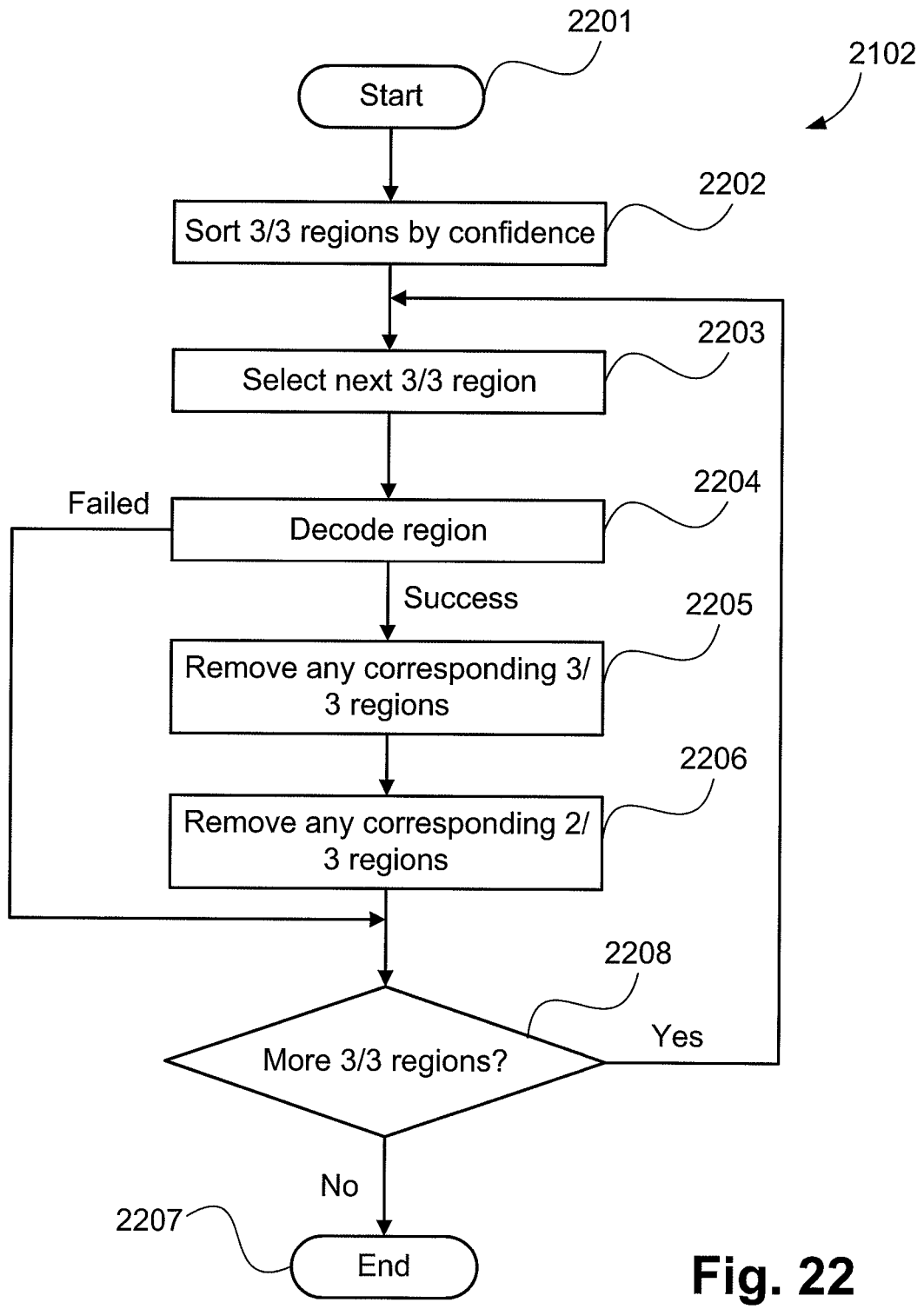
FIG. 22 is a flowchart detailing a process employed at step 2102 for decoding 3/3 regions.

The process of processing 3/3 regions employed at step 2102 is described in detail with reference to FIG. 22.

At an initial step 2201, the list of 3/3 regions is received.

At a following step 2202, the 3/3 regions are sorted by their region confidences to ensure that regions with higher confidences are processed before regions with lower confidences.

At a following step 2203, the next remaining 3/3 region in the list created in step 2202 is selected.

At a following step 2204, an attempt is made to decode a region. Decoding uses the three FPs of the region to identify the coded content of the QR code. Specifically, the locations of each of the three FPs can be used to define a grid of data module locations from which the data modules in the code region are sampled and the encoded data is extracted. The process of sampling data modules and extracting coded data from a QR code once all three FPs of the code have been acquired is well known in the prior art and need not be described further.

If the region is successfully decoded, then any 3/3 regions remaining to be processed that share FPs with the current region are discarded at a following step 2205.

Also, at step 2206 which follows step 2205, any 2/3 regions remaining to be processed that share FPs with the current region are also discarded.

If there are 3/3 regions remaining to be processed, tested at step 2208, processing continues at step 2203. Where the decoding of step 2204 fails, the test of step 2208 follows.

Once all 3/3 regions have been processed, the process 2102 is terminated at a final step 2207.

Figure 23:
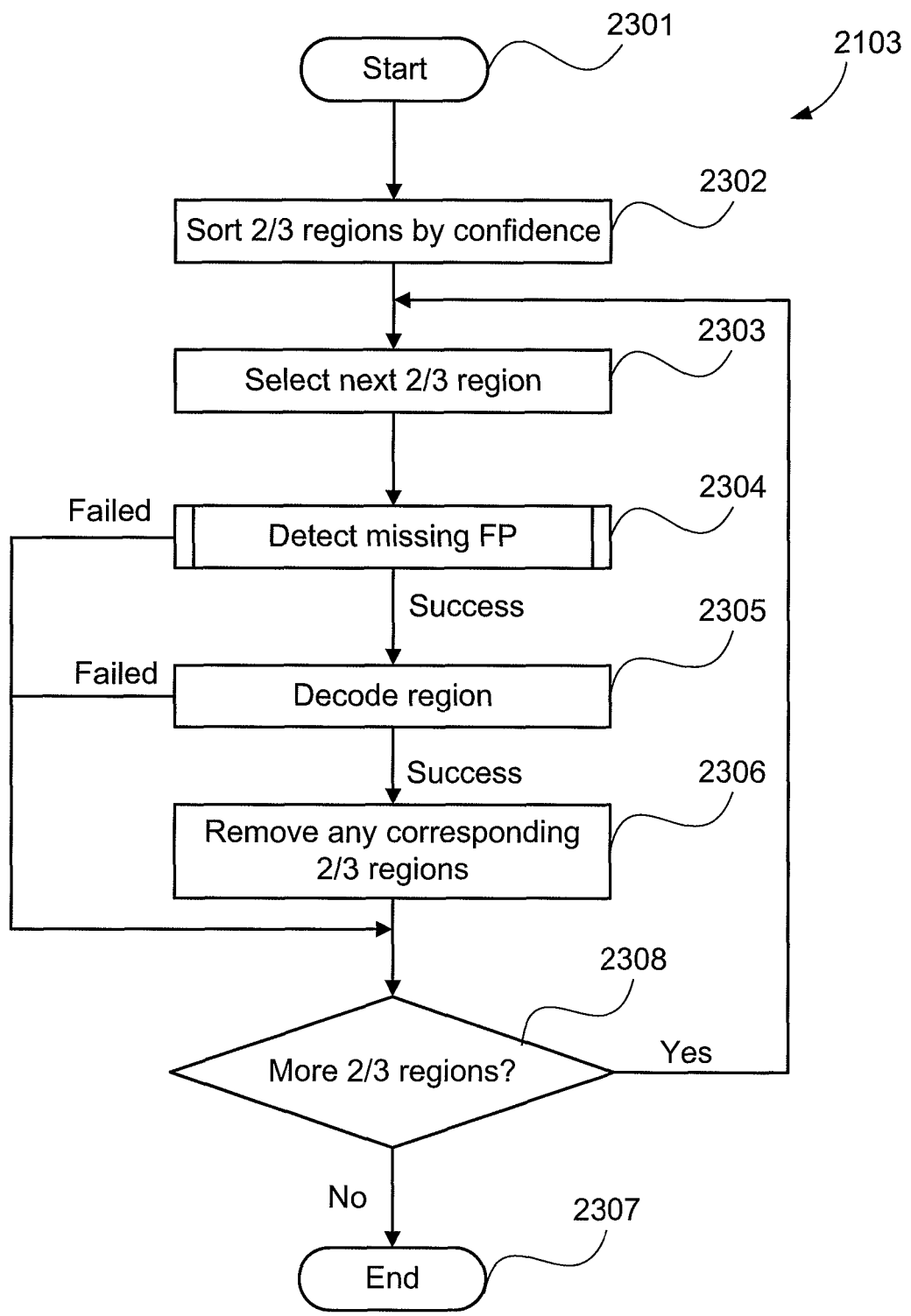
FIG. 23 is a flowchart detailing a process employed at step 2103 for decoding 2/3 regions.

The processing of 2/3 regions employed at step 2103 is described in detail with reference to FIG. 23.

At an initial step 2301, the list of remaining 2/3 regions is received, noting that some 2/3 regions may have been discarded in step 2206.

At a following step 2302, the 2/3 regions are sorted by their region confidences to ensure that regions with higher confidences are processed before regions with lower confidences.

At a following step 2303, the next remaining 2/3 region in the list created in step 2302 is selected.

At a following step 2304, a third FP is sought in a process that is described in detail later.

If a missing FP is successfully found in step 2304, processing continues at a following step 2305 in which an attempt is made to decode the region in a decode process identical to that employed at step 2204 using the two selected detected finder patterns from step 2303 and the third finder pattern detected at step 2304. Decoded data may then be stored in the memory 3334 as, for example, the output variable 3362.

If decoding is successful, then any 2/3 regions remaining to be processed that share FPs with the successfully decoded region are removed at step 2306 in a similar process as that employed at step 2206.

If there are 2/3 regions remaining to be processed, tested at step 2308, processing continues at step 2303. Where the detection at step 2304, or the decoding at step 2305 fails, the test of step 2308 follows.

Once all the 2/3 regions have been processed, the process 2103 is terminated at a final step 2307.

Detect Missing FP

Template correlation is a known and very robust method for detecting and locating features in an image. In the context of the present disclosure, it is desired to detect and locate QR FPs. Template correlation, however, has several fundamental disadvantages. Firstly, template correlation would require, in the context of the present disclosure, that the size of the QR FPs be pre-determined. Secondly, template correlation would require that the rotational orientation of the QR FPs be pre-determined. These two restrictions would greatly limit the functionality of any QR FP detection system implementing template correlation. In the particular case of printed and scanned QR codes, there is almost always some rotational misalignment of the QR code in the scanned image.

In addition to the above two mentioned limitations, template correlation is a computationally expensive operation. Consequently, a QR FP detection system that employs template correlation on an entire scanned image could be impractically slow.

The present inventors have nevertheless developed a QR FP detection system that utilises template correlation in a manner that draws on its robustness, but overcomes the above-mentioned limitations. Broadly, the presently disclosed system employs the information gathered by the previously performed CCA to form a template that is adapted to the FP to be searched for, thereby maximizing correlation strength. In essence, any distortions and misalignments introduced by printing and scanning cycles can be estimated from their effects on the two already detected FPs. This information can then be used to search for a missing damaged FP with greater efficiency and accuracy.

In addition, small search regions in the image may be estimated from the locations of the two already detected FPs. These search regions are the only possible areas in which a third missing FP can be located. Thus, the computationally expensive operation of template correlation is restricted to a small proportion of the image, resulting in a far more efficient detection system.

Figure 24:
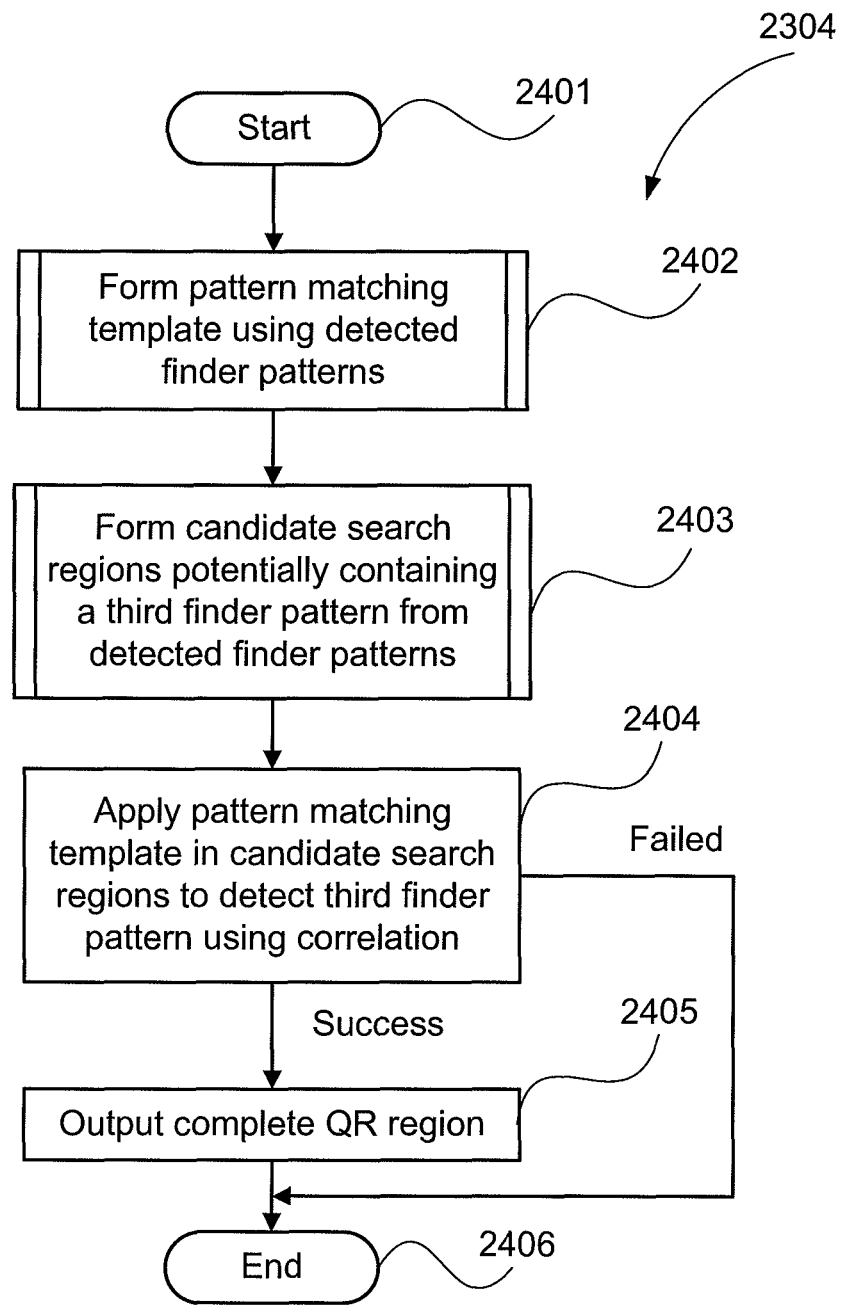
FIG. 24 is a flowchart detailing a process employed at step 2304 for detecting missing finder patterns in a 2/3 region.

The process of detecting a missing FP, employed at step 2304 is described with reference to FIG. 24.

The process begins at an initial step 2401 in which a 2/3 region is input.

At a following step 2402, a pattern matching template is formed with reference to the two already detected FPs in the 2/3 region. Two effective methods for forming a pattern matching template are described in detail later.

At a following step 2403, candidate search regions are formed. A candidate search region is a small image region in which a third, missing FP may exist. The process 2403 of forming candidate search regions is described later.

At a following step 2404, the pattern matching template generated at step 2402 is applied to each candidate search region formed at step 2403. This step attempts to detect the third, missing FP by template correlation. If a missing FP is detected, and step 2404 thus successful, the 2/3 region is determined to be 'complete'. That is, all three FPs have been detected, and the data encoded in the QR code may be extracted. Therefore, if the missing FP is detected, then processing continues at step 2405, in which the 'complete' region is appended to a list to be output from the process 2304. Otherwise, the 2/3 region does not form a valid QR code, and is discarded. The process 2304 of detecting a missing FP is terminated at step 2406.

Forming Template—from Metadata

Figure 25:
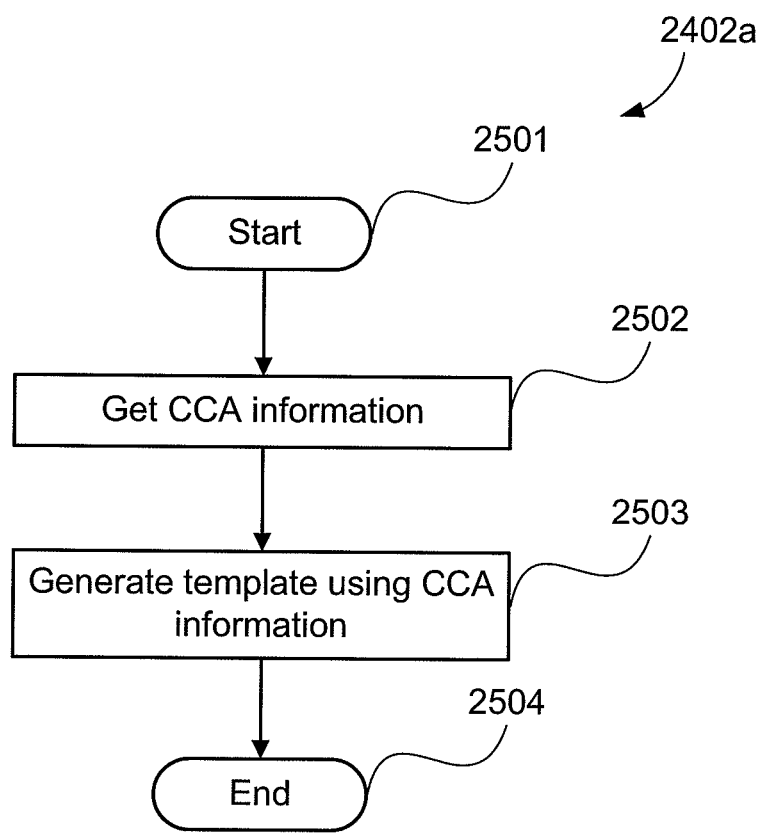
FIG. 25 is a flowchart giving a general overview of a process employed at step 2402 for forming a pattern matching template from CCA information.

One process of forming a pattern matching template from CCA information, that may be employed at step 2402, is described in detail with reference to FIG. 25 as step 2402a.

The process 2402a begins at an initial step 2501 in which a 2/3 region is input.

At a following step 2502, information from CCA for the two already detected FPs in the 2/3 region is acquired. As previously mentioned, CCA provides the following information regarding a detected FP:

(i) Coordinates of the FP centre;
(ii) Size of black modules in the FP;

(iii) Size of white modules in the FP;
(iv) Rotation of the FP;
(v) Confidence of the FP; and
(vi) Bounding box of the FP.

The size of black and white modules forming FPs gives an indication of the effect of dot gain. Thus, when two of three FPs in a QR code region have been detected, dot gain information can be used to locate the third, missing FP. It is useful to obtain an average of module sizes between the two detected FPs. These averages may be computed by implementing Pseudocode 21:

---
** Pseudocode 21 **
---
average_module_size$_{black}$ =
 (module_size$_{black, fp0}$ + module_size$_{black, fp1}$) / 2
average_module_size$_{white}$ =
 (module_size$_{white, fp0}$ + module_size$_{white, fp1}$) / 2
---

At a following step 2503, information acquired from CCA is used to generate a pattern matching template. In step 2503, a template 2700 (seen in FIG. 27) of a QR FP is formed in the memory 3334 conforming to the following ratios of black and white widths, as in Pseudocode 22. The label "average_module_size" is abbreviated as "ams" for convenience of representation.

---
** Pseudocode 22 **
---
ams$_{black}$ : ams$_{white}$ : 3 x ams$_{black}$ : ams$_{white}$ : ams$_{black}$
average_module_size$_{black}$:
average_module_size$_{white}$:
3 x average_module_size$_{black}$:
average_module_size$_{white}$:
average_module_size$_{black}$
---

Figure 27:
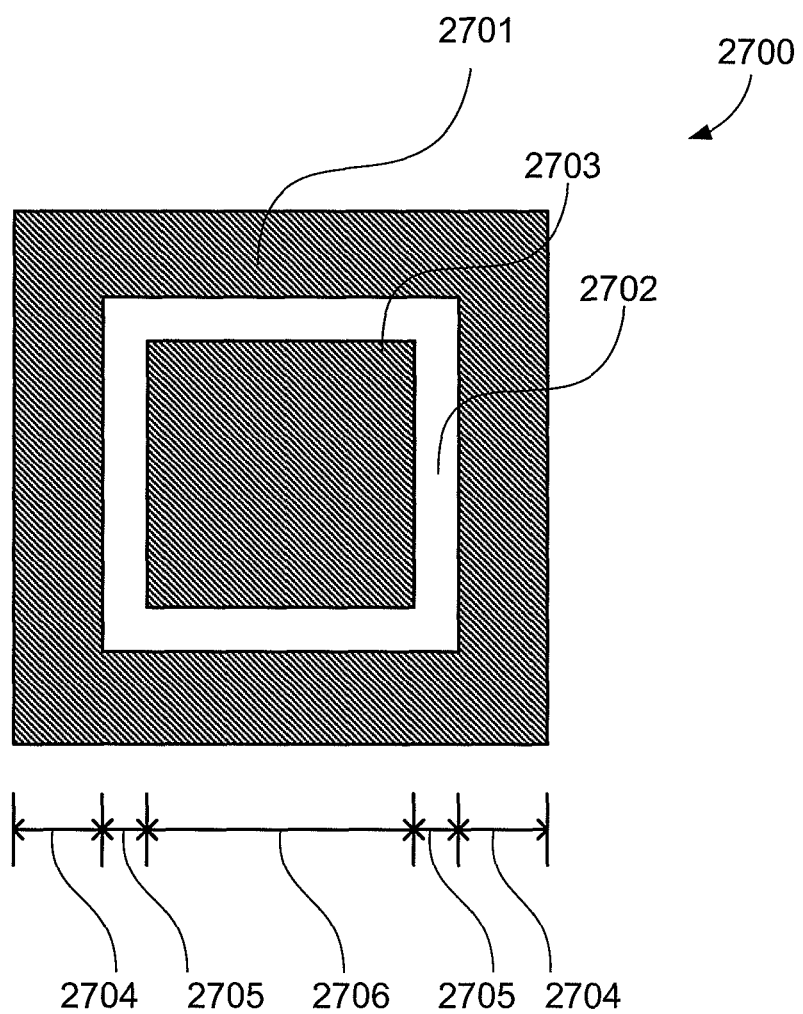
FIG. 27 shows an example template formed in memory taking into account dot gain information.

As seen in FIG. 27, the outer black region 2701 of the FP template 2700 will have a stroke width 2704 of average_module_size$_{black}$. Also, the white region 2702 will have a width 2705 of average_module_size$_{white}$. Lastly, the inner black region 2703 will have a width 2706 of three times average_module_size$_{black}$.

Figure 28:
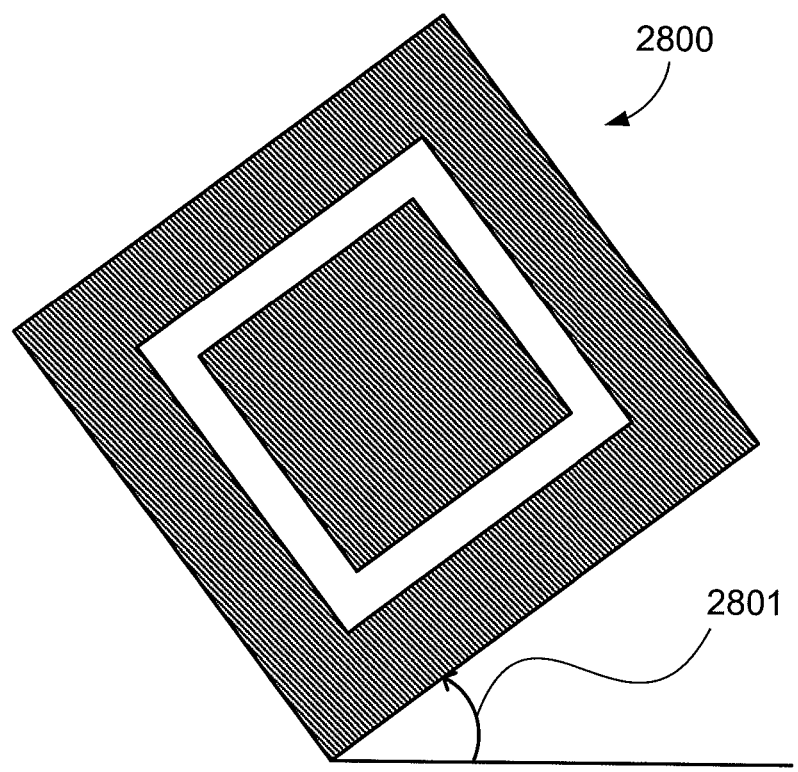
FIG. 28 shows an example template formed in memory and rotated.

Subsequently, the template 2700 is rotated to account for the angle of the already detected FPs. This is seen in FIG. 28 with reference to a rotated template 2800 where the average angle 2801 (angle$_{average}$) between the two detected FPs, angle$_{fp0}$ and angle$_{fp1}$, is computed by implementing Pseudocode 23:

---
** Pseudocode 23 **
---
if
(
 abs(angle$_{fp0}$ − angle$_{fp1}$)
 >
 (
  pi / 2
  −
  max(angle$_{fp0}$, angle$_{fp1}$)
  +
  min(angle$_{fp0}$, angle$_{fp1}$)
 )
):
 angle$_{average}$ =
 (
  min(angle$_{fp0}$, angle$_{fp1}$)
  −
  (
   pi / 2
---

---
** Pseudocode 23 **
---
  −
  max(angle$_{fp0}$, angle$_{fp1}$)
  )
 )
 / 2
 if angle$_{average}$ < 0:
  angle$_{average}$ = pi / 2 + angle$_{average}$
else:
 angle$_{average}$ =
 (
  angle$_{fp0}$
  +
  angle$_{fp1}$
 )
 / 2
---

A detailed description of rotating a template by a specified angle is not provided herein as a variety of well-known methods may be employed, such as an affine transformation with interpolation.

Once a template 2800 incorporating dot gain information and angular rotation information is formed, the process 2402*a* of forming a pattern matching template from CCA information is terminated at a final step 2504.

Forming Template—Cut Out and Average

Figure 26:
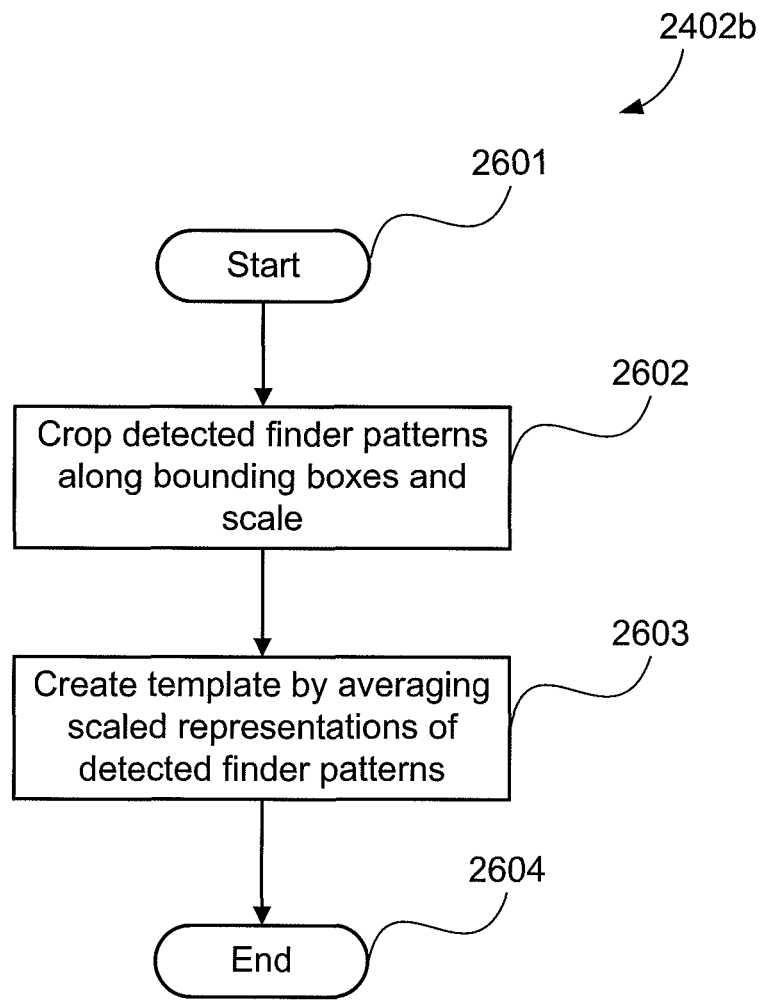
FIG. 26 is a flowchart giving a general overview of an alternative process that may be employed at step 2402 for forming a pattern matching template by averaging two initially detected finder patterns.

FIG. 26 shows an alternative method 2402*b* of forming a pattern matching template, which may be employed at step 2402. Here, a template is created by cutting out from the input or binarized image 410, 412, the two already detected FPs, and then scaling and averaging those two already detected FPs.

The process 2402*b* begins at an initial step 2601 in which a 2/3 region is input.

At a following step 2602, the two already detected FPs in the 2/3 region are cropped from the acquired image using the bounding box information of each FP. The two cropped images may differ slightly in height and width, and so scaling is then employed in step 2602 to scale both images to the average height and width of the two detected FPs. Again, an affine transformation may be used to accomplish this goal.

At a following step 2603, each pixel from the two scaled representations of the FPs is averaged by summing the two pixel intensities and dividing that sum by two. The result is a template that is an averaged representation of the detected FPs encompassing any noise and distortion effects introduced by printing and scanning operations.

The process 2402*b* of forming a template 2402 terminates at a final step 2604.

Search Regions

The process 2403 of forming candidate search regions potentially containing a third finder pattern is now described in detail with reference to FIGS. 29A to 30.

Figure 29A:
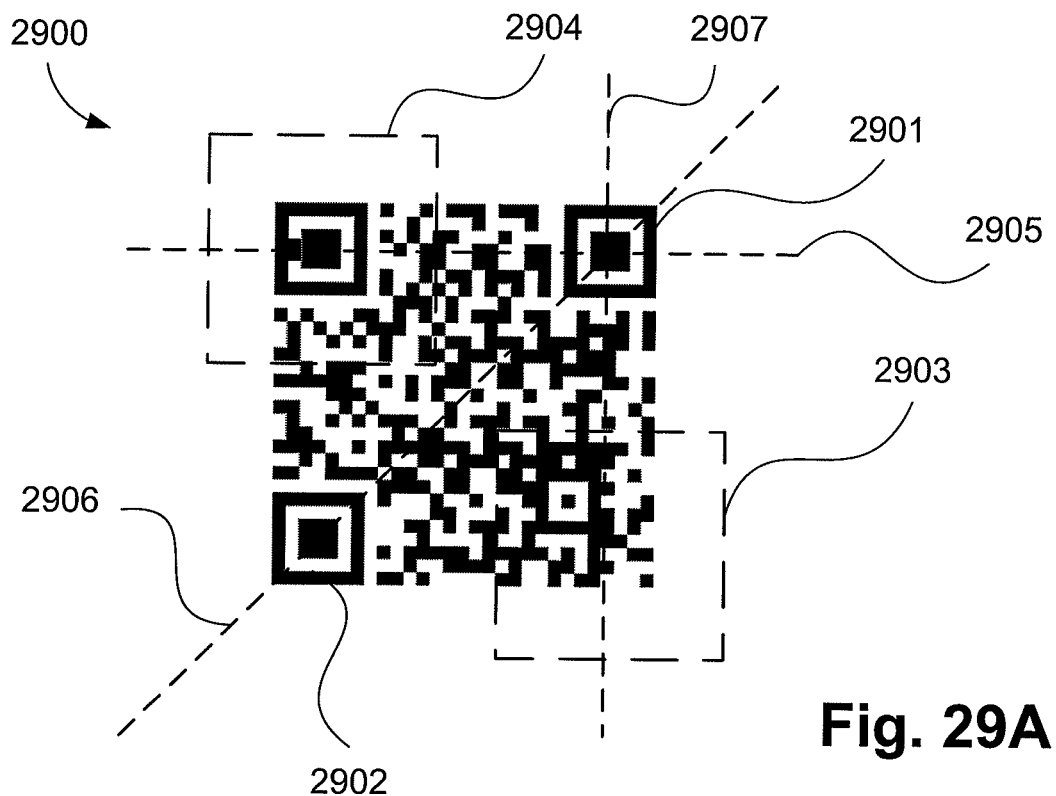
FIGS. 29A and 29B show examples of search regions and their relation to detected finder patterns in normally and diagonally oriented QR code regions.
Figure 29B:
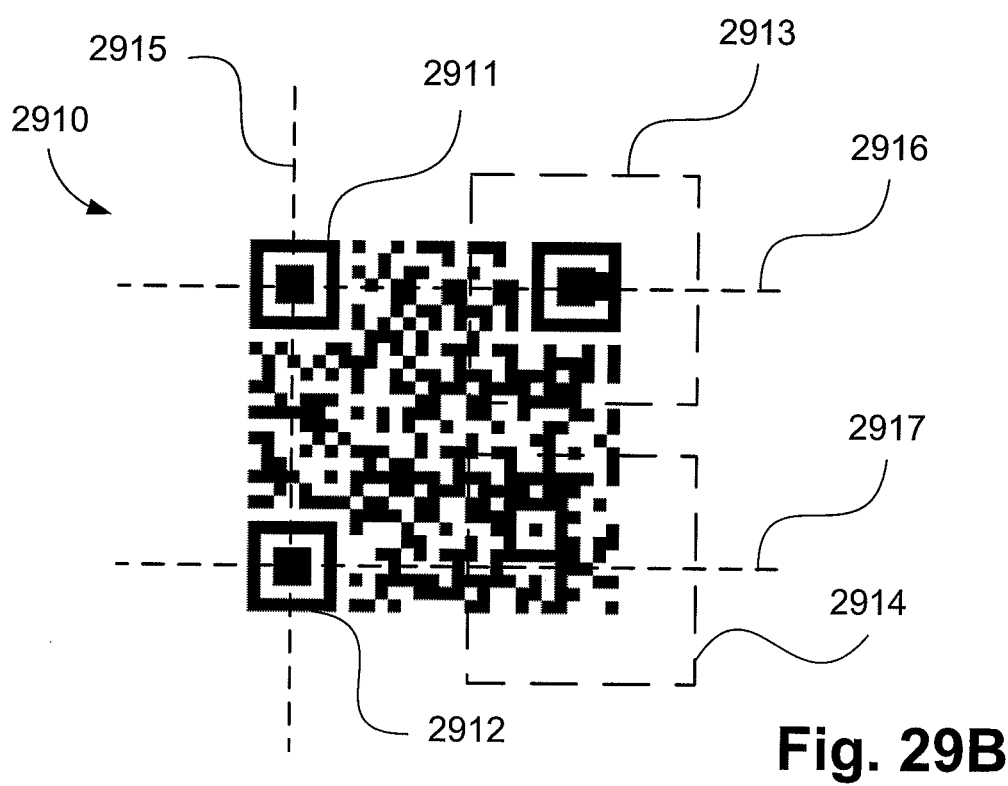

FIG. 29B shows an example of a normally oriented 2/3 region 2910 and FIG. 29A shows an example of a diagonally oriented 2/3 region 2900. The process 2403 of generating search regions differs depending on whether a normally or diagonally oriented 2/3 code region is to be processed at step 2403. The appropriate processes for both types of 2/3 region are described below.

In the normally oriented 2/3 region 2910 of FIG. 29B, two rectangular search regions 2913 and 2914 are formed about or adjacent to the detected finder patterns 2911 and 2912. This may be achieved by forming two lines 2916 and 2917 perpendicular to a line 2915, the lines 2916 and 2917 running through the centres of the respective detected finder patterns 2911 and 2912. The lines 2916 and 2917 define the locations of the search regions 2913 and 2914 through a process to be described later with reference to FIG. 30. Note that the 2/3 region 2910 shown in FIG. 29B is only one of two possible 2/3 regions that will have been formed from the two detected finder patterns 2911 and 2912 in the step 404. Another 2/3 region will also have been formed to the left of finder patterns 2911 and 2912, however search regions for this 2/3 region can be formed in the same way as for the region 2910 shown in FIG. 29B.

In the diagonally oriented 2/3 region 2900 of FIG. 29A, the two rectangular search regions 2903 and 2904 are formed about or adjacent to the detected finder patterns 2901 and 2902. Here, two lines 2905 and 2907 are formed at 45° to a line 2906 that passes through the centres of the two detected finder patterns 2901 and 2902. Both of these lines 2905 and 2907 must pass through the centre of one of the two detected finder patterns 2901, 2902. The selection of the central FP is arbitrary. These lines 2905 and 2907 define the locations of the search regions 2903 and 2904 through the process to be described next with reference to FIG. 30.

Figure 30:
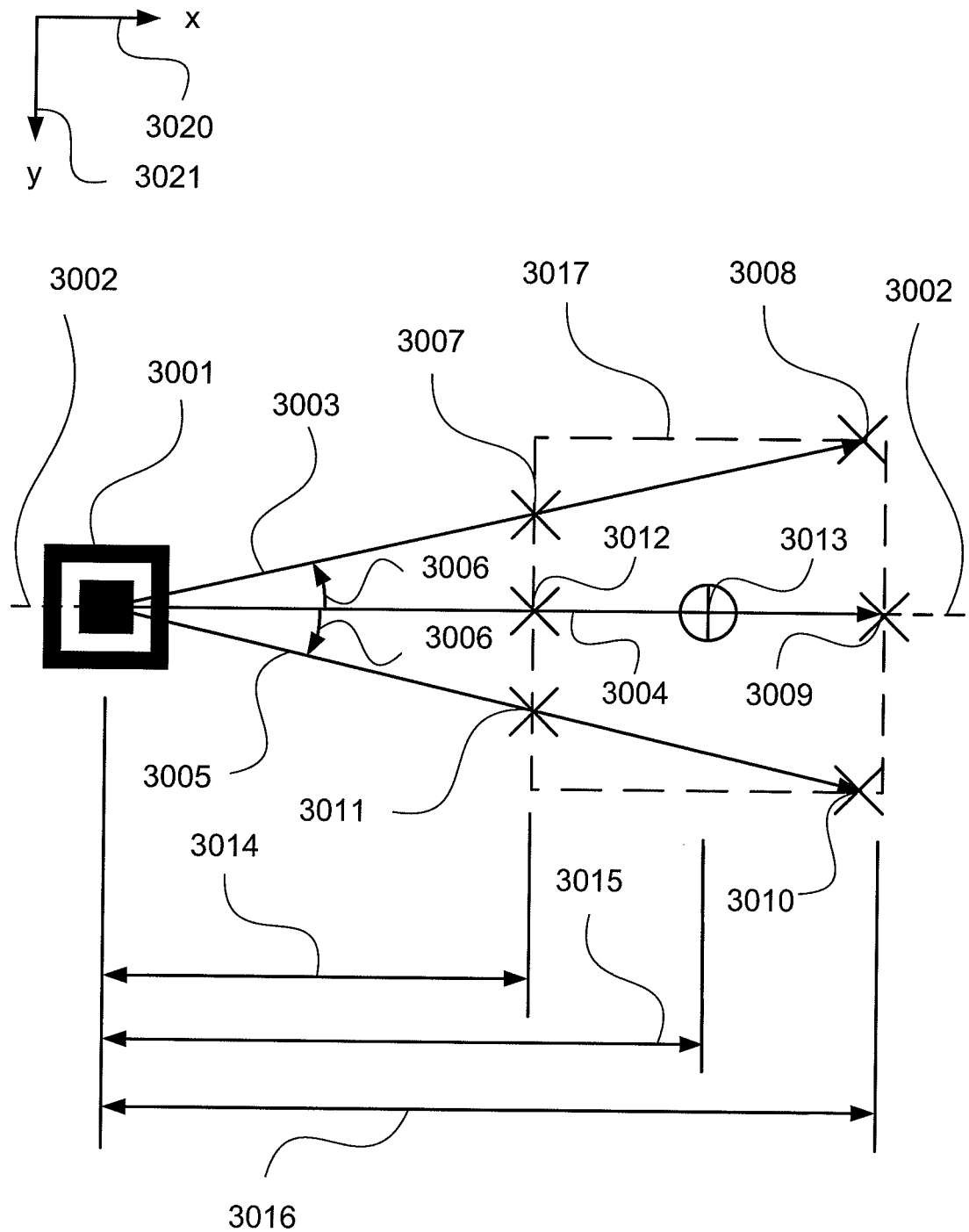
FIG. 30 show vectors and angles formed to determine the extents of a search region.

FIG. 30 shows a detected finder pattern 3001 and an adjacent search region 3017 located on a line 3002. FIG. 30 shows how a search region is formed based on a finder pattern in a 2/3 region and a known line passing through the centres of the finder pattern and the search region. Referring back to the normally oriented code region 2910 of FIG. 29, note that the arrangement shown in FIG. 30 could correspond to the finder pattern 2911 and adjacent search region 2913 (on line 2916), or alternatively, to the finder pattern 2912 and adjacent search region 2914 (on line 2917). Referring to the diagonally oriented code region 2900 of FIG. 29A, further note that the arrangement of FIG. 30 could correspond to the central finder pattern 2901 and either of the adjacent search regions 2903 or 2904 (on lines 2905 and 2907 respectively).

The centre 3013 of the search region 3017 corresponds to an expected location of a missing finder pattern. The distance 3015 between the finder pattern 3001 and the centre 3013 of the search region 3017 is the nominal distance (to be referred to as $D_{nom}$) between adjacent finder patterns in the code region being processed. In a normally oriented code region, such as the code region 2910, the nominal distance $D_{nom}$ is the distance between the centres of finder patterns 2911 and 2912 along line 2915. This can be represented by Pseudocode 24:

---
** Pseudocode 24 **

$D_{nom, normal}$ = distance(first detected FP to second detected FP)

---

In a diagonally oriented code region such as the code region 2900, the nominal distance $D_{nom}$ is the distance between the centres of finder patterns 2901 and 2902 along the line 2906, divided by 1.41. This can be represented by Pseudocode 25:

---
** Pseudocode 25 **

$D_{nom, diagonal}$ =
  distance(first detected FP to second detected FP)
  /
  1.41

---

Note that the constant 1.41 as used above approximates the square root of 2.

The boundaries of the rectangular search region 3017 are defined such that the region is as small as possible, whilst still including all of the control points 3007, 3008, 3009, 3010, 3011 and 3012. Note that the rectangular search region is always oriented with sides parallel to the axes (e.g. 3020 and 3021) of the coordinate system in use, regardless of the angle of the line 3002. This is because such rectangular and normally oriented search regions allow for a simple implementation of the later template matching process.

The locations of the points defining the boundaries of the rectangular search region 3017 are based on the application of both a magnitude tolerance $tolerance_{magnitude}$ and angle tolerance $tolerance_{angle}$ to the expected location of the undetected finder pattern 3013. The point 3009 is found as the endpoint of the vector 3004 from the finder pattern 3001 along the line 3002 of length $D_{max}$ 3016. The length $D_{max}$ can be calculated as follows:

---
** Pseudocode 26 **

$D_{max} = (1 + tolerance_{magnitude}) \times D_{nom}$

---

The point 3012 is found as the point along the vector 3004 at a distance $D_{min}$ 3014 from the finder pattern 3001. The distance $D_{min}$ can be calculated as follows:

---
** Pseudocode 27 **

$D_{max} = (1 - tolerance_{magnitude}) \times D_{nom}$

---

A vector 3003 is found by rotating the vector 3004 away from the line 3002 by $tolerance_{angle} \times pi/2$ 3006. The points 3007 and 3008 are found at distances $D_{min}$ and $D_{max}$ along this vector, respectively. The points 3010 and 3011 are found similarly along vector 3005, rotated $tolerance_{angle} \times pi/2$ 3006 in the other direction from line 3002.

In this implementation, rectangular search regions with sides parallel to the axes of the coordinate system are used, however one skilled in the art will recognise that any search region formed using methods similar to those described herein may alternatively be used. The arrangements described herein teach that search regions should be formed based on the expected locations of missing finder patterns and some applied tolerances, resulting in search regions of sizes on the order of the size of the potential code region (i.e. much smaller than the whole page). In the presently described implementation, a magnitude and angle tolerance is used, and a rectangular search region is fitted to the area defined by those tolerances. Conceivably, an alternative means of applying a tolerance to the expected location of missing finder patterns may be employed to define search regions of any shape without departing from the present teachings.

Applying the Template

At step 2404, the template formed at step 2402 is applied in a template correlation process in the search regions identified at step 2403.

Two-dimensional (2D) correlation is a well-known method for detecting and locating a sought-after feature in an image. 2D correlation involves passing a template over the content contained in a search region to yield a 2D correlation map. Each point in the correlation map indicates the similarity of the template and overlapping search area at that point. Thus, a sharp peak in the correlation map indicates that a feature resembling the template is present in the content of the search region at the coordinates of the peak.

In step 2404, 2D correlation with the FP template formed at step 2402 is applied on each search region specified by step 2403 to determine if a third FP is present. In determining whether a third FP is present, a predetermined peak strength threshold is applied. If the highest peak of the correlation maps of either of the search regions is higher than the predetermined threshold, an FP is determined to exist in that search region at the location of the peak. If an FP is found in both search regions, the third FP of the 2/3 region is determined to be the FP with the higher peak in the corresponding correlation map. If a third FP is successfully found, processing continues at step 2405 to output a complete QR region. If a correlation peak of strength greater than the pre-determined correlation peak threshold could not be found in either of the search regions specified by step 2403, the template matching process 2404 is deemed a failure and processing continues at step 2406 where the process 2304 concludes.

An alternative method of template correlation, as applied at step 2404, involves a one-dimensional correlation (instead of the 2-D correlation method described). A one-dimensional correlation involves taking a 'slice' through the described 2-D pattern matching template formed at step 2402. A 'slice' is a cross-section through the centre point of the template, oriented at the same angle of rotation, $angle_{average}$, as the template. Subsequently, a line-by-line search is performed through the search regions. If the search yields a line of pixels resembling the template 'slice', then the third FP is deemed to have been successfully found. Additionally, the search may be performed at a direction perpendicular to the angle of rotation, $angle_{average}$.

Alternative Implementations

An alternative implementation to QR code detection and decoding exploits the inherent features of a QR code to aid in the process of detecting a missing FP in a 2/3 region.

Figure 32:
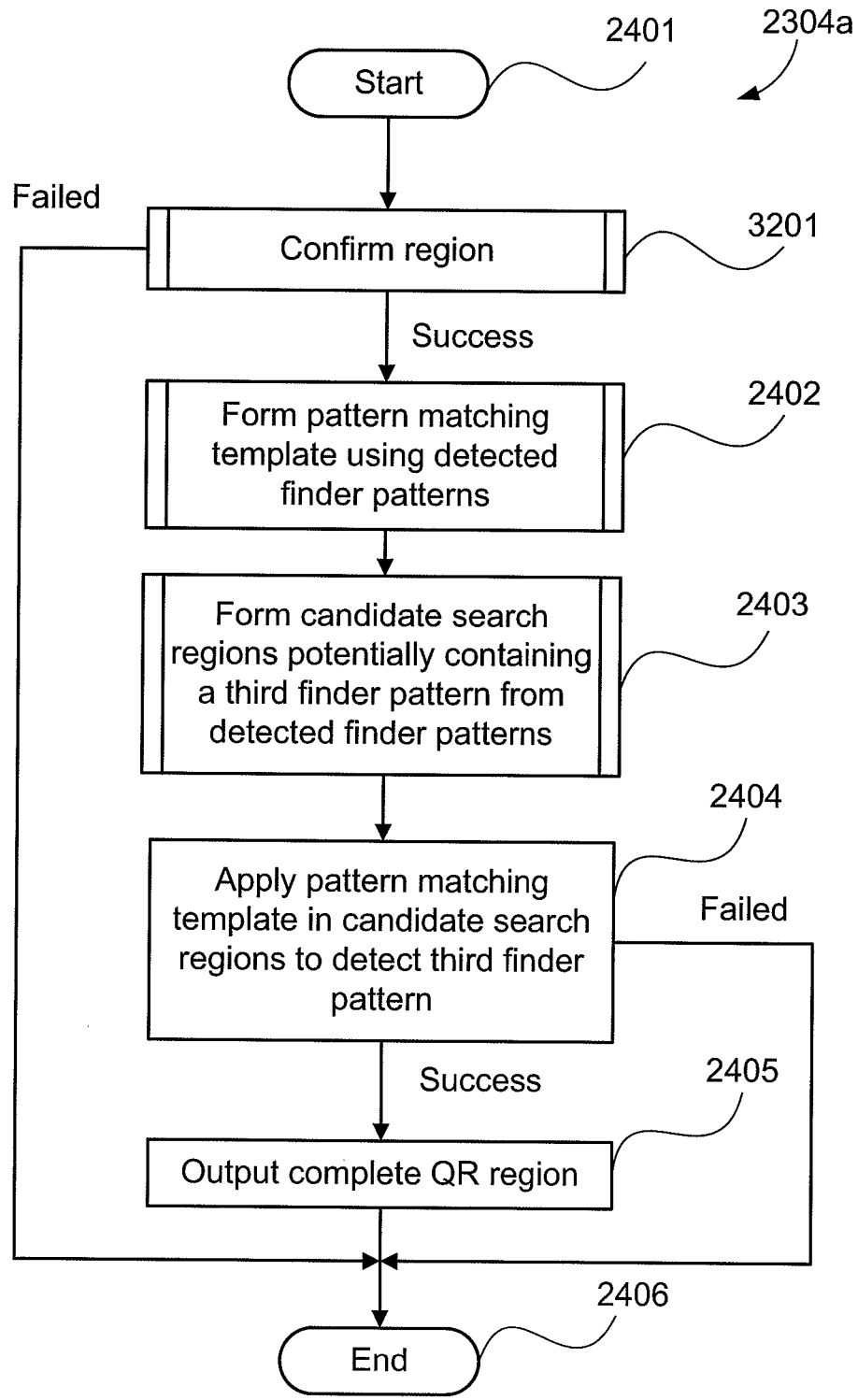
FIG. 32 is a flowchart of an alternative process for detecting a missing finder pattern utilising inherent QR code features.

In this alternative implementation, the process 2304 of detecting a missing FP is altered to the process 2304*a* seen in FIG. 32 and which comprises an additional region confirmation step 3201, with other steps being the same as described and numbered above.

Figure 31:
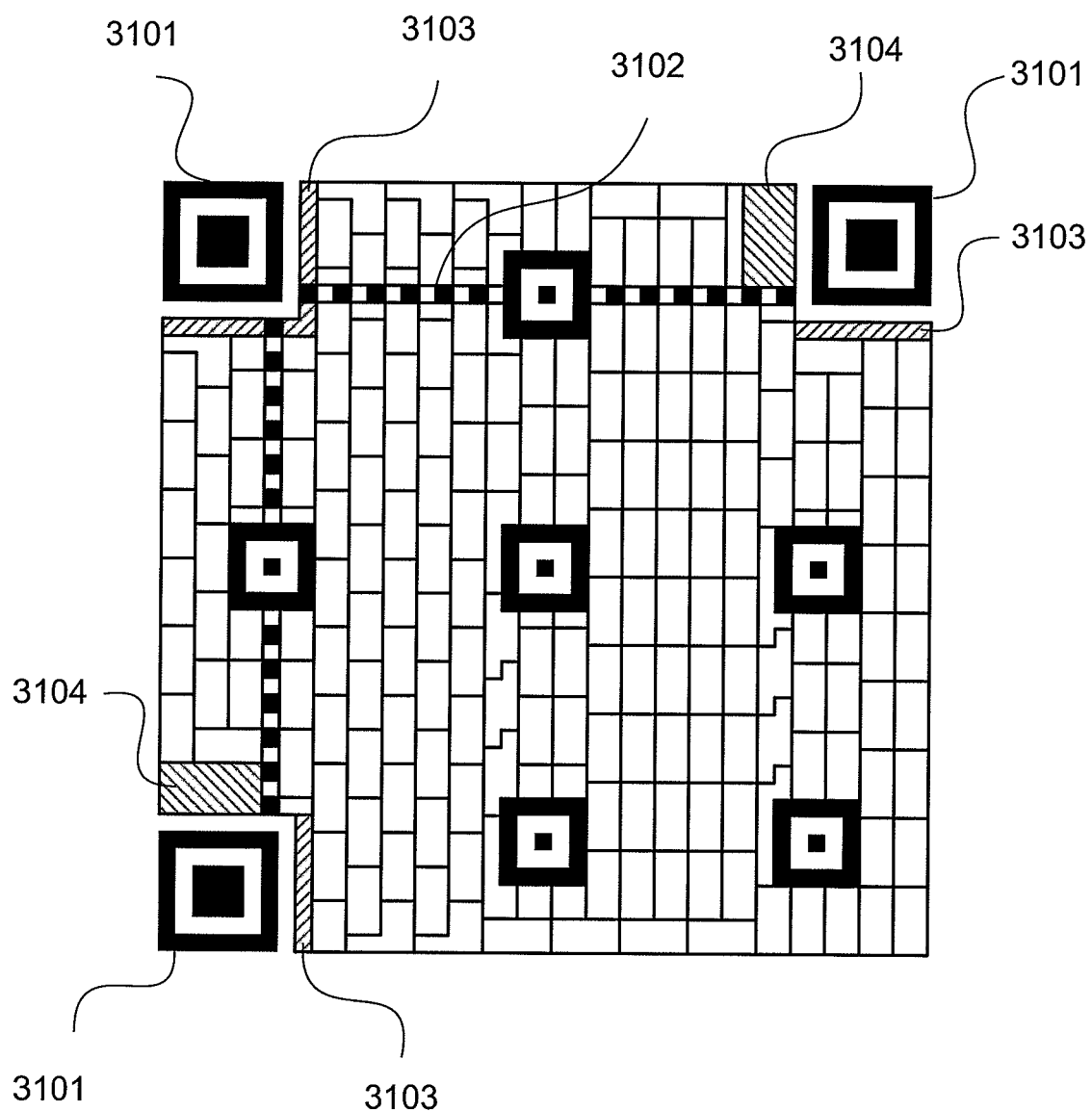
FIG. 31 shows various inherent features of a QR code that may be utilised to aid in the checks of step 1201 or in the process of detecting missing finder patterns employed at 2304.

In a first example of the region confirmation step 3201, a clocking pattern is sought. As seen in FIG. 31, QR codes comprise clocking patterns 3102 that run between FPs. These clocking patterns 3102 consist of alternating black and white modules that run in a straight line from the top-left FP to the bottom-left and top-right FPs. Consequently, a simple check may be implemented to detect a linear progression of alternating black and white modules leading away from each of the two already detected FPs. If alternating black and white modules resembling a clocking pattern are detected, then the region confirmation step 3201 is successful and step 2402 described above follows. Otherwise, the region confirmation step 3201 fails and step 2406 follows.

A second example of the region confirmation step 3201 inspects the frequency characteristics of the code region. The QR code module size may be calculated from the two already detected FPs. Therefore, frequency analysis techniques (such as a 2-D Fourier Transform) may be used to determine if the frequency of black and white modules in the code region matches that of the detected FPs. Specifically, it is expected that the energy in the code region is concentrated at a frequency that maps to the QR code module size. If this is the case, then the region confirmation step 3201 is successful and step 2402 follows. Otherwise, the region confirmation step 3201 fails and step 2406 follows.

A further alternative implementation to QR code detection and decoding exploits version information 3104 in a QR code, as seen in FIG. 31, to aid in the check of step 1307 (FIG. 13), which checks if the FPs conform to QR code versions 1-40. QR codes larger than version 6 encode the code's version in close proximity to the QR code finder patterns. The version information is error-corrected and may be decoded using known methods. Given a QR code module size (calculated from detected FPs), the QR code version may be used to determine the physical size of the QR code in pixels. Thus, at step 1307, a check may be made to determine if the distance between detected FPs is consistent with the physical size of the QR code (as determined by decoding version information).

Conclusion

CCA of itself is an imperfect tool for finder pattern detection. Whilst CCA is fast and inexpensive, it is unable to detect finder patterns that have been topologically damaged, for example where the inner component 103 is found to be connected to the outer component 101, or there is a cut or break in the outer component. However by combining CCA with template matching and limiting the combination to regions where finder patterns are expected, the present inventors have found that the advantages of CCA (robust to size, rotation and dot gain) combine with those of template matching (robust to topological damage) whilst avoiding their corresponding disadvantages. With this approach, missing finder patterns can be reliably located permitting efficient QR code decoding where previously decoding was computationally expensive or prone to errors.

Target Feature Detection System

Arrangements are disclosed to detect the presence, and determine the location of a target feature in an image that may contain other content such as text or drawings.

Description of a Valid Target Feature

Figure 34:
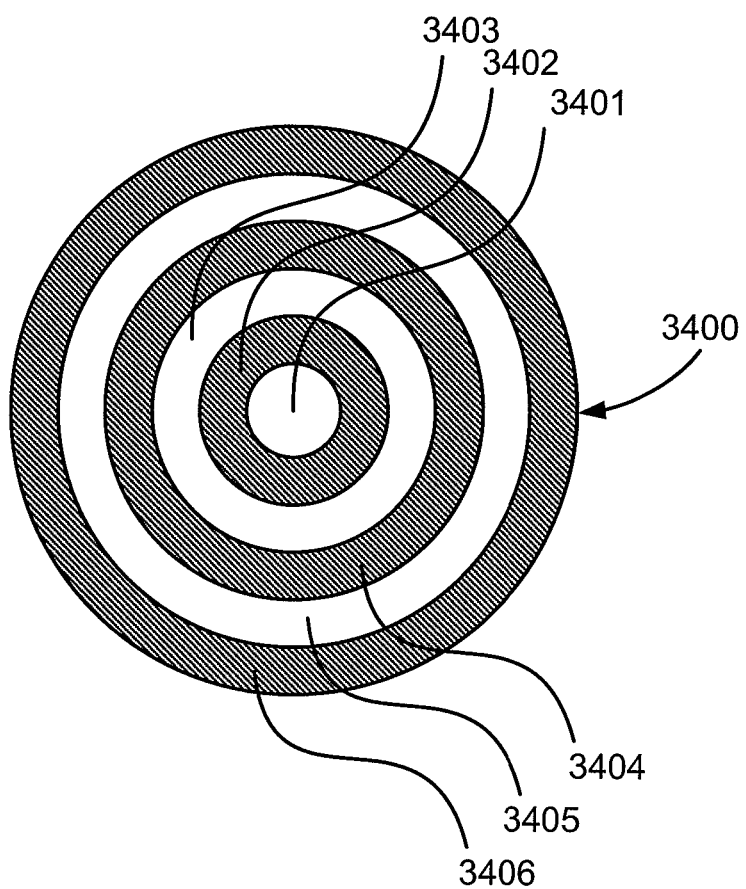
FIG. 34 is an alternative target feature that is also valid in the context of the present disclosure.

A valid target feature will now be described with reference to FIG. 1 which shows what may be considered a target feature 100 having regions of two differing intensity levels. For simplicity, regions of a lower intensity will be referred to as being black, whereas regions of a higher intensity will be referred to as being white. The target feature 100 is composed of a continuous black region 103 entirely enclosed by a continuous white region 102, which in turn is entirely enclosed within a continuous black region 101. However, this disclosure is not limited to the arrangement shown. It should be understood that the innermost region 103 may be white, though the subsequent outer region 102 must then be black, and so on. Thus, as long as such an alternation of black and white (ie. darker and lighter) regions is preserved, an arrangement is a valid target feature. Furthermore, a valid target is not limited to three alternating black and white regions as shown in the target feature 100, but may consist of more than three distinct regions. For example, the feature 3400 of FIG. 34 is a valid target feature, and includes six distinct black and white regions (3401, 3402, 3403, 3404, 3405, 3406).

Description of Target Feature Detection

Figure 1:
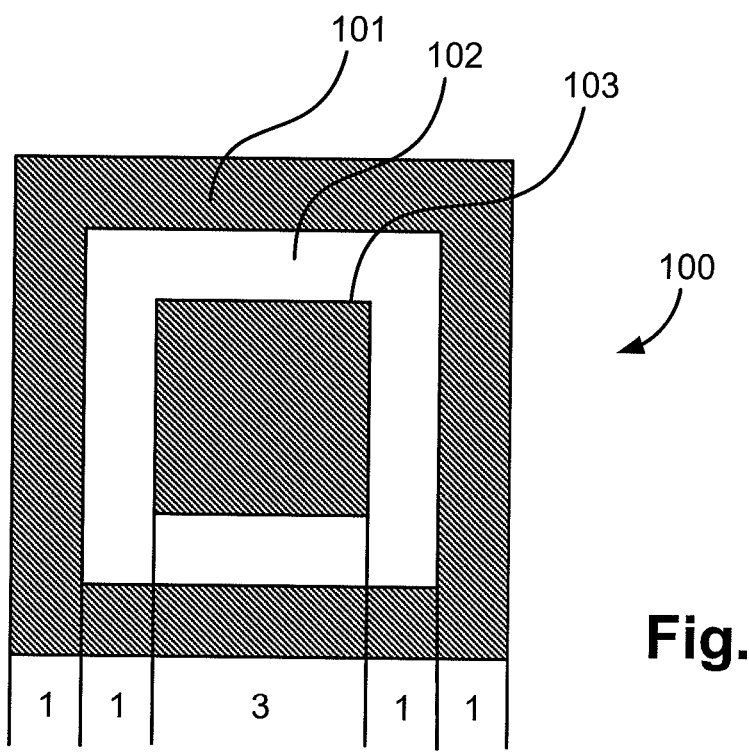
FIG. 1 shows an ideal arrangement of a QR code 'finder pattern' which may also be considered a target feature.
Figure 3:
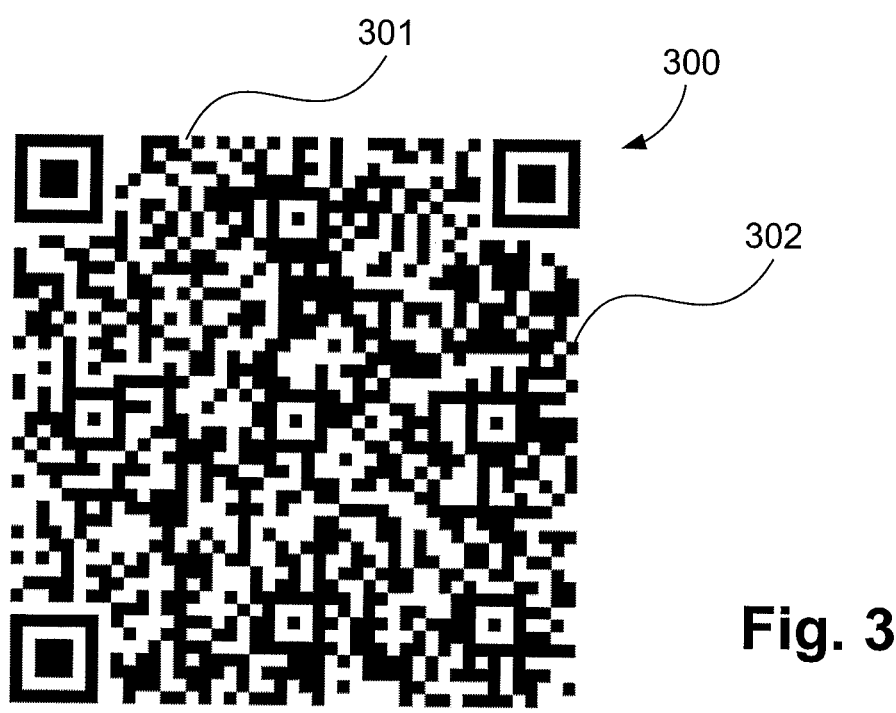
FIG. 3 shows a QR code with examples of black and white modules.
Figure 2A:
FIGS. 2A and 2B show a QR code affected by noise and dot gain.
Figure 2B:
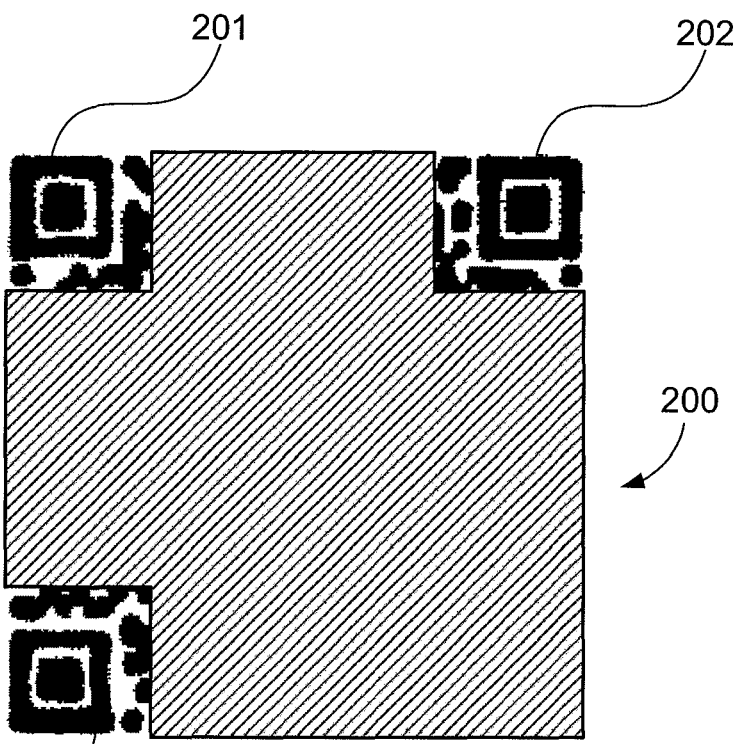
Figure 35:
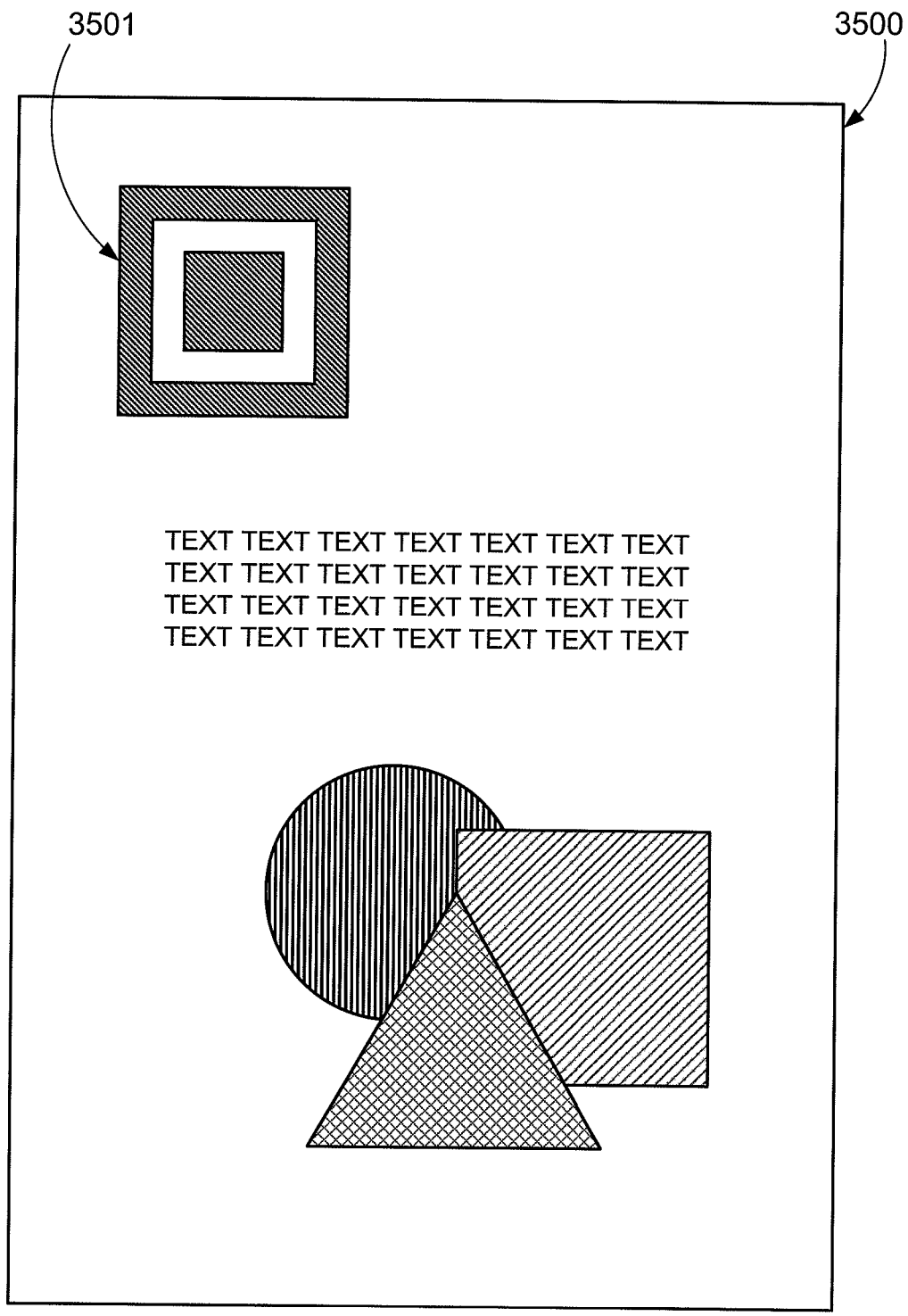
FIG. 35 is a digital image with a target feature.

The target feature 100 of FIG. 1 may be embedded in a document with other content, such as text or drawings. Also, the document may contain multiple target features of interest. This document may then be printed and scanned to form a digital image 3500, seen in FIG. 35. The digital image 3500 may be acquired by methods other than scanning, such as from a digital camera. The printing and scanning processes may introduce noise and distortions such that the digital image 3500 is an imperfect representation of the original document. Therefore, the representation of the target feature 3501 in the digital image 3500 may be noisy and distorted. The presently described arrangement detects and locates target features in the digital image 3500 even if the target feature 3501 is affected by noise and distortion.

A process 3600 for detecting and locating a target feature 3501 in the digital image 3500 is now described with reference to FIG. 36. The process 3600 for detecting and locating a target feature is preferably implemented by executing a software application upon the computer system 3300 begins at a step 401 where the digital image 3500 is input, for example by being retrieved from the HDD 3310 by the processor 3305.

Figure 37:
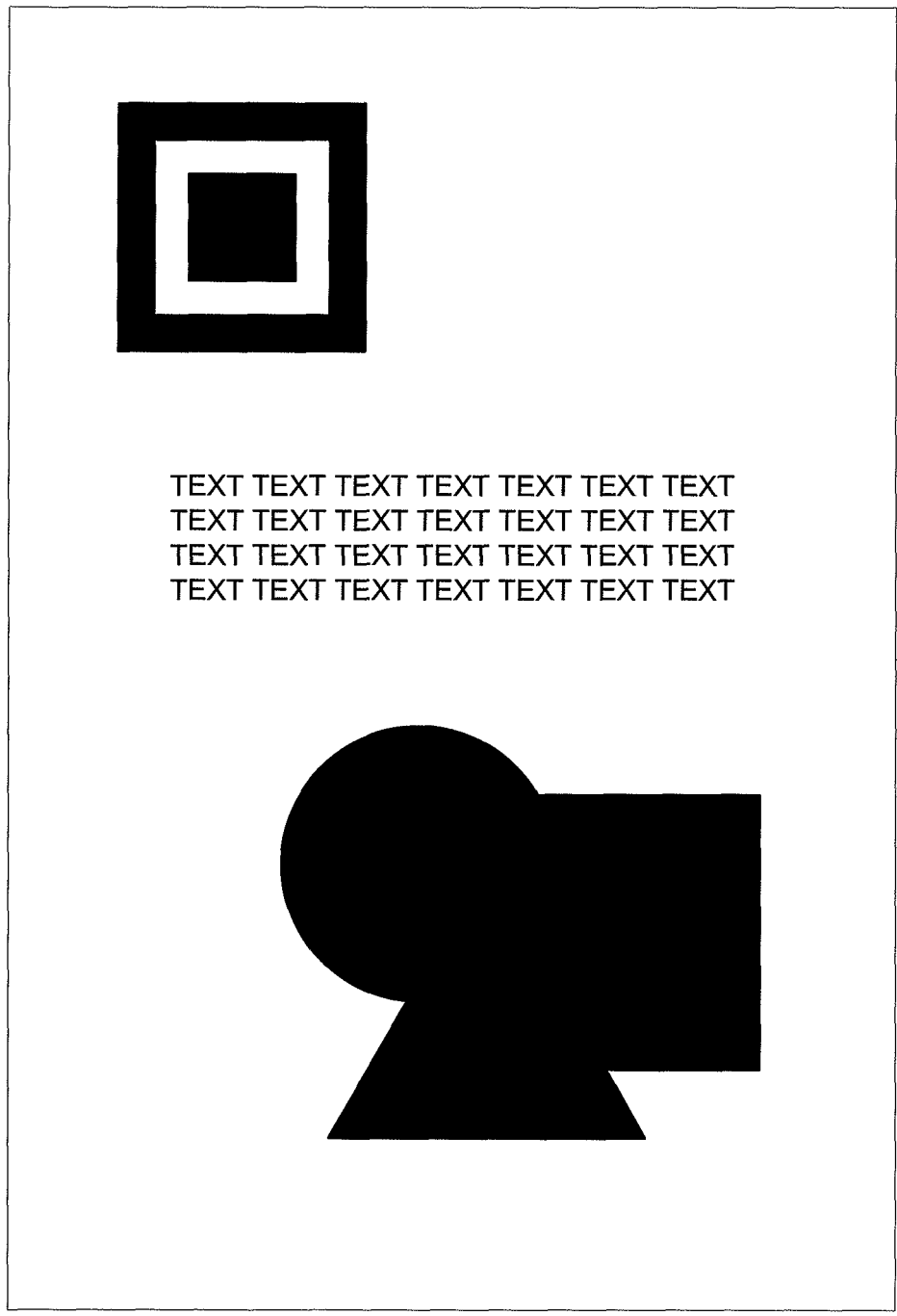
FIG. 37 is a binarized image created from the digital image 300.

In a next step 3602 in the process 3600, the processor 3305 creates a binarized image 3700 seen in FIG. 37 from the digital image 3500 by executing a binarization process.

In a following step 3603, the processor 3305 takes the binarized image created in step 3602 and performs connected components analysis on the binarized image 3700. The connected components analysis process 3603 operates to identify features in the binarized image 3700 that contain black and white regions thus permitting delineation of the two, this being a requirement for valid target features. The features in the binarized image 3700 identified by the connected components analysis process 3603 are referred to as candidate target features. Also, during the connected components process 3603, low-level metrics corresponding to geometric properties of the candidate target feature are calculated by the processor 3305. These low-level metrics and aggregation of the metrics will be described in detail later.

In a following step 3604, each low-level metric of the candidate target feature is used to determine size information, positional information and a similarity score associated with the candidate target feature. The similarity score determines how closely a candidate target feature resembles the sought-after target feature 100. Thus, if a candidate target feature is actually a target feature 100 that has been slightly corrupted by noise and distortions, the similarity score of that candidate target feature will be high. On the other hand, if a candidate target feature differs geometrically from the target feature 100 then the candidate target feature will have a low similarity score. Size information, positional information and similarity score will be described in detail later.

In a following step 3605, a post-processing step is applied to the size information, positional information and similarity score of the candidate target features to achieve various goals depending on the particular implementation being performed. This post-processing step may be different for each implementation and will be described in detail later.

The process 3600 for detecting and locating target features is terminated in a following and final step 3606.

Description of Thresholding

There are various ways of carrying out the binarization step 3602 of the image. In an exemplary implementation, the step 3602 in which a binarized image 3700 is created from a digital image 300 is performed using an adaptive method and will now be described in detail with reference to FIG. 38. The binarization step 3602 described divides the image into a tessellation of tiles of pixels, and calculates an appropriate threshold for each pixel from a neighborhood of tiles. For each tile, the minimum intensity value, $min_{tile}$, and maximum intensity value, $max_{tile}$, is stored. As an example, the digital image 3500 is divided into tiles that are 32 pixels wide and 32 pixels high. FIG. 39 shows how a digital image 3500 may be divided into tiles 3901. The binarization step 3602 described herein is a robust and efficient algorithm that may be implemented in software by the processor 3305 or using hardware logic formed as part of the computer 3301, such as an ASIC, and operating under control of the processor 3305. Again, it should be understood that any binarization method that produces a two-level image from an input image may be used in this step.

Figure 38:
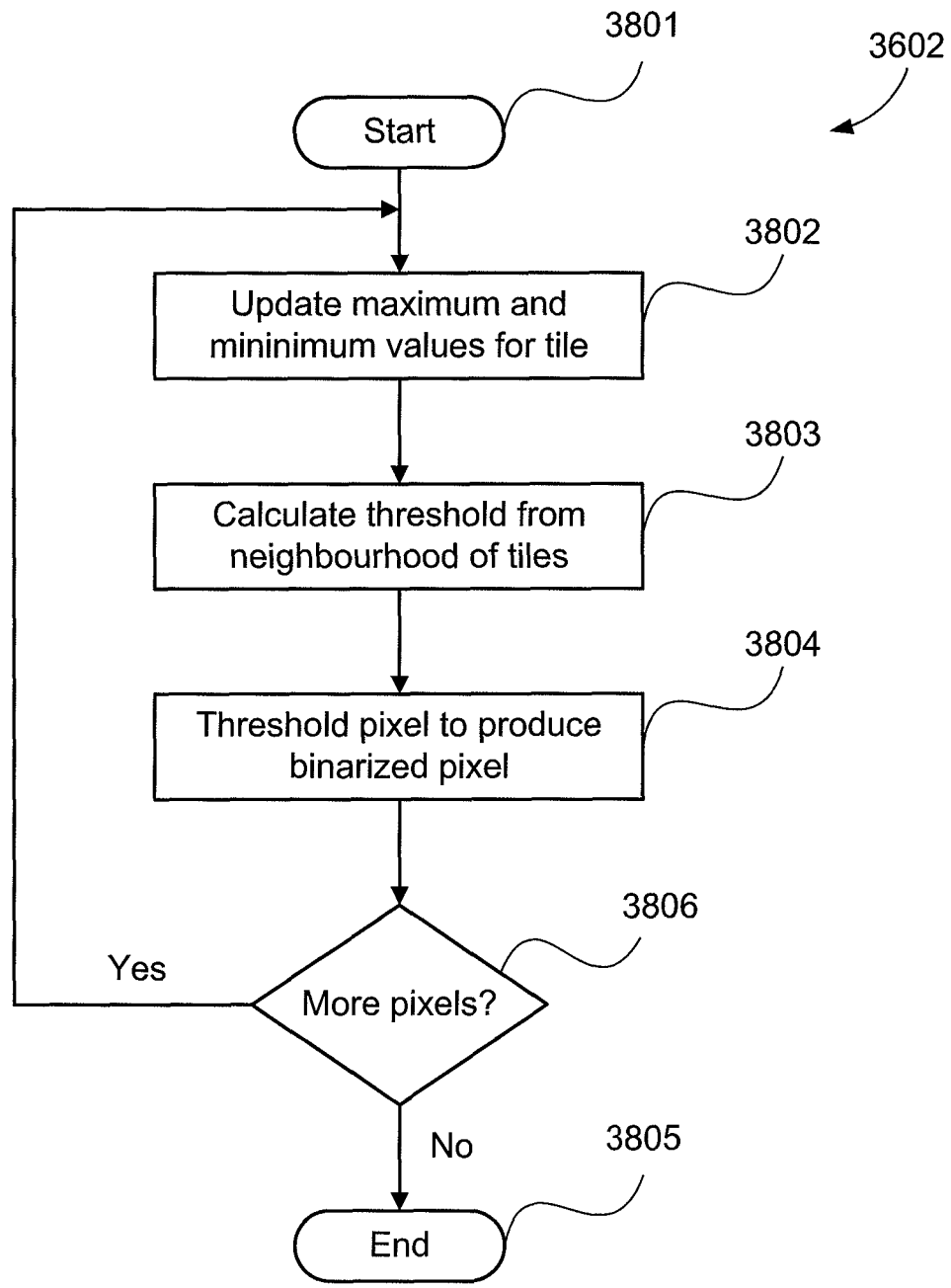
FIG. 38 is a flowchart representing a method of binarization which may be used in the present arrangements.
Figure 39:
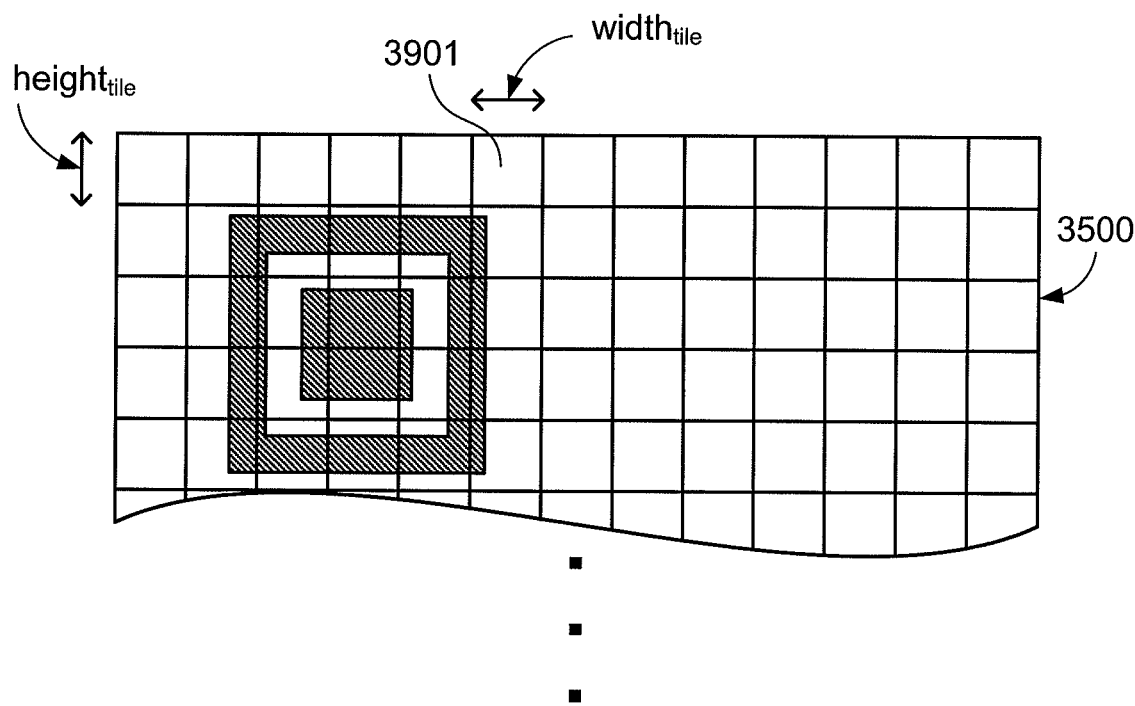
FIG. 39 shows how a digital image 300 may be divided into a tessellation of tiles.
Figure 40:
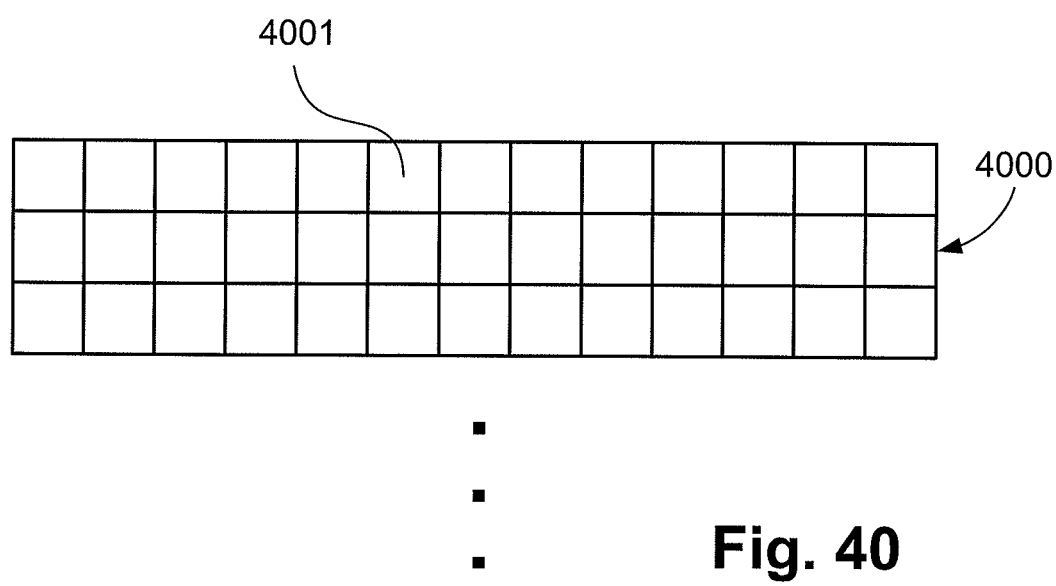
FIG. 40 shows the two-dimensional array structure of a tile buffer.

The binarization step 3602 of FIG. 38 begins at a first step 3801 in which a digital image 3500 is input. The digital image 3500 is processed one pixel at a time, beginning from the top-left pixel. The digital image 3500 is processed in a raster fashion, such that the order of pixel processing begins from the leftmost pixel in a row and proceeds to the rightmost pixel in the same row. Subsequently, processing resumes on the next row and repeats in the same left to right processing flow until the bottommost row is processed. Also in this initial step 3801, a tile buffer is established, for example in the memory 3306. The tile buffer serves as a temporary record of the minimum intensity value, $min_{tile}$, and the maximum intensity value, $max_{tile}$, in a tile. Referring to FIG. 40, a tile buffer 4000 is shown in which a tile memory 4001 that stores minimum and maximum intensity values for a tile 3901. The tile buffer 4000 can be regarded as a two-dimensional array where each element may be uniquely identified by an x-index, $x_{tile}$, and a y-index, $y_{tile}$.

In a following step 3802, the next pixel in the processing order is acquired. The maximum and minimum intensity values in a tile are updated according to the intensity of the acquired (or subject) pixel. A tile to update is obtained from the x-coordinate, $x_{pixel}$, and y-coordinate, $y_{pixel}$ of the subject pixel. An aspect of the binarization method 3800 is the capability to collect tile information several scanlines in advance of the pixel being binarized. The number of scanlines in advance of the pixel to be binarized in which tile information is collected is specified by a parameter $height_{forward}$. A tile x-index, $x_{tile}$, and tile y-index, $y_{tile}$, of the tile 3901 to update may be calculated as follows:

$$x_{tile} = floor(x_{pixel}/width_{tile})$$

$$y_{tile} = floor((y_{pixel} - height_{forward})/height_{tile})$$

The tile to update is uniquely identified by $x_{tile}$ and $y_{tile}$, and the corresponding tile memory 4001 in the tile buffer 4000 is accessed.

The maximum intensity value and minimum intensity value in the accessed tile memory is updated with reference to the intensity value of the subject pixel. If the intensity value is less than the minimum intensity value, the minimum pixel intensity value of the accessed tile memory is replaced with the intensity value of the subject pixel. Alternatively, if the intensity value of the subject pixel is greater than the maximum intensity value, the maximum pixel intensity value of the accessed tile memory is replaced with the intensity value of the subject pixel.

In this way, the maximum and minimum intensity values of tiles of the digital image 3500 are updated some scanlines in advance of the pixel currently being binarized. The binarized image 3700 once determined, may be stored in the memory 3306 or 3310.

Figure 41:
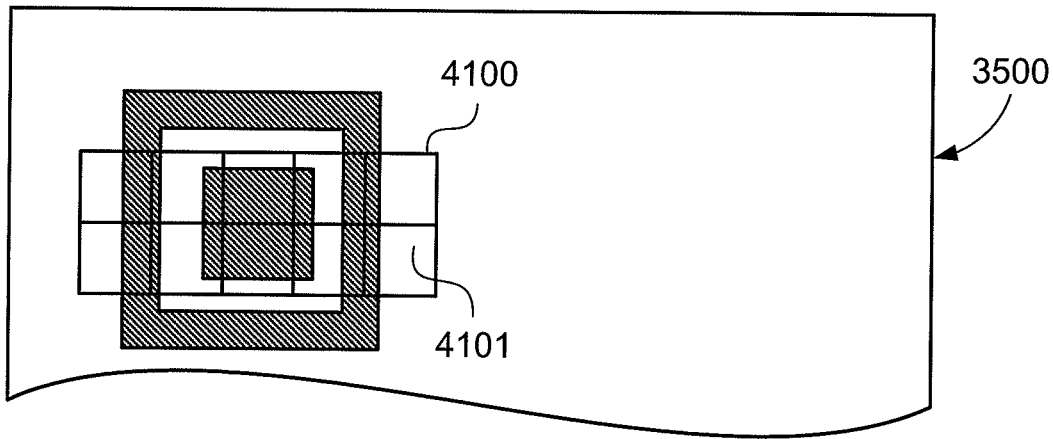
FIG. 41 shows a sliding window composed of tiles overlayed on a target feature.

In a following step 3803, a threshold is calculated by the processor 3305 from a neighborhood of tiles surrounding the subject pixel. In essence, a sliding window of tiles is formed around each subject pixel to be binarized. As an example, the sliding window has a width, $width_{window}=5$, and a height, $height_{window}=2$. FIG. 41 shows a sliding window 4100 overlayed on a digital image 3500 comprising tiles, including a tile 4101. A corresponding window for a subject pixel may be calculated from the coordinates, $x_{pixel}$ and $y_{pixel}$ of the subject pixel.

The y-index, $y_{tile}$, of the tiles corresponding to the topmost extent of the sliding window 4100 may be computed by the processor 3305 as follows:

$$y_{tile} = floor(y_{pixel}/height_{tile}) - height_{window}$$

The y-index, $y_{tile}$, of the tiles corresponding to the bottom-most extent of the sliding window 4100 may be computed as follows:

$$y_{tile} = \text{floor}(y_{pixel}/\text{height}_{tile}).$$

The x-index, $x_{index}$, of the tiles corresponding to the left-most extent of the sliding window may be computed as follows:

$$x_{tile} = \text{floor}(x_{pixel}/\text{width}_{tile}) - \text{floor}((\text{width}_{window}-1)/2).$$

The x-index, $x_{index}$, of the tiles corresponding to the right-most extent of the sliding window 4100 may be computed by the processor 3305 as follows:

$$x_{tile} = \text{floor}(x_{pixel}/\text{width}_{tile}) + \text{floor}((\text{width}_{window}-1)/2).$$

Once the corresponding sliding window 4100 for the subject pixel is obtained, a threshold value for the subject pixel may be calculated from the minimum and maximum intensity values, $\min_{tile}$ and $\max_{tile}$, of each tile 4101 within the sliding window 4100.

An exemplary threshold is a weighted average of threshold values for each tile. For each tile, a weighted tile threshold, $thr_{tile}$, is calculated by the processor 3305 evaluating the following equation:

$$thr_{tile} = ((\max_{tile}+\min_{tile})/2) \times (\max_{tile}-\min_{tile}).$$

Also, for each tile 4101, the tile weight, $\text{weight}_{thr}$, is calculated from the following equation:

$$\text{weight}_{tile} = \max_{tile} - \min_{tile}.$$

Consequently, the appropriate threshold for the subject pixel, $thr_{final}$, is found from the following equation:

$$thr_{final} = \frac{\sum_{tiles} thr_{tile}}{\sum_{tiles} \text{weight}_{tile}}.$$

There may be cases in which all pixels in the sliding window 4100 are of similar intensity, and are either all dark pixels or light pixels. In this case, the calculated threshold value, $thr_{final}$, will be unreasonably low or unreasonably high. Therefore, the resulting region in the binarized image 3700 would contain black and white pixels resembling noise, instead of a homogenous black or white region. To minimize the occurrence of these cases, the calculated threshold, $thr_{final}$, is allowed to float within a predetermined range (e.g. 50 to 210) but if the threshold exceeds this range, then the closest in-range value is used instead.

In a following step 3804, the threshold calculated at step 3803 is used to produce a binary white or black pixel in the binarized image 3700. If the intensity of the subject pixel is less than the threshold $thr_{final}$ calculated at step 3803, then the corresponding pixel in the binarized image 3700 is set to black. Otherwise, the corresponding pixel in the binarized image 3700 is set to white.

If there are more pixels to process, determined by the processor 3305 at step 3806, then steps 3802, 3803 and 3804 are repeated on the next pixel in the processing order. Otherwise, the binarization step 3602 is terminated at step 3805.

Figure 42:
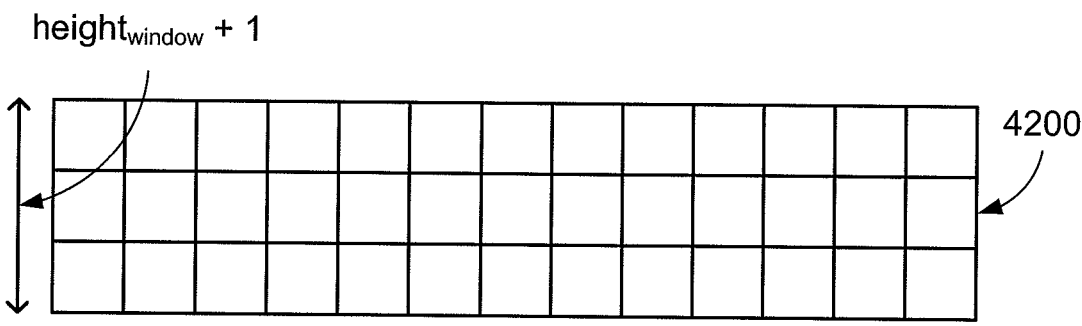
FIG. 42 shows a memory efficient tile buffer.

It should be noted that the described binarization step 3602 may be implemented using an array of discrete hardware logic elements, such as on an FPGA or ASIC. In such an implementation, it may be desirable to reduce memory usage. To achieve this, the tile buffer 4000 may be replaced with a more memory efficient implementation. Referring to FIG. 42, a memory efficient tile buffer 1000 comprises only $\text{height}_{window}+1$ rows of tile memory elements (assuming $\text{height}_{forward}$ is less than $\text{height}_{tile}$). When a tile is no longer referenced for threshold calculations, the corresponding tile memory of the tile is replaced with memory elements that will be required for threshold calculations.

Description of Connected Components Analysis (CCA)

Step 3603 performs connected components analysis (CCA) on a binarized image created at step 3602. The method of CCA described herein is an efficient algorithm configured specifically to detect predetermined target features. The CCA method described outputs groups of black connected components (CCs) found in the binarized image 3700. Where a target feature such as the feature 100 is detected, CCA will output pairs of CCs in which one CC is completely enclosed within and separated from the other. Where the target feature 3400 is used, CCA will output triplets of CCs in which one CC is completely enclosed within and separated from a second, which is in turn completely enclosed within and separated from a third CC. Additionally, the CCA method described herein collects low-level metrics associated with each CC. For simplicity, a method of detecting the target feature 100 will be described, however such may be readily extended to detect all valid target features as previously described.

Figure 44:
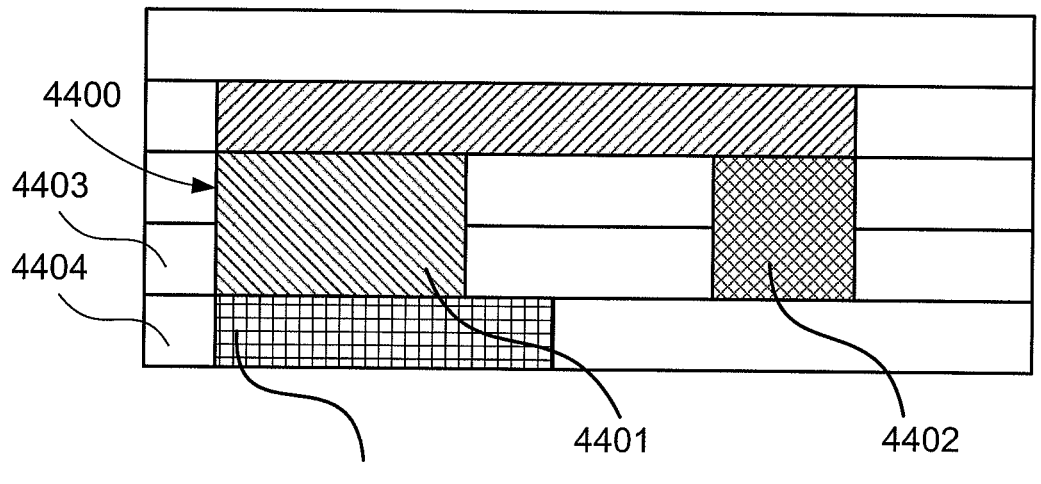
FIG. 44 shows the relationship between a CC, its claims, and run on a scanline.
Figure 43:
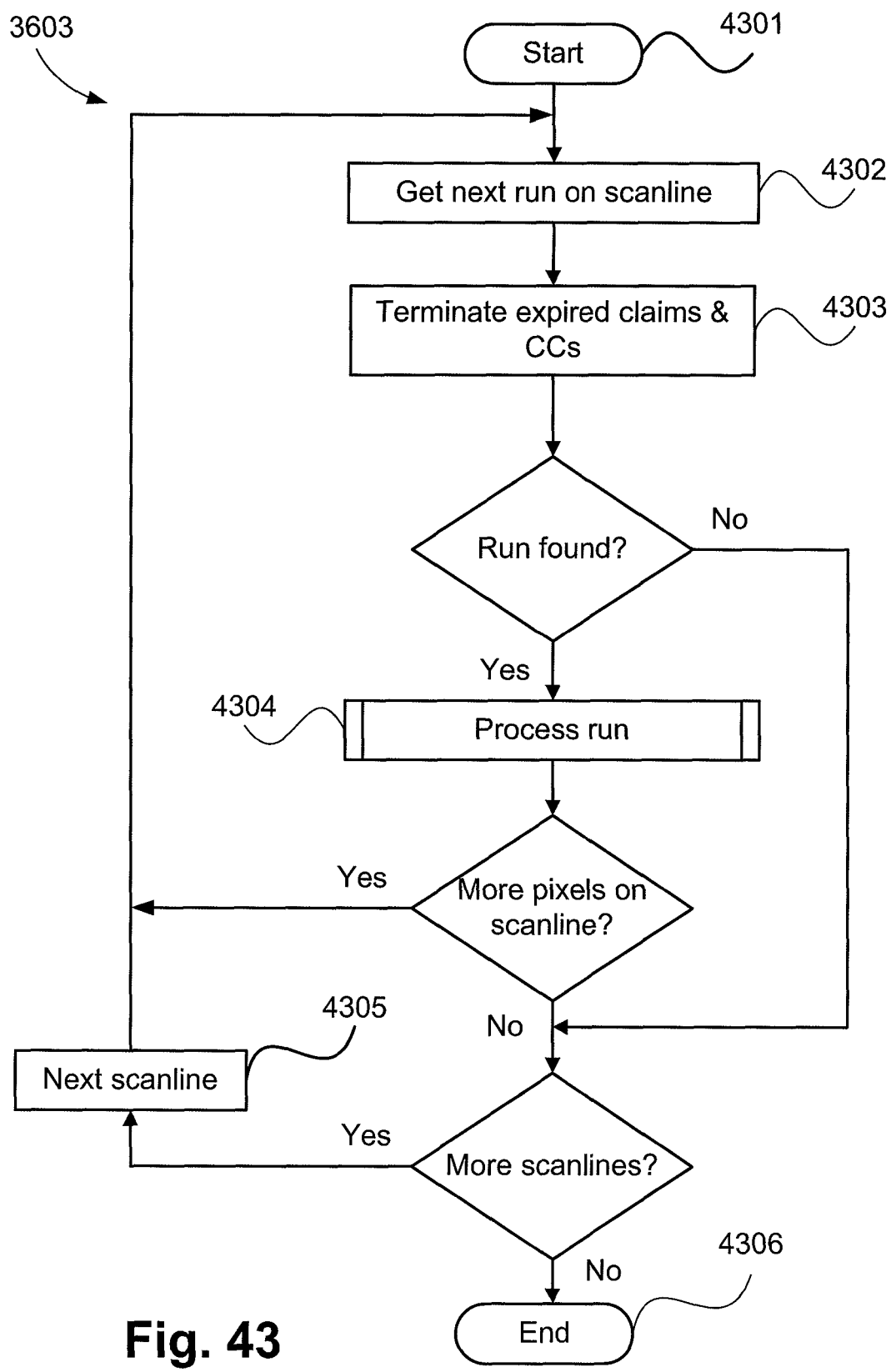
FIG. 43 is a flowchart representing a method of connected component analysis used in the present disclosure.

The method of CCA performed at step 3603 will now be described with reference to FIG. 43. The method 3603 begins at an initial step 4301 in which the binarized image 3700 is input. The CCA method 3603 processes the binarized image 3700 in a raster fashion similar to the previously described binarization method. This means that the CCA process begins at the leftmost pixel of the topmost scanline of the image 3700, and continues until all pixels in the image have been processed. The CCA method builds CCs line-by-line by finding runs of black pixels on a scanline, and adding these runs to CCs formed from runs on previous rows. It should be noted that at any particular scanline, a CC comprises one or more unconnected runs of pixels which will be referred to as the "claims" of the CC on the scanline. The relationship between a CC, its claims, and runs not yet assigned to a CC is illustrated in FIG. 44. In FIG. 44, a CC 4400 comprising two claims 4401 and 4402 at a scanline 4403 is shown. Here, a run 4405 is found on a scanline 4404 which is connected to the claim 4401 and hence the CC 4400.

At a following step 4302, the next succession (referred to as a run) of black pixels on the current scanline is sought by the processor 3305. When such a run is found, a current pixel pointer is moved to the start of the new run. A run is defined to start at an x-coordinate, $x_{start\_run}$, when the previous pixel (at $x_{start\_run}-1$) is white and the pixel at $x_{start\_run}$ is black. The run is defined to end at an x-coordinate, $X_{end\_run}$, when the previous pixel (at $X_{end\_run}-1$) is black and the pixel at $x_{end\_run}$ is white. If step 4302 failed to find a subsequent run on the current scanline, the current pixel pointer is set to the last pixel on the scanline.

At a following step 4303, claims from previous scanlines with extents behind the current pixel pointer are terminated. This is because such claims do not continue on the current scanline, as no overlapping runs were found. If a claim to be terminated is also the last non-terminated claim of a CC, then that CC is also terminated. When a CC is to be terminated, a check is performed to determine if the CC to be terminated is a child CC. A CC is determined to be a child CC if there exists a parent CC that is, a CC that has claims on the scanline to the left and right of the CC to be terminated. If this condition is met, the CC to be terminated is marked as a child CC and is referenced by its corresponding parent CC.

Otherwise, the CC to be terminated may be a parent CC. Here, a check is performed to determine if the CC to be terminated references a child CC. If this is so, the CC is output to a following evaluation step 3604.

Lastly, if the CC is not enclosed by a parent CC, and the CC is not a parent CC, then the CC will not be output for further processing. In this case, any memory associated with the CC is cleared, such as in the memory 3306, and any references to the CC are discarded.

When a run (i.e. a succession of black pixels on a scanline surrounded by white pixels) is found in step 4302, the run is processed by the processor 3305 at step 4304. A detailed description of run processing will be provided later.

If there are more pixels on the scanline being currently processed, then the processing flow from step 4302 is repeated. Otherwise, the next scanline (if one exists) in the binarized image 3700 is selected (at step 4305) and processed.

If there are no scanlines remaining to be processed, the method of CCA which may be employed at step 3803 is terminated at a final step 4306.

Figure 45:
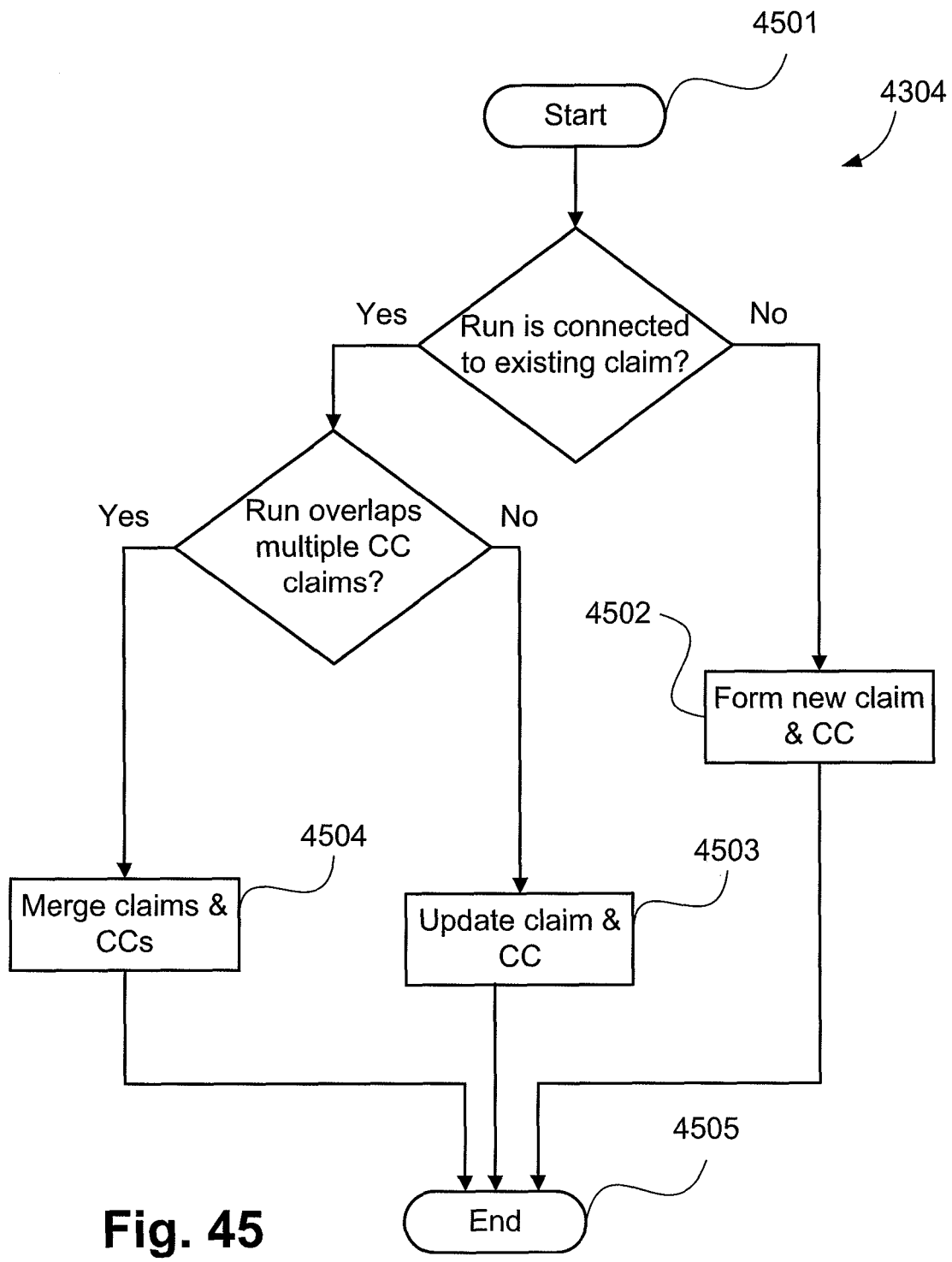
FIG. 45 is a flowchart representing a method of processing runs.

The method of processing runs, employed at step 4304, will now be described in detail with reference to FIG. 45. The method begins at an initial step 4501 in which a run to be processed is input.

If the run is not connected to an existing claim, then a new CC and claim are initialized at step 4502.

To initialize a newly created claim, the leftmost extent of the claim on the current scanline, $y_{scanline}$, is set to $X_{start\_run}$. Similarly, the rightmost extent of the claims on the current scanline is set to $x_{end\_run}$.

To initialize a new CC, the topmost extent of the CC, $y_{cc\_top}$ is set to the y-coordinate of the current scanline, $y_{scanline}$. The leftmost extent of the CC, $x_{cc\_left}$, is set to $x_{start\_run}$, and the rightmost extent of the CC, $x_{cc\_right}$, is set to $X_{end\_run}$. All other low-level CC metrics are initialized to zero before being updated by the methods described later in relation to step 4503.

If a run is connected to a single existing claim on the preceding scanline, then the existing claim is modified to cover the extent of the new run and the CC of the claim is updated at step 4503.

However, if the run is connected to multiple existing claims, and those claims reference different CCs, then all the CCs are merged to form a single CC at a merging step 4504. Furthermore, the claims are merged to cover the extent of the new run. The process of merging several CCs will be described in detail later.

A CC has several associated low-level metrics that are used to calculate higher-level metrics in step 3604. However, the low-level metrics accumulated at step 4503 can be updated and thus are amenable to implementation in hardware. The low-level metrics include, but are not limited to:

CC leftmost extent, $x_{cc\_left}$
CC rightmost extent, $x_{cc\_right}$
CC topmost extent, $y_{cc\_top}$
CC bottommost extent, $y_{cc\_bottom}$
CC mass, $mass_{cc}$
CC hole mass, $mass_{cc\_hole}$
CC gradient sine-component, $sin_{cc}$
CC gradient cosine-component, $cos_{cc}$
CC gradient accumulated weights, $weight_{cc}$ The process of updating the first four of the above metrics for a CC is best represented by the following pseudocode, which, when represented by application code, may be executed by the processor 3305:

** Pseudocode 28 ** if $x_{start\_run} < x_{cc\_left}$:
　$x_{cc\_left} = x_{start\_run}$
if $x_{end\_run} > x_{cc\_right}$:
　$x_{cc\_right} = x_{end\_run}$
$y_{cc\_bottom} = y_{scanline}$
$mass_{cc} = mass_{cc} + (x_{end\_run} - x_{start\_run} + 1)$ The CC's hole mass is an approximation of the number of white pixels enclosed by the CC. If the CC has a claim (say, $claim_{left}$ with rightmost extent $X_{claim\_left\_end}$ on the current scanline) to the left of the claim being currently updated (say, $claim_{current}$ with leftmost extent $x_{start\_run}$ on the current scanline), then the CC's hole mass is simply updated with the following pseudocode:

** Pseudocode 29 **

$mass_{cc\_hole} = mass_{cc\_hole} + (x_{start\_run} - x_{claim\_left\_end} - 1)$ The CC's gradient at a given pixel location is acquired or otherwise determined using well-known methods such as with a Sobel filter, for example implemented in software executed by the processor 3305. A Sobel filter inspects the pixel intensities within a one-pixel neighborhood of the subject pixel to approximate the gradient at the pixel location. Using the Sobel filter, the horizontal gradient $gradient_{horz}$, vertical gradient $gradient_{vert}$, and gradient vector magnitude $gradient_{magnitude}$ may all be computed with equations well known in the art.

The gradient vector at a given pixel location is transformed into an equivalent angle that is in the 'first quadrant', that is, modulo $\pi/2$. This allows the angle of rotation for a shape with rectilinear sides to be calculated in later steps.

Additionally, the sine and cosine components of the gradient vector are weighted by the magnitude of the gradient vector at a given pixel location.

Pseudocode representative of software for updating a CC's gradient sine, cosine and weight component is as follows:

** Pseudocode 30 ** theta_first_quadrant =
　$(4 \times \arctan(gradient_{vert} / gradient_{horiz})) \mod (2 \times pi)$
$sin_{cc} = sin_{cc} + (\sin(theta\_first\_quadrant) \times gradient_{magnitude})$
$cos_{cc} = cos_{cc} + (\cos(theta\_first\_quadrant) \times gradient_{magnitude})$
$weight_{cc} = weight_{cc} + gradient_{magnitude}$ At step 4504, CCs and claims are merged if a run overlaps more than one claim. In essence, low-level CC metrics are aggregated from all CCs and overlapping claims are replaced with a single claim matching the extents of the found run.

The leftmost extent of the merged CC will be the leftmost coordinate of all CCs to be merged. Similarly, the top, right and bottommost extents of the merged CC can be determined by finding the topmost, rightmost and bottommost extent of all CCs to be merged.

The merged CC mass, $mass_{merged\_cc}$, can be found from summing the mass of all CCs to be merged. Similarly, all other low-level metrics, such as $mass_{hole\_cc}$, may be summed from all CCs to be merged to determine the respective metric for the merged CC.

Once CCs are updated, merged, or a new CC is initialized, the method of processing runs, employed at step 4304 is terminated at a final step 4505.

Description of Shape Metric Evaluation

Figure 36:
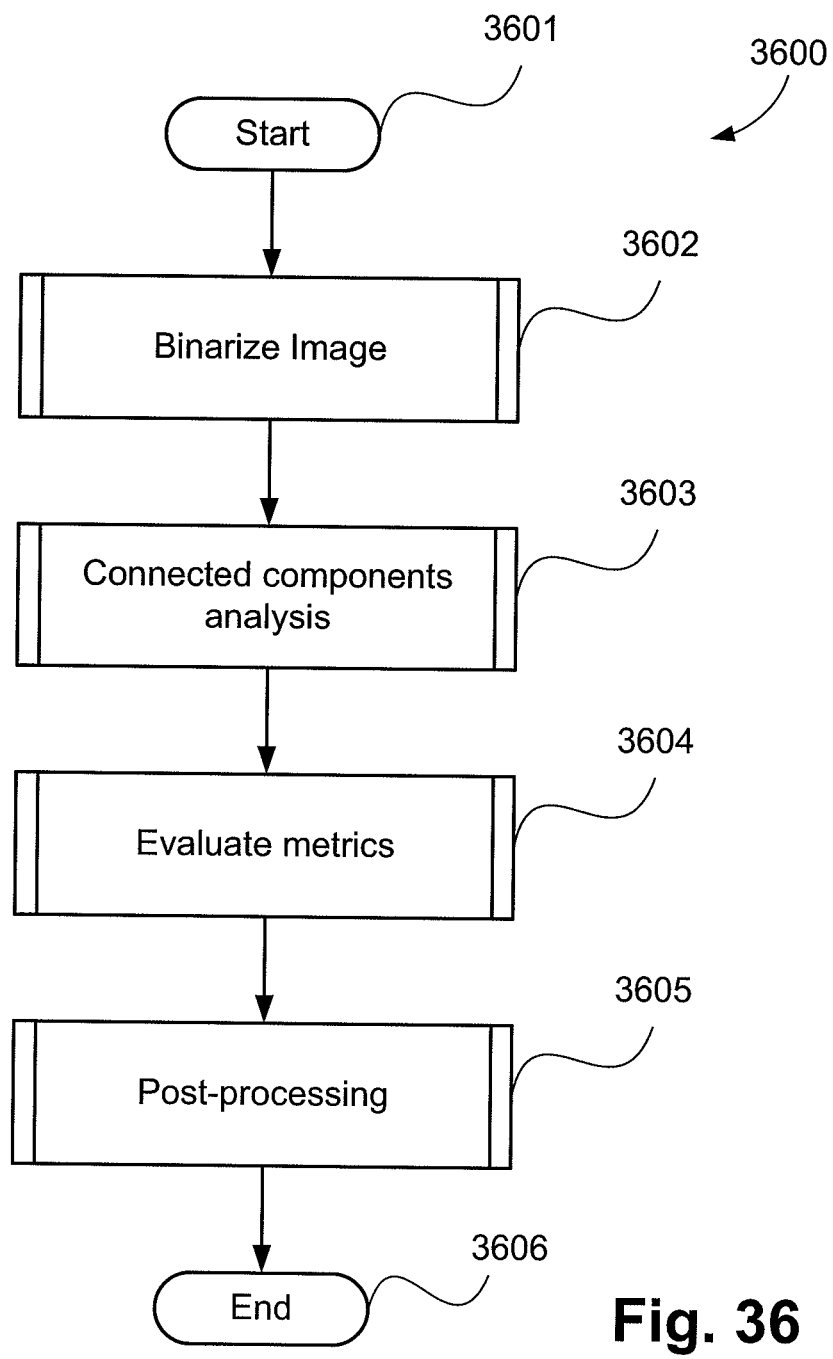
FIG. 36 is a flowchart representing the method of target feature detection in the context of this disclosure.

The output of step 3603 of FIG. 36 is a list of candidate features that may potentially be the target feature 100. Each candidate feature output by step 3603 has corresponding low-level metrics that are collected and updated as described previously. At step 3604, the low-level metrics are used to calculate higher-level shape metrics. Shape metrics are closely related to the geometry of the candidate features.

Figure 46:
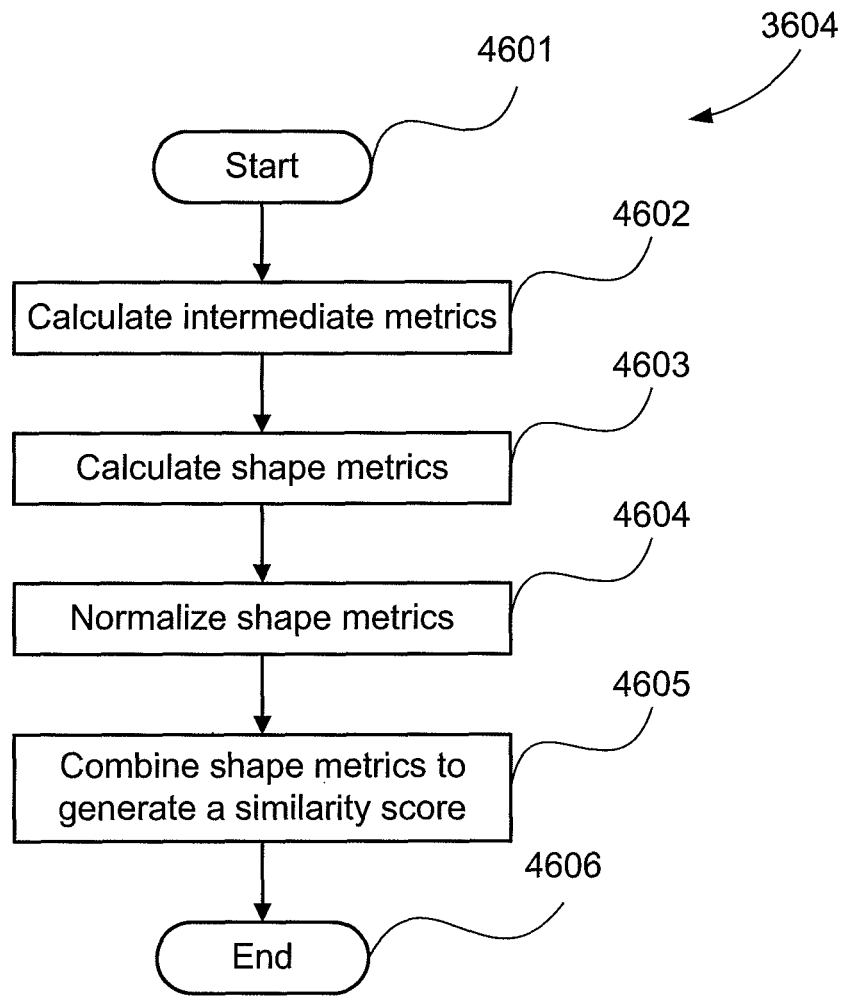
FIG. 46 is a flowchart representing a method for evaluating shape metrics.

The method for evaluating shape metrics for each candidate feature, employed at step 3604, will be described in detail with reference to FIG. 46. At an initial step 4601, a candidate feature with corresponding low-level metrics is input. This may involve retrieving such data from a storage location in the memory 3306 or HDD 3310 to the processor 3305. At a following step 4602, intermediate metrics are calculated by the processor 3305 for each candidate feature. Intermediate metrics facilitate calculation of shape metrics. At following step 4603, a set of shape metrics are calculated from the low-level metrics and intermediate metrics of each candidate feature. Each shape metric will be described in detail later. At a following step 4604, each shape metric is normalized to generate normalized shape metrics. At a following step 4605, each normalized shape metric is multiplied with a pre-determined weight to generate a weighted shape metric. The method of evaluating shape metrics is then terminated at a final step 4606.

The steps 4602 and 4603 will now be described in detail. However, the details of steps 4604 and 4605 vary between various implementations, and therefore will be described later.

Figure 47:
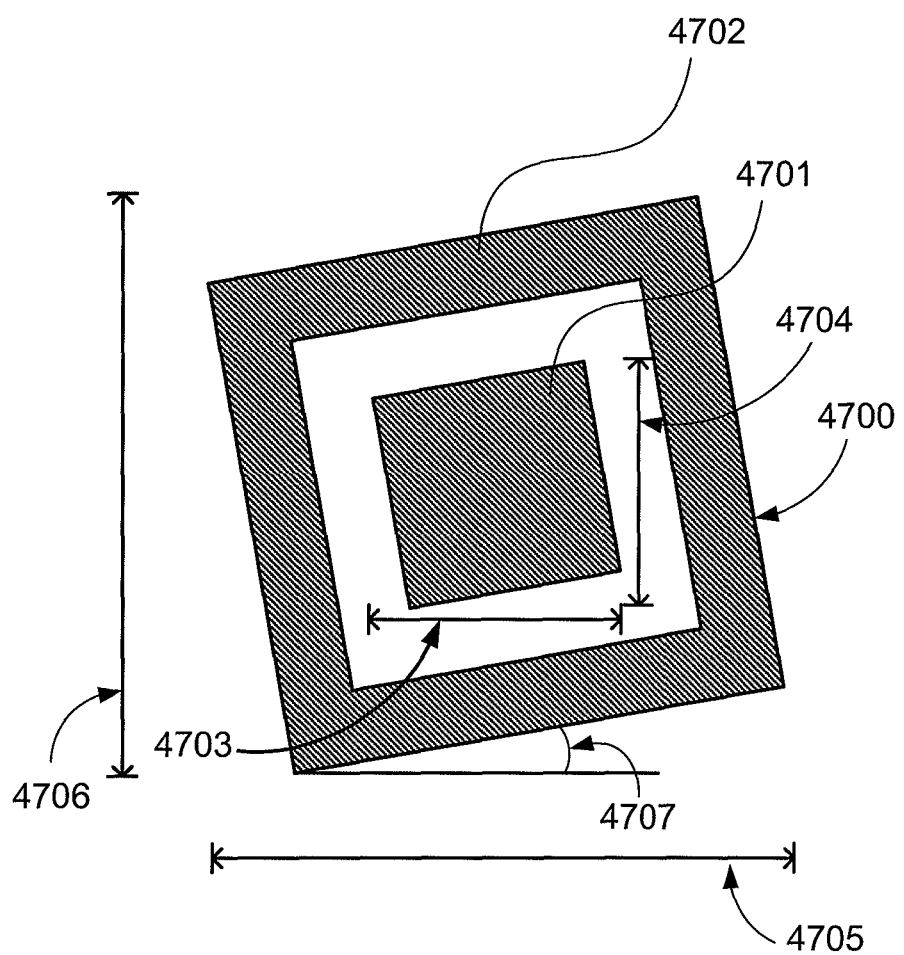
FIG. 47 shows the relationship of a candidate feature and its intermediate metrics.

Each intermediate metric, calculated at step 4602, will now be described in detail with reference to FIG. 47. A candidate feature 4700 is composed of a child CC 4701 and a parent CC 4702. Metrics corresponding to the child CC 4701 will be subscripted with 'child', and metrics corresponding to the parent CC 4702 will be subscripted with 'parent'. Metrics include x and y location, module size, width, height, average side length, and angle of rotation, for example.

The x and y location of the individual CCs may be determined by the processor 3305 evaluating the following equations:

$$x_{child} = x_{child\_cc\_left} + (x_{child\_cc\_right} - x_{child\_cc\_left} + 1)/2$$

$$y_{child} = y_{child\_cc\_top} + (y_{child\_cc\_bottom} - y_{child\_cc\_top} + 1)/2$$

$$x_{parent} = x_{parent\_cc\_left} + (x_{parent\_cc\_right} - x_{parent\_cc\_left} + 1)/2$$

$$y_{parent} = y_{parent\_cc\_top} + (y_{parent\_cc\_bottom} - y_{parent\_cc\_top} + 1)/2$$

The x and y location of the candidate feature, $x_{candidate\_feature}$ and $y_{candidate\_feature}$, may be determined by the processor 3305 evaluating the following equations:

$$x_{candidate\_feature} = (x_{child\_centre} + x_{parent\_centre})/2$$

$$y_{candidate\_feature} = (y_{child\_centre} + y_{parent\_centre})/2$$

The module size of a target feature (in pixels) is equivalent to the stroke thickness of the outer black region 101, which should be equivalent to the width of the enclosed white region 102. Therefore, it is desirable to determine the module size of detected candidate features for post-processing purposes. However, in some distorted images, the module sizes of black and white regions are not equivalent, so an average module size is computed by the processor 3305 from black and white regions.

$$module\_size\_black = sqrt(mass_{parent}/24)$$

$$module\_size\_white = sqrt((hole\_mass_{parent} - mass_{child})/16)$$

$$module\_size = (module\_size\_black + module\_size\_white)/2$$

Note that 'sqrt' indicates the square root function.

A width 4703 of the child CC, $width_{child}$, is determined by the following equation:

$$width_{child} = x_{child\_cc\_right} - x_{child\_cc\_left} + 1$$

A height 4704 of the child CC, $height_{child}$, is determined by the following equation:

$$height_{child} = y_{child\_cc\_bottom} - y_{child\_cc\_top} + 1$$

An average side length of the child CC, $average\_side_{child}$, is determined by the following equation:

$$average\_side_{child} = (width_{child} + height_{child})/2$$

A width 4705 of the parent CC, $width_{parent}$, is determined by the processor 3305 using the following equation:

$$width_{parent} = x_{parent\_cc\_right} - x_{parent\_cc\_left} + 1$$

A height 1506 of the parent CC, $height_{parent}$, is determined by the processor 3305 executing the following equation:

$$height_{parent} = y_{parent\_cc\_bottom} - y_{parent\_cc\_top} + 1$$

An average side length of the parent CC, $average\_side_{parent}$, is determined by the following equation:

$$average\_side_{parent} = (width_{parent} + height_{parent})/2$$

Also, an angle of rotation 1507 of the candidate feature 4700, $angle_{candidate\_feature}$, may be determined by the processor 3305 executing code exemplary of the following pseudocode:

```
**** Pseudocode 31 ****
sin angle_candidate_feature = sin angle_child_cc + sin angle_parent_cc
cos angle_candidate_feature = cos angle_child_cc + cos angle_parent_cc
weight_candidate_feature = weight_child_cc + weight_parent_cc
averaged_sin angle_candidate_feature =
        sin angle_candidate_feature
        /
        weight_candidate_feature
averaged_cos angle_candidate_feature =
        cos angle_candidate_feature
        /
        weight_candidate_feature
angle_candidate_feature =
    (
      arctan
      (
        averaged_sin angle_candidate_feature
        /
        averaged_cos angle_candidate_feature
      )
      /
      4
    )
if angle_candidate_feature < 0:
    angle_candidate_feature = angle_candidate_feature + (pi / 2)
```

Note that 'arctan' refers to the inverse tangent function, and 'pi' refers to the mathematical constant π.

Each shape metric, calculated at step 4603, will now be described in detail. However, it should be understood that shape metrics are not limited to the metrics described herein, being side ratio, width and height ratios, average side ratio, mass ratio, closed mass, solidity, concentricity, rectilinearity, average rectilinearity, and bounding box solidity.

The side ratios of the child and parent CCs, $\text{side\_ratio}_{child}$ and $\text{side\_ratio}_{parent}$, may be determined from the following equations:

$$\text{side\_ratio}_{child} = \text{width}_{child}/\text{height}_{child}$$

$$\text{side\_ratio}_{parent} = \text{width}_{parent}/\text{height}_{parent}$$

The width and height ratios of the candidate feature, width_ratio and height_ratio, may be determined by the following equations:

$$\text{width\_ratio} = \text{width}_{child}/\text{width}_{parent}$$

$$\text{height\_ratio} = \text{height}_{child}/\text{height}_{parent}$$

The average side ratio of the candidate feature, side_ratio, may be determined by the following equation:

$$\text{side\_ratio} = \text{average\_side}_{child}/\text{average\_side}_{parent}$$

The mass ratio of the candidate feature, mass_ratio, may be determined by the processor 3305 evaluating the following equation:

$$\text{mass\_ratio} = \text{mass}_{child}/\text{mass}_{parent}$$

The closed mass of the child and parent CCs, $\text{closed\_mass}_{child}$ and $\text{closed\_mass}_{parent}$, may be determined by the following equation:

$$\text{closed\_mass}_{child} = \text{mass}_{child} + \text{hole\_mass}_{child}$$

$$\text{closed\_mass}_{parent} = \text{mass}_{parent} + \text{hole\_mass}_{parent}$$

The solidity of the child and parent CCs, $\text{solidity}_{child}$ and $\text{solidity}_{parent}$, may be determined by the following equation:

$$\text{solidity}_{child} = \text{mass}_{child}/\text{closed\_mass}_{child}$$

$$\text{solidity}_{parent} = \text{mass}_{parent}/\text{closed\_mass}_{parent}$$

The concentricity of the candidate feature may be determined by the processor 3305 executing code exemplary of the following pseudocode:

---
** Pseudocode 32 **
---
```
x_child_centre = (x_child_cc_right + x_child_cc_left) / 2
y_child_centre = (y_child_cc_bottom + y_child_cc_top) / 2
x_parent_centre = (x_parent_cc_right + x_parent_cc_left) / 2
y_parent_centre = (y_parent_cc_bottom + y_parent_cc_top) / 2
x_dist_between_centres = x_child_centre - x_parent_centre
y_dist_between_centres = y_child_centre - y_parent_centre
concentricity = sqrt(x_dist_between_centres² + y_dist_between_centres²)
```
---

Note that 'sqrt' indicates the square root function and the superscripted numeric '2' indicates a power of 2.

The rectilinearity of the child and parent CCs, $\text{rectilinearity}_{child}$ and $\text{rectilinearity}_{parent}$, may be determined by the following equations:

$$\text{rectilinearity}_{child} = \text{sqrt}(\sin^2 \text{angle}_{child\_cc} + \cos^2 \text{angle}_{child\_cc})/\text{weight}_{child\_cc}$$

$$\text{rectilinearity}_{child} = \text{sqrt}(\sin^2 \text{angle}_{child\_cc} + \cos^2 \text{angle}_{child\_cc})/\text{weight}_{child\_cc}$$

The average rectilinearity of a candidate feature, $\text{rectilinearity}_{candidate\_feature}$, may be determined by the processor 3305 executing code representative of the following equation:

$$\text{rectilinearity}_{candidate\_feature} = \text{sqrt}(\sin^2 \text{angle}_{candidate\_feature} + \cos^2 \text{angle}_{candidate\_feature})/\text{weight}_{candidate\_feature}$$

The child CC's 'bounding box' solidity is a measure of how closely the size of the child CC's bounding box matches an exemplar bounding box of a rotated child CC with known mass. In practice, the mass of the child CC and the angle of rotation of the candidate feature are used to calculate an expected bounding box size. This expected size is compared with the actual bounding box size to give the 'bounding box' solidity metric. A method for calculating the child CC's bounding box solidity, $\text{bounding\_box\_solidity}_{child}$, is represented by the following pseudocode:

---
** Pseudocode 33 **
---
```
expected_BB_side_length = (width_child + height_child) / 2
sin_theta_plus_45 = sin(angle_candidate_feature + (pi / 4))
expected_CC_side_length =
    expected_BB_side_length
    /
    (sqrt(2.0) × sin_theta_plus_45)
expected_CC_mass = expected_CC_side_length²
bounding_box_solidity_child = mass_child / expected_CC_mass
```
---

Those skilled in the art will recognise that a similar 'bounding box' solidity metric can be calculated for the parent CC using $\text{closed\_mass}_{parent}$.

Target Feature Detection in the Context of QR Code Decoding

Figure 48:
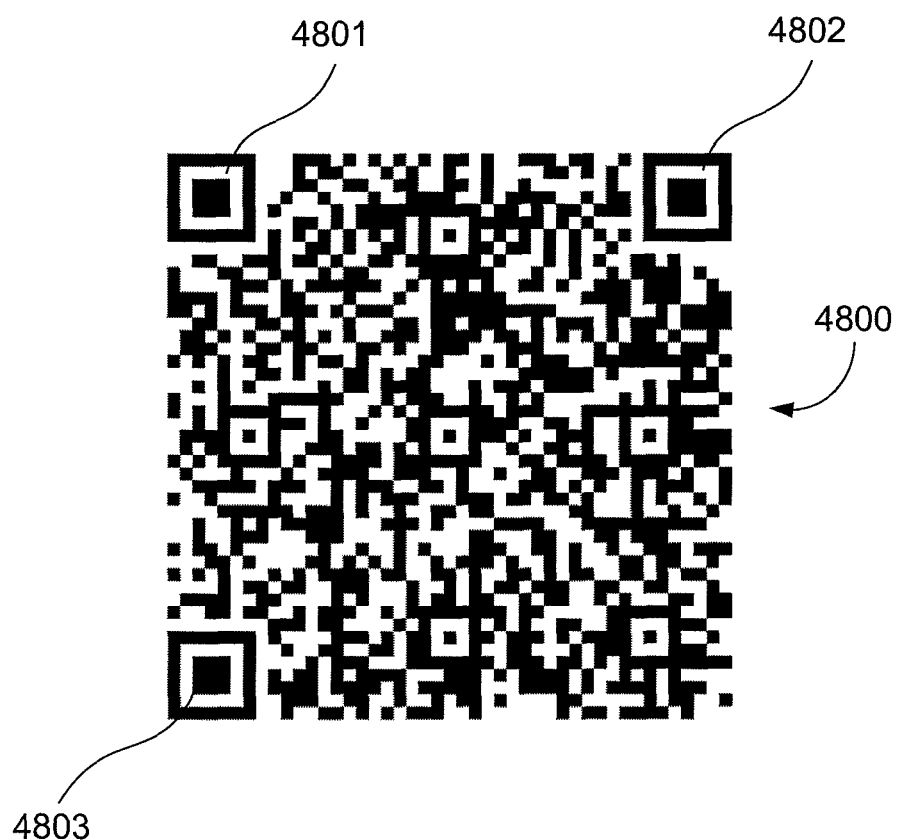
FIG. 48 shows a QR Code.

In a first implementation of target feature detection, the process 3600 of detecting target features is applied to detect and decode a QR Code shown as 4800 in FIG. 48. The QR Code 4800 is decoded by first acquiring the locations of each of three 'finder patterns' 4801, 4802 and 4803.

The process 3600 of detecting target features (in this case, detecting the finder patterns 4801, 4802 and 4803) for QR Code decoding will now be described with elaboration of steps 3604 and 3605.

The method of evaluating shape metrics, as applied at step 3604, to generate a single similarity score will now be described in greater detail. The method comprises the sub-step 4604, in which shape metrics are normalized. At step 4604, each shape metric is normalized by the processor 3305 to a value between 0 and 1. A normalized value of 1 indicates that the candidate feature is geometrically similar to the target feature for that metric. Thus, a normalized value of 0 indicates that the candidate feature is geometrically dissimilar to the target feature for that metric. Additionally, the normalization step 4604 discards candidate features whose metrics fall outside a wide predetermined range.

Each shape metric has an ideal value that matches the geometric attributes of the target feature precisely. For example, the ideal $\text{side\_ratio}_{child}$ value for the target feature 100 is 1 since the inner component of the target feature 101 is a square. The following table outlines valid ranges for each shape metric in accordance with this implementation:

| Metric | Minimum | Ideal | Maximum |
|---|---|---|---|
| mass_ratio | 0 | 0.375 | 0.75 |
| width_ratio | 0 | 0.43 | 1.0 |
| height_ratio | 0 | 0.43 | 1.0 |
| concentricity | 0 | 0 | concentricity_max |
| side_ratio_child | 0.5 | 1.0 | 2.0 |
| side_ratio_parent | 0.5 | 1.0 | 2.0 |
| solidity_child | 0 | 1.0 | 1.0 |
| bounding_box_solidity_child | 0 | 1.0 | 2.0 |
| Solidity_parent | 0 | 0.49 | 1.0 |

Metrics not listed in the above table, such as rectilinearity, are not normalized.

The maximum valid concentricity value is a factor of the size of the target feature. Therefore, the maximal concentricity value, concentricity_max, is determined by the following pseudocode:

** Pseudocode 34 **

```
max_dist_x = width_child / 2
max_dist_y = height_child / 2
max_concentricity = sqrt(max_dist_x² + max_dist_y²)
```

A normalized shape metric is generated from each shape metric according to the 1 following pseudocode:

** Pseudocode 35 **

```
if metric < metric_ideal:
        normalized_metric =
            (metric - metric_mininum)
            /
            (metric_ideal - metric_minimum)
else:
        normalized_metric =
            1
            -
            (
                (metric - metric_ideal)
                /
                (metric_maximum - metric_ideal)
            )
```

At step 4605, the normalized shape metrics are arithmetically combined (through multiplication and addition) to generate a single similarity score. The following pseudocode represents the process for combining shape metrics:

** Pseudocode 36 **

```
rectilinearity_parent_combined =
        norm_solidity_parent × rectilinearity_parent
side_ratios_combined =
        norm_side_ratio_child × norm_side_ratio_parent
weighted_metrics =
        (mass_ratio_weight × norm_mass_ratio)
        +
        (width_ratio_weight × norm_width_ratio)
        +
        (height_ratio_weight × norm_height_ratio)
        +
        (concentricity_weight × norm_concentricity)
        +
        (
            rectilinearity_parent_combined_weight
            ×
            rectilinearity_parent_combined
        )
        +
        (
            side_ratios_combined_weight
            ×
            side_ratios_combined
        )
similarity_score =
        weighted_metrics
        ×
        solidity_child
        ×
        norm_bounding_box_solidity_child
```

Note that normalized metrics are prefixed with 'norm' and weights, in an exemplary implementation, are defined in the following table:

| Weight | Value |
| --- | --- |
| mass_ratio_weight | 0.2978 |
| width_ratio_weight | 0.2256 |
| height_ratio_weight | 0.1799 |
| concentricity_weight | 0.0887 |
| rectilinearity_parent_combined_weight | 0.0599 |
| side_ratios_combined_weight | 0.1481 |

The weights defined above were acquired through statistical analysis of a large data set. The data set comprises images with actual target features known as a positive set, and images with features similar to target features known as a negative set. The above weights (when applied to generate a similarity score) provide useful separation of similarity score means between the positive and negative test set.

Figure 49:
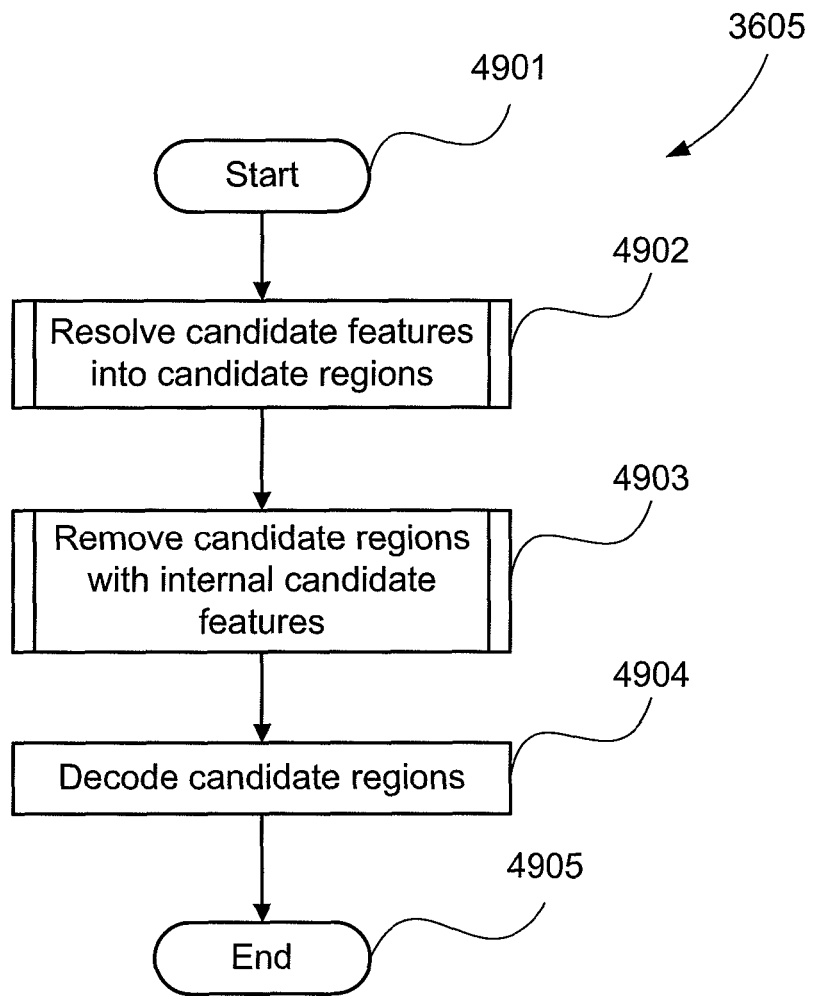
FIG. 49 is a flowchart representing a method of post-processing in the context of target feature detection for QR Code decoding.

Once a similarity score has been generated for each candidate feature, these candidate features are output to a post-processing step 4605. The post-processing step 4605 for this implementation is shown in FIG. 49. The post-processing step begins at an initial step 4901 in which a list of candidate features are input.

At a following step 4902, the list of candidate features are 'resolved' to determine candidate regions. A candidate region is a two-dimensional region that may potentially contain a QR Code. A QR Code comprises three finder patterns arranged in the top-left, top-right and bottom-left corners of the two-dimensional code. A candidate region, therefore, has three candidate features in a similar arrangement.

Thus, a series of checks are carried out to determine if a group of three candidate features are suitably arranged to form a candidate region. These checks are made with respect to two predetermined tolerances: tolerance$_{angle}$ and tolerance$_{magnitude}$. As an example, tolerance$_{angle}$ is 0.2 and tolerance$_{magnitude}$ is 0.2. A detailed description of a method to resolve candidate features into candidate regions will be provided later.

At a following step 4903, the list of candidate regions generated at step 4902 are inspected to remove candidate regions with additional candidate features. A detailed description of this step will be provided later.

Once candidate features have been resolved into candidate regions at step 4902, and regions with additional candidate features have been removed, candidate regions are decoded at step 4904. The process of decoding a QR Code and extracting the coded data once a triplet of finder patterns (resolved candidate features) is well known in the prior-art and therefore will not be described here. However, it is noted that the final output of the decoding process will be the data encoded two-dimensionally in the QR Code. Finally, the post-processing step (in the context of this implementation) applied at 3805 is terminated at step 4905.

Figure 50:
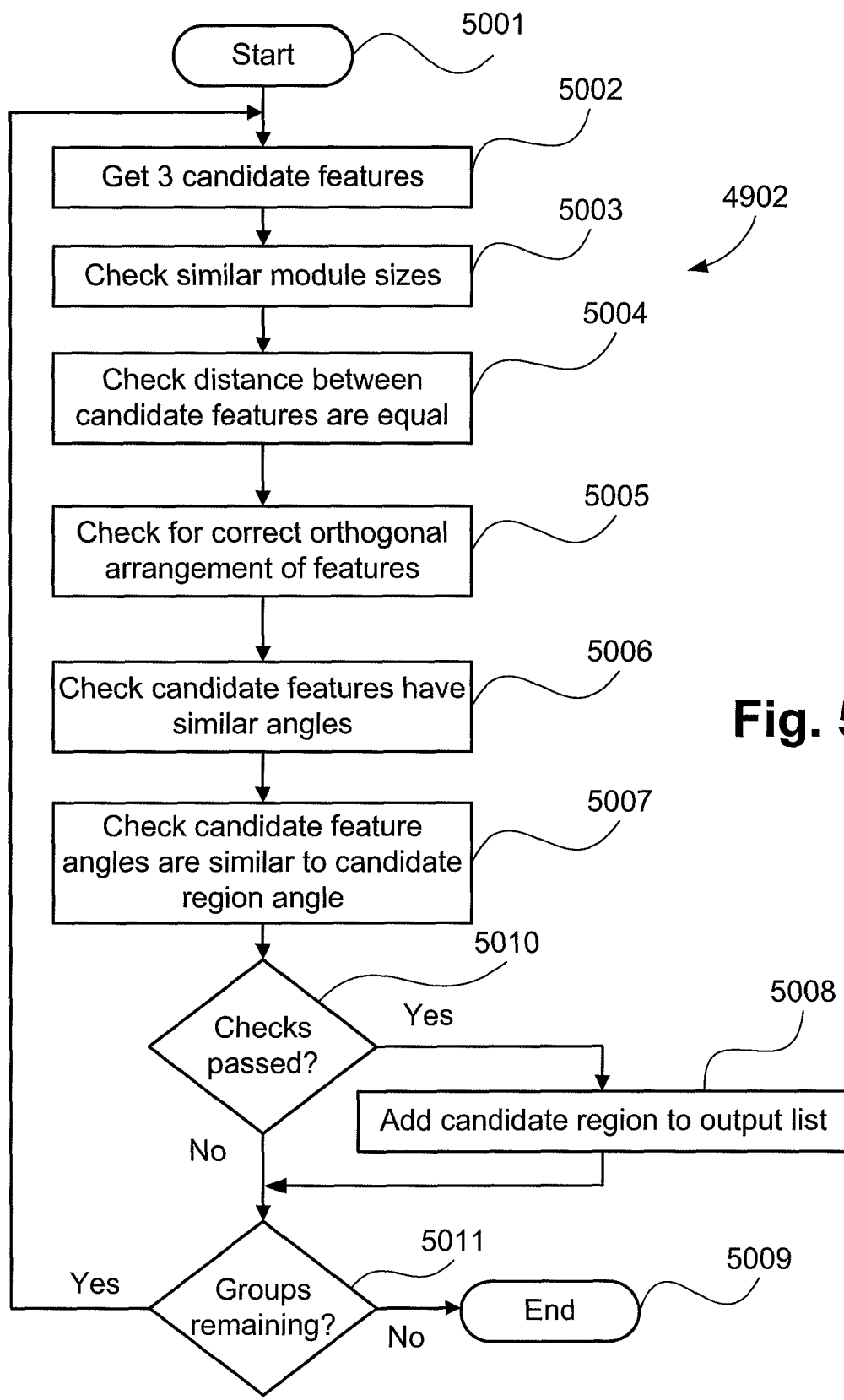
FIG. 50 is a flowchart representing a method of resolving candidate features into candidate regions.

A method of resolving candidate features into candidate regions performed at step 4902 will now be described with reference to FIG. 50. The method begins at an initial step 5001 in which all detected candidate features are input.

At a following step 5002, a group of three candidate features is acquired. Each candidate feature in the group is assigned an assumed position in the candidate region. This means that each group of three candidate features will be selected three times at this step, each time with a different arrangement of assumed positions. These candidate features are hereon referred to as $CF_{tl}$, $CF_{tr}$ and $CF_{bl}$. These correspond to candidate features in the top-left, top-right and bottom-left corners respectively.

At a following step 5003, a check is made to determine if the three candidate features have similar module sizes. The module size denotes (in pixels) the stroke width of the parent CC in the target feature 100. The check for similar module sizes may be represented by the following pseudocode:

** Pseudocode 37 **

```
if
(
    (
        abs(module_size_tl – module_size_tr)
        /
        min(module_size_tl, module_size_tr)
    ) <= tolerance_magnitude
    and
    (
        abs(module_size_tl – module_size_bl)
        /
        min(module_size_tl, module_size_bl)
    ) <= tolerance_magnitude
    and
    (
        abs(module_size_bl – module_size_tr)
        /
        min(module_size_bl, module_size_tr)
    ) <= tolerance_magnitude
):
    check passed
else:
    check failed
```

At a following step 5004, a check is made to determine if the distances between the candidate features are equal, conforming to a square QR Code. This check may be performed by implementing the following pseudocode:

** Pseudocode 38 **

```
vector_x_{tl–tr} = x_tl – x_tr
vector_y_{tl–tr} = y_tl – y_tr
vector_mag_{tl–tr} = sqrt(vector_x_{tl–tr}^2 + vector_y_{tl–tr}^2)
vector_x_{tl–bl} = x_tl – x_bl
vector_y_{tl–bl} = y_tl – y_bl
vector_mag_{tl–bl} = sqrt(vector_x_{tl–bl}^2 + vector_y_{tl–bl}^2)
min_vector_mag = min(vector_mag_{tl–bl}, vector_x_{tl–bl})
max_vector_mag = max(vector_mag_{tl–bl}, vector_x_{tl–bl})
if max_vector_mag <= (min_vector_mag × (1 + tolerance_magnitude)):
    check passed
else:
    check failed
```

At a following step 5005, a check is made to determine if the vectors running from the top-left candidate feature to the other two candidate features are adequately orthogonal. A further check is made to determine if the assumed assignments of candidate features to the top-right and bottom-left positions in the candidate region are correct. These checks may be performed by implementing the following pseudocode:

** Pseudocode 39 **

```
dot_product =
    (vector_x_{tl–tr} × vector_x_{tl–bl})
    +
    (vector_y_{tl–tr} × vector_y_{tl–bl})
cross_product_k =
    (vector_x_{tl–tr} × vector_y_{tl–bl})
    +
    (vector_y_{tl–tr} × vector_x_{tl–bl})
cos_theta = dot_product / (vector_mag_{tl–tr} × vector_mag_{tl–bl})
if cos_theta <= tolerance_angle and cross_product_k > 0:
    check passed
```

-continued

** Pseudocode 39 **

```
else:
    check failed
```

At a following step 5006, a check is made to determine if the angles of rotation of the candidate features are similar.

It is noted that the angle of rotation calculated for each candidate feature is modulo π/2 radians. Therefore, an adjustment is carried out to determine the smallest deviation between angles of rotation of candidate features. This check may be performed by implementing the following pseudocode:

** Pseudocode 40 **

```
if
(
    (
        abs(angle_tl – angle_tr) <= tolerance_angle × pi / 2
        or
        (
            pi / 2 – max(angle_tl, angle_tr) + min(angle_tl, angle_tr)
        ) <= tolerance_angle × pi / 2
    )
    and
    (
        abs(angle_tl – angle_bl) <= tolerance_angle × pi / 2
        or
        (
            pi / 2 – max(angle_tl, angle_bl) + min(angle_tl, angle_bl)
        ) <= tolerance_angle × pi / 2
    )
    and
    (
        abs(angle_bl – angle_tr) <= tolerance_angle × pi / 2
        or
        (
            pi / 2 – max(angle_bl, angle_tr) + min(angle_bl, angle_tr)
        ) <= tolerance_angle × pi / 2
    )
):
    check passed
else:
    check failed
```

At a following step 5006, a check is made to determine if the angles of rotation of the candidate features are similar to the rotation of the candidate region. The angle of rotation of the candidate region is defined as the vector angle between the top-left and top-right candidate features. This check may be performed by implementing the following pseudocode:

** Pseudocode 41 **

```
vector_angle_{tl–tr} = arctan2(vector_y_{tl–tr}, vector_y_{tl–tr})
if vector_angle_{tl–tr} < 0:
    vector_angle_{tl–tr} = vector_angle_{tl–tr} + (2 × pi)
vector_angle_{tl–tr} = pi/2 – ((4 × vector_angle_{tl–tr})mod(2 × pi) / 4)
if
(
    (
        abs(angle_tl – vector_angle_{tl–tr}) <= tolerance_angle × pi / 2
        or
        (
            pi / 2
            – max(angle_tl, vector_angle_{tl–tr})
            + min(angle_tl, vector_angle_{tl–tr})
        ) <= tolerance_angle × pi / 2
    )
    and
```

-continued

** Pseudocode 41 **

```
(
    abs(angle_tr - vector_angle_tl-tr) <= tolerance_angle × pi / 2
    or
    (
        pi / 2
        - max(angle_tr, vector_angle_tl-tr)
        + min(angle_tr, vector_angle_tl-tr)
    ) <= tolerance_angle × pi / 2
)
and
(
    abs(angle_bl - vector_angle_tl-tr) <= tolerance_angle × pi / 2
    or
    (
        pi / 2
        - max(angle_bl, vector_angle_tl-tr)
        + min(angle_bl, vector_angle_tl-tr)
    ) <= tolerance_angle × pi / 2
)
):
    check passed
else:
    check failed
```

Note that arctan2 denotes the four-quadrant inverse tangent function.

If all the checks in steps 5003 to 5007 are passed, as tested in step 5010, the candidate region is added to a list of candidate regions for output at a following step 5008.

If there are more candidate regions remaining to be processed, as tested at step 5011, then the process from step 5002 is repeated. Otherwise, the method of resolving candidate regions from candidate features is terminated at a final step 5009.

Figure 51:
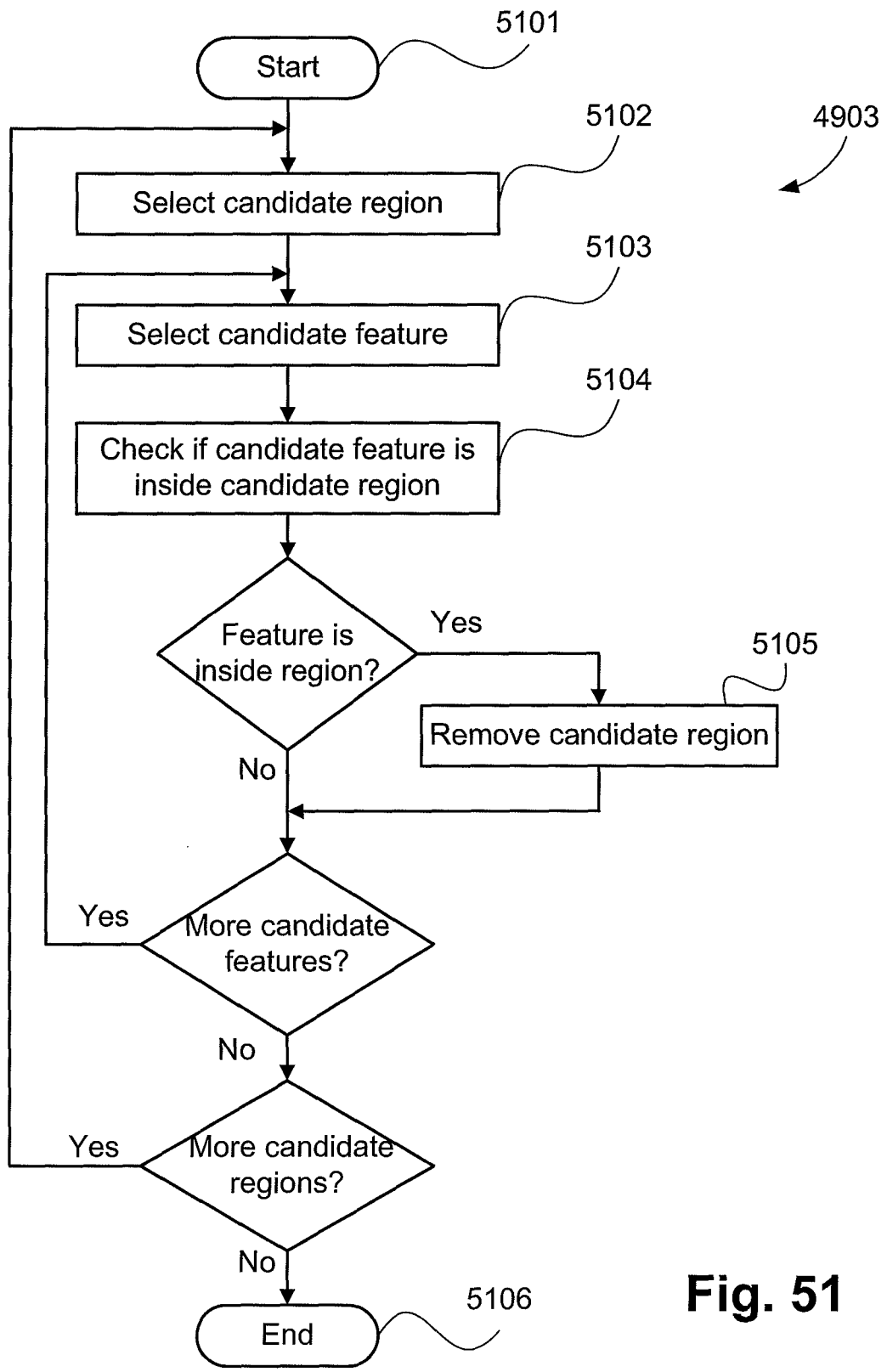
FIG. 51 is a flowchart representing a method of removing candidate regions with internal candidate features.

At step 4903, each candidate region in the list for output is processed to check whether a candidate feature exists in the two-dimensional area spanned by the region's candidate features. A valid QR Code contains finder patterns only in its corners. Therefore, if additional candidate features are found inside the candidate region, then the candidate region cannot be a valid QR Code and should be removed. The process 4903 of eliminating candidate regions with internal candidate features will now be described in detail with reference to FIG. 51. The process begins at an initial step 5101 in which a list of candidate features and a list of candidate regions (created during step 5008) are input.

At a following step 5102, a candidate region is selected.

At a following step 5103, a candidate feature is selected. Here, every candidate feature may be selected from the list input at step 5101. However, the overall system may be made more robust if only candidate features with a high similarity score (relative to the features forming the candidate region) are selected. As an example, a candidate feature may have an adequately high similarity score if its similarity score is greater than two-thirds of the minimum similarity score of the features in the candidate region.

Figure 52:
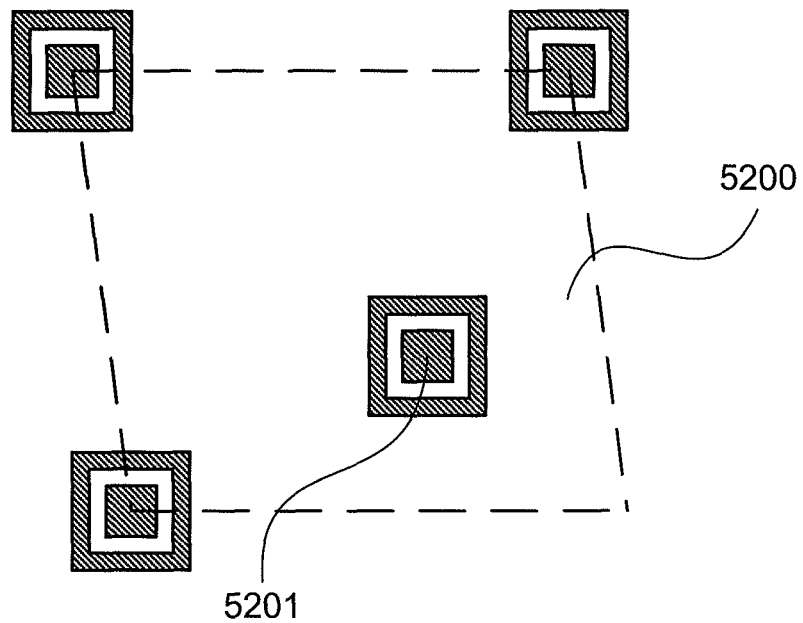
FIG. 52 shows a candidate region with an internal candidate feature.

At a following step 5104, a check is performed to determine if the selected candidate feature is located inside the candidate region. This check is best described with reference to FIG. 52. In FIG. 52, the candidate region is extrapolated to a parallelogram 5200 (if vector_angle$_{tl-tr}$ and vector_angle$_{tl-tr}$ are not orthogonal). If the centre of the selected candidate feature 5201 (defined by $x_{candidate\_feature}$ and $y_{candidate\_feature}$) lies within the parallelogram 5200, then the selected candidate region is determined to contain an internal candidate feature. While a parallelogram defined directly by the centres of the three candidate features of the region is shown in FIG. 52, it should be understood that a larger parallelogram, for example formed by the addition of a buffer region to in the region 2000, could be used.

If the candidate region is determined to contain an internal candidate feature, then the candidate region is removed (at step 5105) from the list of candidate regions to be output to the decoding process 4904.

If there are more candidate features in the list, then the process from step 5103 is repeated.

Otherwise, if a candidate region in the list remains to be processed, then the process from step 5102 is repeated.

Otherwise, if no candidate regions remain to be processed, then the process of eliminating candidate regions with internal candidate features is terminated at a final step 5106.

Target Feature Detection in the Context of Copyright Symbol Detection

Figure 53:
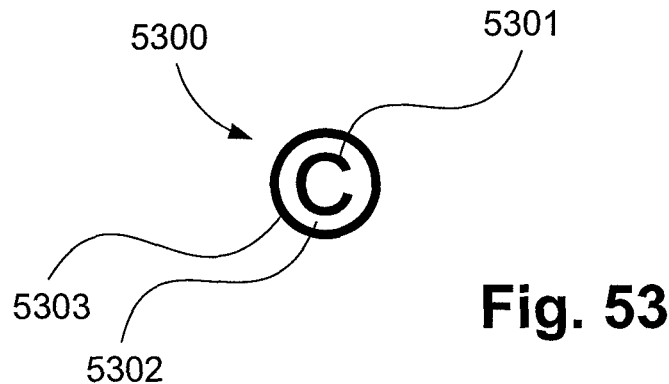
FIG. 53 shows a copyright symbol.

In a second implementation of target feature detection, the process 3600 of detecting target features is applied to detect a copyright symbol © 5300 in FIG. 53. It should be apparent that the copyright symbol 5300 is a valid target feature since it comprises a black region 5301 (i.e. the character "c") completely enclosed by a white region 5302, which is in turn completely enclosed by a black region 5303 (i.e. a circle).

The process 3600 of detecting target features (in this case, copyright symbols) will now be described with elaboration of steps 3604 and 3605. Additionally, references will be made to steps already described in the implementation above.

The method of evaluating shape metrics 3604 to generate a single similarity score, in the context of this implementation, will now be described in greater detail. Step 4604, in which shape metrics are normalized to the range 0 to 1 is similar to the description for step 4604 described for the above implementation. However, the ideal, minimum and maximum values for shape metrics differ because the geometry of the target feature differs significantly from QR Code finder patterns. Also, some shape metrics are not relevant for detecting copyright symbols and therefore need not be used in this implementation.

Ideal, minimum and maximum values for shape metrics are given in the following table. Metrics not listed in the following table are not relevant to this implementation and are not calculated.

| Metric | Minimum | Ideal | Maximum |
| --- | --- | --- | --- |
| mass_ratio | 0 | 0.4336 | 0.8672 |
| width_ratio | 0 | 0.5 | 1.0 |
| height_ratio | 0 | 0.5 | 1.0 |
| rectilinearity$_{child}$ | 0 | 0.1 | 0.5 |
| rectilinearity$_{parent}$ | 0 | 0 | 0.5 |
| concentricity | 0 | 0 | concentricity_max |
| side_ratio$_{child}$ | 0.5 | 1.0 | 2.0 |
| side_ratio$_{parent}$ | 0.5 | 1.0 | 2.0 |
| solidity$_{parent}$ | 0 | 0.3095 | 1.0 |

The following step 4605, in which normalized shape metrics are arithmetically combined, differs in the present implementation to that described above. In this implementation, every normalized shape metric is first multiplied by a predetermined weight. Subsequently, all weighted and normalized shape metrics are summed to generate a final similarity score. The following table lists the weights for each normalized metric:

| Weight | Value |
|---|---|
| mass_ratio_weight | 0.2893 |
| width_ratio_weight | 0.0797 |
| height_ratio_weight | 0.0975 |
| rectilinearity$_{child}$_weight | 0.0590 |
| rectilinearity$_{parent}$_weight | 0.1014 |
| concentricity_weight | 0.0191 |
| side_ratio$_{child}$_weight | 0.1028 |
| side_ratio$_{parent}$_weight | 0.1014 |
| solidity$_{parent}$_weight | 0.2009 |

The remainder of the shape metric evaluation process 3604 in this implementation is identical to the process described in the previous implementation.

Figure 54:
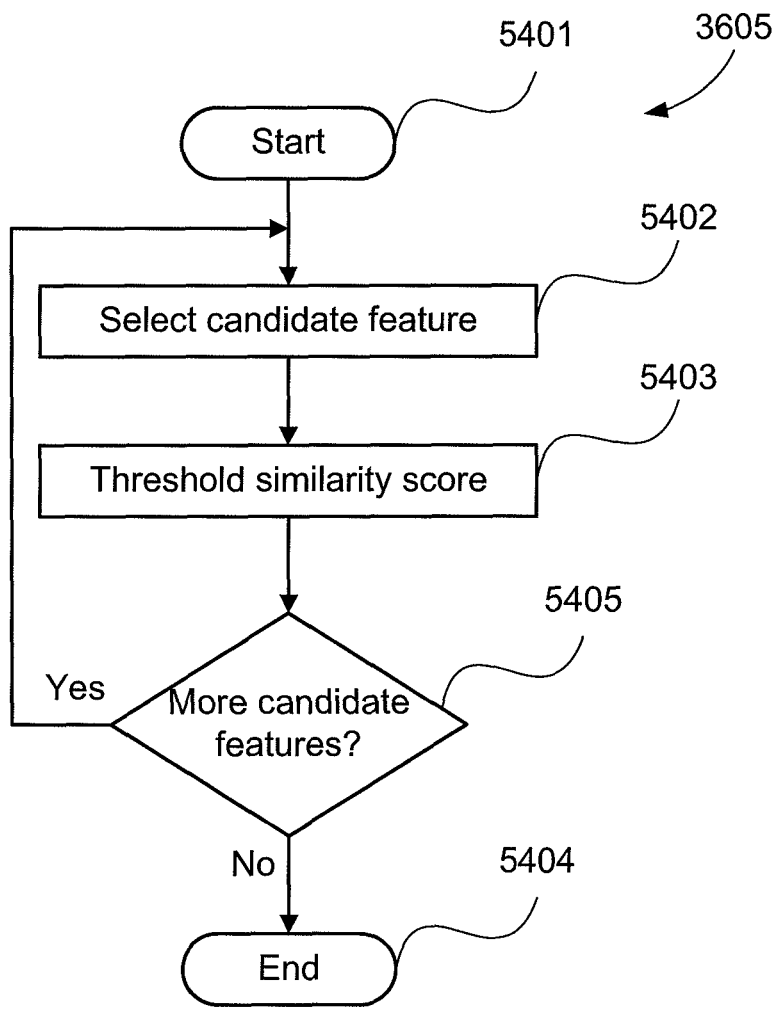
FIG. 54 is a flowchart representing a method of post-processing for detection of copyright symbols.

Step 3605 of post-processing candidate features will now be described with reference to FIG. 54. The method 3605 for post-processing of candidate features begins at an initial step 5401 in which a list of detected candidate features are input.

At a following step 5402, a candidate feature is selected.

At a following step 5403, the similarity score of the selected candidate feature is compared with a predetermined threshold. In this example, the threshold is set to 0.48. If the similarity score is greater than the threshold value, then the candidate feature is output as a detection result. The process from step 5402 is repeated if there are remaining candidate features to be processed, as tested at step 5405. Once there are no candidate features remaining to be processed, the method 3605 of post-processing candidate features is terminated at a final step 5404.

Target Feature Detection in the Context of Registered Trademark Symbol Detection In a third implementation of target feature detection, the process 3600 of detecting target features is applied to detect a registered trademark symbol 5500 in FIG. 55. It will be apparent that the registered trademark symbol 5500 is a valid target feature since it comprises a black region 5501 (i.e. the character "R") completely enclosed by a white region 5502, which is in turn completely enclosed by a black region 5503.

The process 3600 of detecting target features (in this case, registered trademark symbols) will now be described with reference to the second implementation above. The methods of detecting registered trademark symbols and detecting copyright symbols differ only in the shape metrics used, the normalization of metrics determined in step 4604 and the weighting of metrics in step 4605.

For the normalization step 4604, the following ideal, minimum and maximum values are appropriate. Shape metrics not listed in the table below are not used for registered trademark symbol detection.

| Metric | Minimum | Ideal | Maximum |
|---|---|---|---|
| mass_ratio | 0 | 0.6261 | 1.2522 |
| width_ratio | 0 | 0.6 | 1.0 |
| height_ratio | 0 | 0.6 | 1.0 |
| rectilinearity$_{parent}$ | 0 | 0 | 0.5 |
| concentricity | 0 | 0 | concentricity_max |
| side_ratio$_{child}$ | 0 | 1.0 | 2.0 |
| side_ratio$_{parent}$ | 0.5 | 1.0 | 2.0 |
| Solidity$_{parent}$ | 0 | 0.3095 | 1.0 |

At step 4605, shape metrics are multiplied by weights and summed to generate a single similarity score. To detect registered trademark symbols, shape metrics normalized at step 4604 are multiplied by the following weights:

| Weight | Value |
|---|---|
| mass_ratio_weight | 0.2396 |
| width_ratio_weight | 0.1407 |
| height_ratio_weight | 0.1292 |
| rectilinearity$_{parent}$_weight | 0.1358 |
| concentricity_weight | 0.0199 |
| side_ratio$_{child}$_weight | 0.0948 |
| side_ratio$_{parent}$_weight | 0.1167 |
| solidity$_{parent}$_weight | 0.1234 |

As noted above, the arrangements described are typically implemented in a suitably programmed computing system 3300 where an image is scanned from a document or otherwise input (via an electronic file across the communications network 3320, 3322) and the imaged is processed by the computing system 3300 to detect the presence of the target feature, such as the copyright symbol © or the registered trade mark symbol ®. The methods described are embodied in software which typically stored in a computer readable storage medium (eg. HDD 3310) of the system and is read and executed by the processor 3305 of the system to operate upon the input image. A specific implementation may be to include the arrangements in a photocopying machine so as to prevent inappropriate the replication of copyright works or those containing registered trade marks. The system 3300 may be considered a photocopying machine, for example where the scanner 3327 and printer 3315 represent the electromechanical inputs and outputs of the copier and the computer 3301 represents the computerised controller of the copier. For example once a candidate region of a target feature is identified, the target feature can be compared using the processor 3305 against a stored array of possible target features from the HDD 3310. A result of the comparison is then used to cause or otherwise abort copying of the document through printing in the photocopier of the scanned image. For example, where the copyright symbol is detected, the photocopier can then abort a copying operation instigated by a scanning of the document by the scanner 3326, to thus potentially avoid copyright infringement of the document. Where the target feature is a specific code, such may be used to permit copying of such documents by only those photocopiers including that specific code stored in the HDD 3310. As such, detection of target features can be used to selectively enable or disable a photocopying function.

INDUSTRIAL APPLICABILITY

The arrangements described are applicable to the computer and data processing industries and particularly for the detection and decoding of QR codes in documents. The arrangements are also useful for the authentication of documents and particularly to prevent the inappropriate replication of copyright works or those carrying registered trade marks The foregoing describes only some embodiments of the present invention, and modifications and/or changes can be made thereto without departing from the scope and spirit of the invention, the embodiments being illustrative and not restrictive.

What is claimed is:

1. A computer implemented method of decoding a QR code having only two initially detected finder patterns, the detection corresponding to determining the existence of the finder patterns in the QR code, the computer including at least a processor for executing the method and an associated memory in which an image including the finder patterns is stored, said method comprising the steps of:

(a) acquiring a pattern matching template based on characteristics of the detected finder patterns;
(b) determining at least one candidate region about the detected finder patterns, the candidate region being based at least on the relative positions of the detected finder patterns in the QR code;
(c) locating a previously undetected third finder pattern of the QR code in the at least one candidate region by correlating content of the candidate region with the pattern matching template; and
(d) decoding the QR code with each of the two initially detected finder patterns and the third finder pattern.

2. A method according to claim 1 wherein the two initially detected finder patterns are detected using connected component analysis.

3. A method according to claim 1 wherein the characteristics of the detected finder patterns comprise angle of rotation and module size.

4. A method according to claim 3 wherein the characteristics of the detected finder patterns further include black and white module sizes.

5. A method according to claim 1 wherein the characteristics of the detected finder patterns are based on the intensity values of pixels of at least one of the detected finder patterns.

6. A method according to claim 1 wherein step (d) comprises decoding the QR code with the location of the third finder pattern and the locations of the two initially detected finder patterns.

7. A computer readable storage medium having a computer program recorded thereon, the program being executable by computer apparatus to decode a QR code having only two initially detected finder patterns, the detection corresponding to determining the existence of the finder patterns in the QR code, said program comprising:
code for acquiring a pattern matching template based on characteristics of the detected finder patterns;
code for determining at least one candidate region about the detected finder patterns, the candidate region being based at least on the relative positions of the detected finder patterns in the QR code;
code for locating a previously undetected third finder pattern of the QR code in the at least one candidate region by correlating content of the candidate region with the pattern matching template; and
code for decoding the QR code with each of the two initially detected finder patterns and the third finder pattern.

8. A computer readable storage medium according to claim 7 wherein the two initially detected finder patterns are detected using connected component analysis.

9. A computer readable storage medium according to claim 7 wherein the characteristics of the detected finder patterns comprise angle of rotation and module size.

10. A computer readable storage medium according to claim 9 wherein the characteristics of the detected finder patterns further include black and white module sizes.

11. A computer readable storage medium according to claim 8 wherein the characteristics of the detected finder patterns are based on the intensity values of pixels of at least one of the detected finder patterns.

12. A computer readable storage medium according to claim 7 wherein said code for decoding comprises code for decoding the QR code with the location of the third finder pattern and the locations of the two initially detected finder patterns.

13. Computer apparatus adapted for decoding a QR code having only two initially detected finder patterns, the detection corresponding to determining the existence of the finder patterns in the QR code, said apparatus comprising:
means for acquiring a pattern matching template based on characteristics of the detected finder patterns;
means for determining at least one candidate region about the detected finder patterns, the candidate region being based at least on the relative positions of the detected finder patterns in the QR code;
means for locating a previously undetected third finder pattern of the QR code in the at least one candidate region by correlating content of the candidate region with the pattern matching template; and
means for decoding the QR code with each of the two initially detected finder patterns and the third finder pattern.

* * * * *